US012756444B2

(12) United States Patent
Di Girolamo et al.

(10) Patent No.: US 12,756,444 B2
(45) Date of Patent: Oct. 6, 2026

(54) METHOD AND APPARATUS FOR RADIO SIDELINK OPERATION OVER SHARED SPECTRUM

(71) Applicant: InterDigital Patent Holdings, Inc., Wilmington, DE (US)

(72) Inventors: Rocco Di Girolamo, Laval (CA); Pascal Adjakple, Great Neck, NY (US); Kyle Pan, Saint James, NY (US); Allan Tsai, Boonton, NJ (US); Yifan Li, Conshohocken, PA (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 253 days.

(21) Appl. No.: 18/710,790

(22) PCT Filed: Nov. 16, 2022

(86) PCT No.: PCT/US2022/079977

§ 371 (c)(1),
(2) Date: May 16, 2024

(87) PCT Pub. No.: WO2023/091959

PCT Pub. Date: May 25, 2023

(65) Prior Publication Data

US 2025/0038807 A1 Jan. 30, 2025

Related U.S. Application Data

(60) Provisional application No. 63/279,730, filed on Nov. 16, 2021.

(51) Int. Cl.
*H04B 7/06* (2006.01)
*H04L 1/1867* (2023.01)
(Continued)

(52) U.S. Cl.
CPC ......... *H04B 7/0626* (2013.01); *H04L 1/1896* (2013.01); *H04W 72/25* (2023.01); *H04W 74/0833* (2013.01)

(58) Field of Classification Search
CPC .... H04B 7/0626; H04L 1/1896; H04W 72/25; H04W 74/0833; H04W 76/14; H04W 76/18; H04W 74/0808
See application file for complete search history.

(56) References Cited

U.S. PATENT DOCUMENTS

| | | | |
|---|---|---|---|
| 10,980,059 | B1 | 4/2021 | Babaei |
| 2021/0051525 | A1 | 2/2021 | Cao et al. |

(Continued)

FOREIGN PATENT DOCUMENTS

| | | | |
|---|---|---|---|
| EP | 3843475 | A1 | 6/2021 |
| EP | 4027723 | A1 | 7/2022 |

(Continued)

OTHER PUBLICATIONS

3rd Generation Partnership Project (3GPP), R2-1910688, "Consistent LBT Failure Detection and Recovery", Google, 3GPP TSG-RAN WG2 Meeting#107, Prague, Czech Republic, Aug. 26-30, 2019, 5 pages.

(Continued)

*Primary Examiner* — Hashim S Bhatti
(74) *Attorney, Agent, or Firm* — Condo Roccia Koptiw LLP

(57) ABSTRACT

Methods and apparatuses are described herein to address issues at the MAC layer resulting from potential Listen-Before-Talk (LBT) failures and delayed transmission. For example, a wireless transmit/receive unit (WTRU) may monitor a plurality of TX resource pools within a sidelink bandwidth part (BWP) for LBT events. The WTRU may cause, based on determining that an LBT failure has
(Continued)

occurred, a corrective action associated with a sidelink MAC procedure. The WTRU may determine, based on the LBT failure, that a total number or consecutive number of detected LBT failures for one of the monitored TX resource pools exceeds a threshold, indicating a consistent LBT failure. The WTRU may, based on the consistent LBT failure, send an indication of the consistent LBT failure for the TX resource pool to peer WTRUs, and an indication of the consistent LBT failure for the TX resource pool to a serving cell.

16 Claims, 16 Drawing Sheets

(51) Int. Cl.
*H04W 72/25* (2023.01)
*H04W 74/0833* (2024.01)

(56) References Cited

U.S. PATENT DOCUMENTS

| | | | |
|---|---|---|---|
| 2021/0105104 A1 | 4/2021 | Cao et al. | |
| 2021/0144761 A1 | 5/2021 | Chin et al. | |
| 2021/0144762 A1 | 5/2021 | Tsai et al. | |
| 2021/0336682 A1 | 10/2021 | Pezeshki et al. | |
| 2022/0094497 A1* | 3/2022 | Shibaike | H04L 1/0027 |
| 2023/0015310 A1* | 1/2023 | Wu | H04L 5/0051 |
| 2024/0008077 A1 | 1/2024 | Han et al. | |
| 2024/0040594 A1* | 2/2024 | Peng | H04W 72/25 |

FOREIGN PATENT DOCUMENTS

| | | |
|---|---|---|
| WO | 2021/062823 A1 | 4/2021 |
| WO | 2021/215679 A1 | 10/2021 |
| WO | 2021208031 A1 | 10/2021 |

OTHER PUBLICATIONS

3rd Generation Partnership Project (3GPP), RP-182878, "New WID on NR-based Access to Unlicensed Spectrum", Qualcomm Inc., 3GPP TSG RAN Meeting #82, Sorrento, Italy, Dec. 10-13, 2018, 8 pages.
3rd Generation Partnership Project (3GPP), R2-2005970, "Corrections to 5G V2X with NR Sidelink", RAN2, 3GPP TSG-RAN WG2 Meeting #110-e, Online, Jun. 1-12, 2020, 43 pages.
3rd Generation Partnership Project (3GPP), RP-202846, "WID Revision: NR Sidelink Enhancement", LG Electronics, 3GPP TSG RAN Meeting #90e, Electronic Meeting, Dec. 7-11, 2020, 6 pages.
3rd Generation Partnership Project (3GPP), TR 21.916 V2.0.0, "Technical Specification Group Services and System Aspects, Release 16 Description, Summary of Rel-16 Work Items (Release 16), CP-211309", Jun. 2021, 157 pages.
3rd Generation Partnership Project (3GPP), TR 22.842 V17.1.0, "Technical Specification Group Services and System Aspects, Study on Network Controlled Interactive Services, (Release 17)", Sep. 2019, pp. 1-29.
3rd Generation Partnership Project (3GPP), TR 22.886 V16.2.0, "Technical Specification Group Services and System Aspects, Study on Enhancement of 3GPP Support for 5G V2X Services (Release 16)", Dec. 2018, pp. 1-76.
3rd Generation Partnership Project (3GPP), TR 38.825 V16.0.0, "Technical Specification Group Radio Access Network, Study on NR Industrial Internet of Things (IOT), (Release 16)", Mar. 2019, pp. 1-33.
3rd Generation Partnership Project (3GPP), TR 38.889 V16.0.0, "Technical Specification Group Radio Access Network, Study on NR-Based Access to Unlicensed Spectrum (Release 16)", Dec. 2018, pp. 1-119.
3rd Generation Partnership Project (3GPP), TS 22.186 V16.2.0, "Technical Specification Group Services and System Aspects, Enhancement of 3GPP support for V2X scenarios, Stage 1, (Release 16)", Jun. 2019, pp. 1-18.
3rd Generation Partnership Project (3GPP), TS 23.287 V16.5.0, "Technical Specification Group Services and System Aspects, Architecture Enhancements for 5G System (5GS) to Support Vehicle-to-Everything (V2X) Services, (Release 16)", Dec. 2020, pp. 1-58.
3rd Generation Partnership Project (3GPP), TS 36.213 V16.0.0, "Technical Specification Group Radio Access Network, Evolved Universal Terrestrial Radio Access (E-UTRA), Physical layer procedures (Release 16)", Dec. 2019, pp. 1-568.
3rd Generation Partnership Project (3GPP), TS 36.300 V16.6.0, "Technical Specification Group Radio Access Network, Evolved Universal Terrestrial Radio Access (E-UTRA) and Evolved Universal Terrestrial Radio Access Network (E-UTRAN), Overall description, Stage 2, (Release 16)", Jun. 2021, pp. 1-391.
3rd Generation Partnership Project (3GPP), TS 36.321 V16.5.0, "Technical Specification Group Radio Access Network, Evolved Universal Terrestrial Radio Access (E-UTRA), Medium Access Control (MAC) protocol specification (Release 16)", Jun. 2021, pp. 1-143.
3rd Generation Partnership Project (3GPP), TS 36.331 V16.6.0, "Technical Specification Group Radio Access Network, Evolved Universal Terrestrial Radio Access (E-UTRA), Radio Resource Control (RRC), Protocol Specification (Release 16)", Sep. 2021, pp. 1-1091.
3rd Generation Partnership Project (3GPP), TS 37.213 V16.6.0, "Technical Specification Group Radio Access Network, Physical Layer Procedures for Shared Spectrum Channel Access (Release 16)", Jun. 2021, pp. 1-27.
3rd Generation Partnership Project (3GPP), TS 38.213 V16.2.0, "Technical Specification Group Radio Access Network, NR, Physical Layer Procedures for Control (Release 16)", Jun. 2020, pp. 1-176.
3rd Generation Partnership Project (3GPP), TS 38.214 V16.2.0, "Technical Specification Group Radio Access Network, NR, Physical layer procedures for data (Release 16)", Jun. 2020, pp. 1-163.
3rd Generation Partnership Project (3GPP), TS 38.321 V16.3.0, "Technical Specification Group Radio Access Network, NR, Medium Access Control (MAC) Protocol Specification, (Release 16)", Dec. 2020, pp. 1-156.
3rd Generation Partnership Project (3GPP), TS 38.321 V16.6.0, "Technical Specification Group Radio Access Network, NR, Medium Access Control (MAC) Protocol Specification (Release 16)", Sep. 2021, pp. 1-158.
3rd Generation Partnership Project (3GPP), TS 38.331 V16.2.0, "Technical Specification Group Radio Access Network, NR, Radio Resource Control (RRC) Protocol Specification (Release 16)", Sep. 2020, pp. 1-921.
3rd Generation Partnership Project (3GPP), TS 38.331 V16.3.1, "Technical Specification Group Radio Access Network, NR, Radio Resource Control (RRC) Protocol Specification, (Release 16)", Jan. 2021, pp. 1-932.

* cited by examiner

50

200

500

METHOD AND APPARATUS FOR RADIO SIDELINK OPERATION OVER SHARED SPECTRUM

CROSS-REFERENCE TO RELATED APPLICATIONS

This application is the National Stage Entry under 35 U.S.C. § 371 of Patent Cooperation Treaty Application No. PCT/US2022/079977, filed Nov. 16, 2022, which claims the benefit of U.S. Provisional Patent Application No. 63/279,730, filed Nov. 16, 2021, the disclosure of which is hereby incorporated by reference in their entireties.

BACKGROUND

This disclosure pertains to the operation of wireless networks such as those described in, for example: RP-202846, NR Sidelink Enhancement Work Item Description; 3GPP TR 22.886, Study on enhancement of 3GPP Support for 5G V2X Services; V16.2.0; TS 22.186, Service requirements for enhanced V2X scenarios, V16.2.0; TR 22.842, Study on Network Controlled Interactive Service (NCIS) in the 5G System (5GS), V17.1.0; TS 38.321, NR; Medium Access Control (MAC) protocol specification, V16.3.0; TS 38.331, Radio Resource Control (RRC) protocol specification, V16.3.1; TS 23.287, Architecture enhancements for 5G System (5GS) to support Vehicle-to-Everything (V2X) services, V16.5.0; TS 37.213, Physical layer procedures for shared spectrum channel access, V16.6.0; and TS 36.300, (E-UTRAN); Overall description; Stage 2, V16.6.0.

In licensed bands, when the MAC layer asks the physical layer to generate a sidelink (SL) transmission, the MAC layer assumes that the transmission may be made by the physical layer. The MAC layer takes a number of actions (also known as SL MAC layer procedures) based on this assumption. In unlicensed bands, the assumption no longer holds. The physical layer has to share the channel with other users and systems, and SL transmission attempts may fail because of Listen Before Talk (LBT) failures. This may negatively impact the SL MAC layer procedures. Accordingly, there is a need for improved SL procedures.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Methods are described herein to address the issues at the MAC layer resulting from potential LBT failures, and potential delayed transmissions. Methods are described herein to handle consistent LBT failures (LBT monitoring, consistent LBT failure determination, and consistent LBT failure recovery), LBT impact on SL RLF procedure, LBT impacts on PSFCH reception, LBT impacts on TX resource reselection procedure, LBT impacts on HARQ buffer management, LBT impacts on SL DRX procedure, LBT impacts on SL CSI Reporting procedure, LBT impacts on SL Scheduling Request procedure, and LBT impacts on SL Buffer Status Reporting procedure, and methods to improve efficiency of the UL/SL prioritization procedure over unlicensed bands.

For example, a wireless transmit/receive unit (WTRU) may monitor a plurality of TX resource pools within a sidelink bandwidth part (BWP) for LBT events. The LBT events may comprise an LBT success, an LBT failure, or an LBT attempt. The WTRU may cause, based on determining that an LBT failure has occurred, a corrective action associated with a sidelink MAC procedure. The WTRU may determine, based on the LBT failure, that a total number or consecutive number of detected LBT failures for one of the monitored TX resource pools exceeds a threshold, indicating a consistent LBT failure. The WTRU may, based on the consistent LBT failure, send an indication of the consistent LBT failure for the TX resource pool to peer WTRUs, and an indication of the consistent LBT failure for the TX resource pool to a serving cell.

BRIEF DESCRIPTION OF THE DRAWINGS

A more detailed understanding may be had from the following description, given by way of example in conjunction with the accompanying drawings.

DETAILED DESCRIPTION

Figure 1:
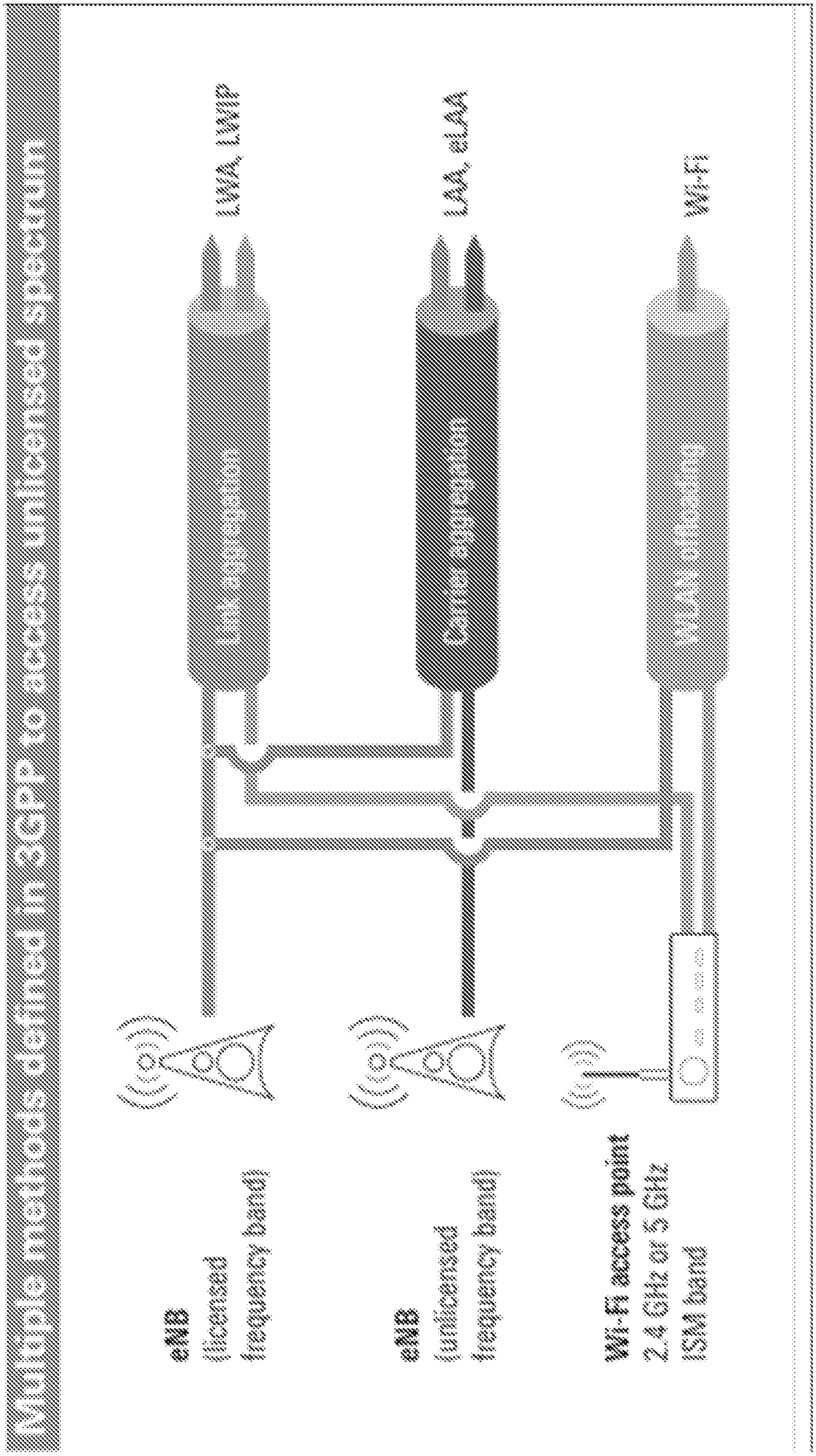
FIG. 1 shows an example of standardized solutions over unlicensed spectrum.

Methods are described herein to address the issues at the MAC layer resulting from potential LBT failures, and potential delayed transmissions. The techniques described herein may be described as being performed by a wireless transmit/receive unit (WTRU). It is understood that with the wide variety of use cases contemplated for wireless communications, each WTRU may comprise or be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

Table 1 describes acronyms used herein.

TABLE 1

| Acronyms | |
|---|---|
| 3GPP | $3^{rd}$ Generation Partnership Project |
| ACK | ACKnowledgement |
| AR | Augmented Reality |
| ARQ | Automatic Repeat reQuest |
| B-IFDMA | block interleaved frequency division multiplex |
| BSR | Buffer Status Report |
| CAT | CATegories (of LBT) |
| CCA | Clear Channel Assessment |
| CE | Control Element |
| COT | Channel Occupancy Time |
| CSI | Channel State Information |
| CW | Contention window |
| DAA | Detect And Avoid |
| DCI | Downlink Control Information |
| DFS | Dynamic Frequency Selection |
| DMRS | DeModulation Reference Signal |
| DMTC | DRS measurement timing configuration |
| DRS | Discovery Reference Signal |
| DTX | Discontinuous Transmission |
| ED | Energy Detection |
| eNB | Evolved NB |
| ETSI | European Telecommunications Standards Institute |
| FCC | Federal Communications Commission |
| HARQ | Hybrid ARQ |
| HMD | Head Mounted Device |
| ISM | Industrial, Scientific, and Medical |
| LAA | License Assisted Access |
| LBT | Listen-Before-Talk |
| LBTR | LBT Report |
| LTE | Long Term Evolution |
| LWA | LTE Wi-Fi Aggregation |
| MAC | Media Access Control |
| NACK | Negative ACK |
| NB | Node B (base station) |
| NCIS | Network Controlled Interactive Service |
| OFDM | Orthogonal Frequency Division Multiplexing |
| PSCCH | Physical sidelink Control Channel |
| PDSCH | Physical Downlink Shared Channel |
| PUSCH | Physical Uplink Shared Channel |
| PHY | PHYsical |
| PQI | PC5 QoS Indicator |
| PRB | Physical resource Block |
| PSCCH | Physical sidelink Control Channel |
| PUSCH | Physical Uplink Shared Channel |
| QCL | Quasi Co-Location |
| RMTC | RSSI measurement timing configuration |
| RRM | radio resource management |
| RS | Reference Signal |
| RSSI | Received Signal Strength Indicator |
| RSRP | Reference Signal Received Power |
| RSRQ | Reference Signal Received Quality |
| RX | Receive/Receiver |
| SCI | Sidelink Control Information |
| SL | SideLink |
| SR | Scheduling Request |
| SSB | Synchronization Signal/PBCH Block |
| TB | Transport Block |
| TPC | Transmit power Control |
| TX | Transmit/Transmitter |
| UE | User Equipment |
| UL | UpLink |
| V2X | Vehicle to Everything |
| VR | Virtual Reality |
| XR | eXtended reality |

The following terms are used herein:

LBT failure: A transmission attempt over unlicensed spectrum that results in a failure. The transmission cannot be made as the channel is being used by another user. The other user may be from the same system or different system, using the same technology or different technology. An LBT failure applies to a given transmission.

LBT success: A transmission attempt over unlicensed spectrum that results in a success. The transmitter has sensed the channel and determined that no other user is using the channel. The other user may be from the same system or different system, using the same technology or different technology. An LBT success applies to a given transmission.

LBT attempt: A transmission attempt to access a channel. The result of an LBT attempt is either an LBT success or LBT failure. An LBT attempt applies to a given transmission LBT operation: Refers to the steps where a WTRU performs a Clear Channel Assessment (CCA) and determines whether the channel is free or busy. If free the LBT is successful. If busy, the LBT is a failure.

LBT state: The ongoing state of the channel that is to be used for transmission, A channel may be in at least 2 states: busy or free. When the LBT state of a channel is "busy," transmission attempts may result in LBT failures. When the LBT state of a channel is "free," transmission attempts may result in LBT successes.

Delayed transmissions: as part of NR-U standardization, the notion of pending HARQ processes was introduced, to allow for the case that transmissions of HARQ processes may result in LBT failures. The transmissions of these pending HARQ processes are delayed and are attempted in future configured uplink grants.

Unlicensed spectrum/unlicensed bands: Radio Spectrum, in general, can be categorized into two types, a) licensed—assigned exclusively to operators for independent usage, b) unlicensed—assigned to every citizen for non-exclusive usage subject to some regulatory constraints, like restrictions in transmission power etc.

Shared Spectrum: Spectrum that is shared and may be used by multiple categories of users. Some coexistence mechanism is required to allow the sharing of spectrum (e.g., listen before talk). Shared spectrum is typically unlicensed. However, it is also possible to share licensed spectrum.

NR Sidelink is envisioned for a number of use cases:

NR V2X sidelink: In one use case information is to be provided to vulnerable road users, e.g., pedestrian or cyclist, about the presence of moving vehicles in case of dangerous situation.

NR Commercial (non-V2X) sidelink: In another use case (Proximity based applications Augmented Reality/Virtual Reality (AR/VR)), sidelink communications with high throughput and low latency may be required. For example, a head mounted device VR unit may have a sidelink to offload computing to a gateway device.

NR Critical (non-V2X) sidelink: Some critical/emergency situations may require SL communications with little or no cellular coverage, and with first responders using their WTRUs for extended periods of time to communicate with each other and to send out location information. Power savings for first responders is an important factor.

Increased data rate has been a popular topic for Rel-17. The motivation behind it is to support higher data rate demanded by advanced V2X scenarios and also commercial sidelink use cases other than V2X.

In TS 22.186, the requirement of sensor information sharing between WTRUs is defined as 1000 Mbps data rate with reliability of 99.99%. Additionally, new service for people to exchange information and play game are expected to become increasingly popular (e.g., NCIS: Network Controlled Interactive Service). TR 22.842 captured several typical use cases for NCIS. The interactive services may happen between local users via sidelink where the local users may be AR/VR enabled phones or glasses, 3D-gaming equipment, and other HMDs. The required data rate is very high (e.g., several Gbps) as defined in TR 22.842. In current sidelink, the spectrum is too limited to achieve these higher data rate requirements.

XR and gaming is the acknowledged killer applications for glasses, Head Mounted Displays (HMDs), etc. SA1 has identified the use cases and requirements in Network Controlled Interactive Services: NCIS (TR 22.842)

Sidelink is identified as an important use case for XR, e.g., consume VR content via tethered VR headset in the interactive service. SA2 has defined the corresponding PQI for such kinds of requirements, where end-to-end latency is 5-10 ms and the required data rate requirement is 0.1-10 Gbps with reliability 99.99%. Table 2 shows an example of the new services for SL.

TABLE 2

New Services for SL

| PQI Value | Resource Type | Default Priority Level | Packet Delay Budget | Packet Error Rate | Default Maximum Data Burst Volume | Default Averaging Window | Example Services |
|---|---|---|---|---|---|---|---|
| New value#1 | Delay Critical GBR | 5 | 5 ms | 10^−4 | 20000 bytes | 2000 ms | Interactive service consume VR content with high compression rate via tethered VR headset |
| New value#2 | | 6 | 10 ms | 10^−4 | 20000 bytes | 2000 ms | interactive service consume VR content with low compression rate via tethered VR headset; Gaming or Interactive Data Exchanging; |

RAN1 has evaluated and concluded that the current release of NR sidelink cannot support the required data rate. Further, currently there is no suitable spectrum/bandwidth to support this kind of commercial service.

As part of Release 13, there was a study Item "Study on Licensed-Assisted Access Using LTE". The amount of data traffic carried over cellular networks was increasing at a very fast rate and is expected to increase for many years to come. The number of users/devices was increasing and each user/device was accessing an increasing number and variety of services, e.g. video delivery. This required not only high capacity in the network, but also provisioning very high data rates to meet customers' expectations on interactivity and responsiveness. More spectrum was therefore needed for cellular operators to meet the increasing demand. The preferred type of spectrum to efficiently serve users is licensed spectrum. Licensed spectrum can deliver predictable high-quality services with the highest spectral efficiency. In addition, in order to deliver predictable services, mobile operators need to perform heavy network investments, through careful planning and deployment of high-quality network equipment and devices. The justifications for such extensive capital investments require the reliability and operational assurance enabled by licensed spectrum. It is therefore essential that the regulatory community keeps focusing on identifying and allocating new licensed spectrum that can be utilized specifically for mobile communications.

Striving to meet the market demands, there was increasing interest from operators in deploying some complementary access utilizing unlicensed spectrum to meet the traffic growth. e.g. large number of operator-deployed Wi-Fi networks and the 3GPP standardization of LTE/WLAN interworking solutions. This interest indicated that unlicensed spectrum, when present, may be an effective complement to licensed spectrum, for cellular operators to help address the traffic explosion in some scenarios, such as hotspot areas. A number of open questions needed to be addressed: question 1: which unlicensed spectrum to target and question 2: How 3GPP WTRUs would "use" this unlicensed spectrum?

Initially, the cellular industry, led by several network operators, infrastructure vendors and chipset manufacturers, focused on the 5 GHz industrial, scientific and medical (ISM) band, to serve the immediate need for additional spectrum for mobile broadband applications due to the ever increasing mobile data traffic.

The ISM bands are generally defined by the International Telecommunication Union (ITU) Radio Regulations (Article 5), but are regulated differently by each region (e.g. European Telecommunications Standards Institute (ETSI) in Europe or Federal Communications Commission (FCC) in USA).

The exact frequency allocation and detailed regulation depends on the country (e.g. South Korea vs. Japan). Note the allocations are not exactly the same in each country and that there are different rules depending on country. For example, there are different rules with respect to dynamic frequency selection (DFS), indoor/outdoor use, and transmit power control (TPC). There are also rules regarding power spectral density limits and Discontinuous transmission (e.g. in Japan). There are also rules regarding channel access and occupation rules: the equipment may implement an adequate spectrum sharing mechanism in order to facilitate sharing between the various technologies and applications. The adequate spectrum sharing mechanism can be e.g. LBT (Listen Before Talk), DAA (Detect And Avoid).

A nNumber of standardized solutions have been developed to use this unlicensed band:

LWA (LTE Wi-Fi Aggregation): enables utilizing both LTE and Wi-Fi links simultaneously, without requiring hardware changes to the network infrastructure equipment and mobile devices. LWA leverages carrier Wi-Fi deployments based on a dual connectivity architecture, where Wi-Fi is used instead of a secondary LTE eNB.

LAA: extension of LTE to unlicensed spectrum based on carrier aggregation, which has been standardized by 3GPP.

WLAN Offloading: 3GPP traffic offloaded to WiFi. Much older technology

FIG. 1 shows an example of standardized solutions over unlicensed spectrum 50. LBT is a contention mechanism where the transmitter has to check the channel state before using it. It relies mainly on clear channel assessment procedure (CCA) with energy detection (ED) threshold to sense the channel state for a defer period, and to determine whether any signal (regardless of its kind) is present above a certain power value. For example, when the channel is detected free, then the station is allowed to transmit, otherwise station has to wait for a backoff period of time determined by a Contention Window (CW). Before standardization by 3GPP, several variants or categories (CAT) of LBT were considered:

Category 1: No LBT procedure is performed;

Category 2: LBT without random backoff with deterministic waiting time when the channel is found free;

Category 3: LBT with random backoff and fixed contention window size; and

Category 4: LBT with random backoff and variable contention window size (between some minimum and maximum).

The need to ensure fair sharing and coexistence with other technologies has led to the introduction of frame structure type 3. It is applicable to LAA secondary cell operation with normal cyclic prefix. The radio frame duration for frame structure type 3 is 10 ms. The 10 subframes within a radio frame are available for downlink transmissions. Downlink transmissions may occupy one or more consecutive subframes, starting anywhere within a subframe and ending with the last subframe either fully occupied or following one of the DwPTS durations. This may be referred to as an LAA burst. The 10 subframes [1 ms each] may be available for downlink transmission, where a transmission can occupy one or more consecutive subframes, starting within a subframe at the first or second slot boundaries. The transmission also does not need to end with the subframe. Instead, the downlink pilot time slot (DwPTS) architecture from frame structure type 2 (TDD) is reused. That means the last subframe of the "LAA radio frame" can either be fully occupied or follow one of the DwPTS durations.

Even though a LAA burst can span multiple subframes, the scheduling Downlink Control Information DCI (DCI1, DCI2, DCI2A etc) is being transmitted at every subframe that carries Physical Downlink Shared Channel (PDSCH). Information on starting and stopping points is carried in DCI. To provide these additional information to WTRU, DCI format 1C is used. For example, the following rules may apply: i) If there is regular scheduling DCI only DCI (DCI1, DCI2, DCI2A etc), it is assumed that all the symbol in the subframe are carrying LAA data; ii) If there is both regular scheduling DCI and DCI 1C, the subframe (current subframe) or next subframe may or may not be partial subframe (subframe carrying data in less than 14 Orthogonal Frequency Division Multiplexing (OFDM) symbol); or iii) If there no DCI at all, the subframe does not transmit any LAA data.

LAA may apply CCA in two steps: an initial CCA and an enhanced (or extended) CCA. In LAA, CCA is based on ED over a defined time duration, that does not exceed a certain threshold value (the ED threshold). There was significant discussion on the value of the threshold, but in the end a fixed threshold was adopted. The detected energy level needs to be below this threshold for a certain amount of time with a slot duration Tsl and defer time Td. Td depends on the priority of the traffic. If the channel is sensed to be clear, the transmitter can only transmit for a limited amount of time defined as the maximum channel occupancy time (COT) (Tm cot,p). Maximum channel occupancy time (COT) depends on the priority of the traffic. If the channel is sensed to be occupied during that time or after a successful transmission, the "enhanced (or extended) CCA" period is started by generating a random number 'N' that is within the contention window (CW). CW is within a range that depends on the priority of the traffic. For enhanced CCA: WTRU decrements N for each slot that the channel is sensed free. When N=0, WTRU can transmit.

Figure 2:
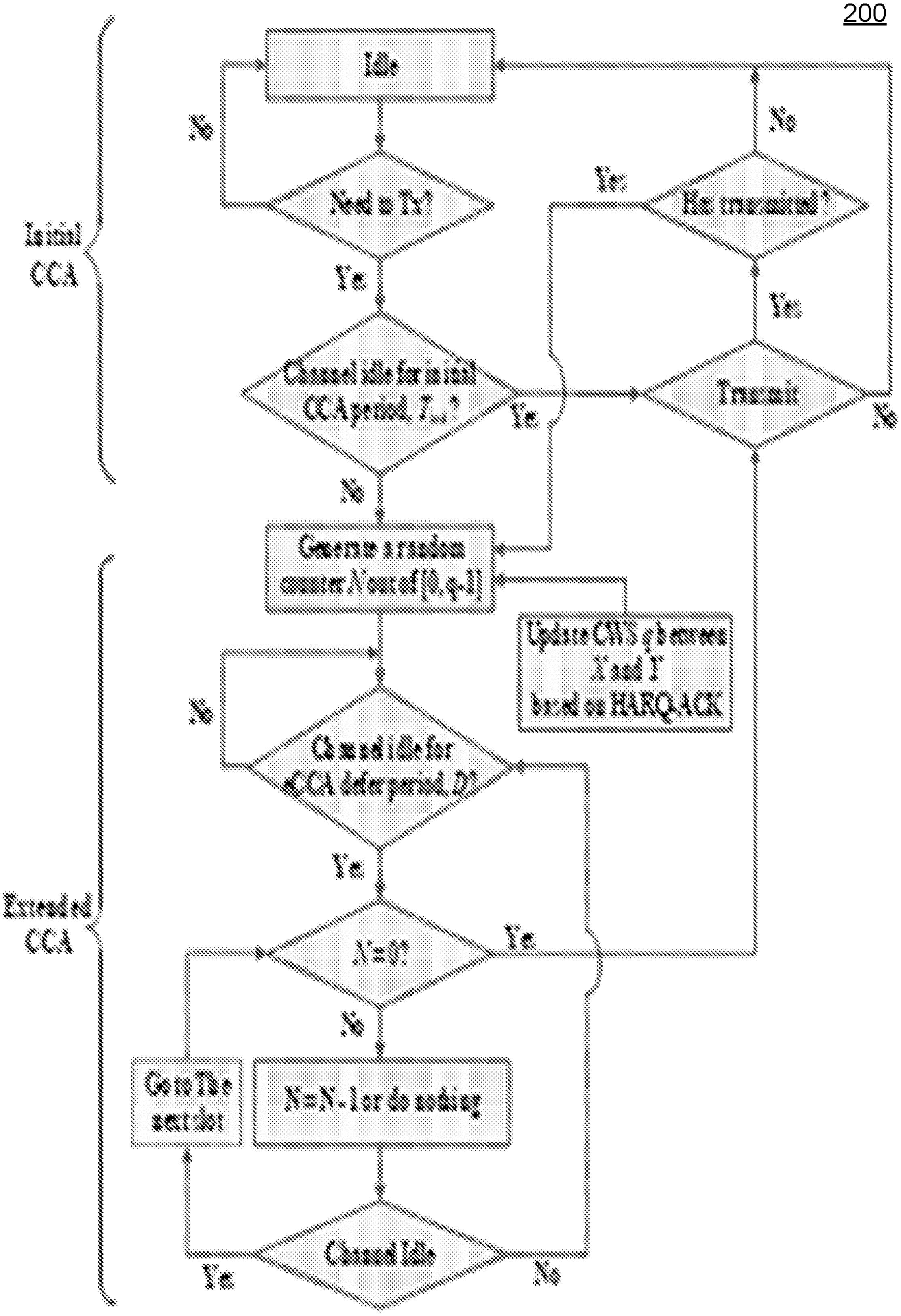
FIG. 2 shows an example LAA Downlink LBT Approach.

FIG. 2 shows an example LAA downlink LBT approach 200. The variables of LBT procedure depend on priority of traffic. Also note that the counter Nis impacted by the HARQ process. If more than 80% of all transmissions in reference subframe k are NACK/DTX, CW is incremented to the next possible value. For example, for priority class 3, if CW is initially 15, the next value would be 31 as per the allowed CW sizes shown in Table 2 for downlink or Table 3 for uplink.

TABLE 2

Channel Access Priority Class (CAPC) for Downlink Channel Access

| Channel Access Priority Class (p) | $m_p$ | $CW_{min, p}$ | $CW_{max, p}$ | $T_{m\ cot, p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

TABLE 3

Channel Access Priority Class (CAPC) for UL Channel Access

| Channel Access Priority Class (p) | $m_p$ | $CW_{min, p}$ | $CW_{max, p}$ | $T_{ulm\ cot, p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulm\ cot, p}$ = 10 ms if the higher layer parameter absenceOfAnyOtherTechnology-r14 or absenceOfAnyOtherTechnology-r16 is provided, otherwise, $T_{ulm\ cot, p}$ = 6 ms.
NOTE 2:
When $T_{ulm\ cot, p}$ = 6 ms it may be increased to 8 ms by inserting one or more gaps. The minimum duration of a gap may be 100 us. The maximum duration before including any such gap may be 6 ms.

The Discovery Reference Signals (DRS) is a set of signals that includes the Primary Synchronization Signal, the Secondary Synchronization Signal, the Cell-specific Reference Signal, and the Channel State Information Reference Signal (if configured). DRS transmission is utilized in LAA for cell detection, synchronization, and radio resource management (RRM) measurement. Similar to the Rel-12 DRS, LAA DRS can be transmitted within a periodically occurring time window called the DRS measurement timing configuration (DMTC) occasion. However, to reduce a collision probability, the transmission of DRS is also subject to LBT. DRS can be transmitted following a single idle observation interval of at least 25 μs. To compensate for potential DRS transmission blocking due to LBT and increase the probability of successful DRS transmission, the network is allowed to attempt DRS transmission in any subframe within the DMTC occasion.

Channel selection for LAA is important for coexistence with other RATs such as Wi-Fi. For example, LAA may avoid frequencies that are more congested with Wi-Fi [access points/station (APs/STAs)] and RRM measurements are critical for this purpose. In legacy LTE operation, Reference Signal Received Power (RSRP), Received Signal Strength Indicator (RSSI), and Reference Signal Received Quality (RSRQ) are specified and only RSRP and RSRQ can be reported to an eNB by a WTRU. RSSI can serve as a metric for the interference strength on a carrier, and it is possible to infer RSSI from RSRP and RSRQ reports. However, if the DRS is not transmitted by the eNB on a carrier, for example due to LBT, RSRP and RSRQ reports would not be available. As a result, RSSI measurement reports along with time information about when the measurements were made by a WTRU are useful for hidden node detection at an LAA eNB. The absolute RSSI level observed by a WTRU as well as statistics of RSSI distribution during a measurement period are useful to provide a more complete picture of the load on a carrier and assist in hidden node detection by correlating measurements made by one or more WTRUs with those made by the eNB. As a result, LAA has introduced new measurements of average RSSI and channel occupancy (percentage of time that RSSI was observed above a configured threshold) for RRM reports. To this end, a RSSI measurement timing configuration (RMTC) can be configured to indicate a measurement duration (e.g. 1-5 ms) and period between measurements (e.g. {40, 80, 160, 320, 640} ms).

LBT is also used for uplink channel access. Rel-14 eLAA supports two types of uplink channel access procedures:

Type 1 uplink channel access procedure is analogous to the one for downlink channel access in Rel-13 LAA where a series of slots for CCA have to be sensed as clear on a channel before a WTRU can transmit on the channel. The number of slots is generated from a CWS that is adaptively adjusted by a WTRU. Four types of priority classes are also supported in the uplink; however, particular values for MCOT and CWS are different from the ones in downlink.

Type 2 uplink channel access procedure is analogous to the one for Discovery Reference Signals (DRS) transmission where a WTRU performs CCA over only a short period. The duration of the period is fixed to be at least 25 μs.

For transmission of a Physical Uplink Shared Channel (PUSCH), an eNB indicates to a WTRU the type of channel access procedure through an uplink grant scheduling the PUSCH transmission.

In general, type 1 uplink channel access procedure is utilized to initialize a MCOT containing PUSCH transmission, while type 2 uplink channel access procedure is utilized within the MCOT for resuming a suspended transmission or for changing the transmission direction from downlink to uplink In addition, in order to meet various regulatory requirements, there was a need for a new uplink waveform for eLAA. For example, the European Telecommunication Standardization Institute (ETSI) mandates that the occupied channel bandwidth, defined by 3GPP to be the bandwidth containing 99% of the power of the signal, may be between 80% and 100% of the declared nominal channel bandwidth. 3GPP adapted the principle of block interleaved frequency division multiplex (B-IFDMA) for eLAA.

COT sharing is a mechanism (enabled by ETSI-BRAN) wherein one device acquires a COT using usual CAT4 LBT and another device shares it using a 25 μs LBT with a gap provided the amount of transmission does not exceed the MCOT limit for the given priority class.

For eNB to WTRU COT sharing, the purpose of this mechanism was to allow LAA UL in which an eNB must send a grant to the WTRU before it can transmit on the UL and the delay between the grant and the corresponding UL transmission is at least 4 ms. For a WTRU to use the shared COT for Autonomous UL (AUL) transmissions, the following rule applies: the eNB may indicate using the 'UL duration and offset' field and 'COT sharing indication for AUL' field that a WTRU configured with autonomous UL may perform a Type 2 channel access procedure for autonomous UL transmissions(s) including PUSCH on a channel in subframe n when:

- the eNB has transmitted on the channel according to an channel access procedure. (that is a Type 1 DL channel access procedure);
- eNB acquired the channel using the largest priority class value; and
- eNB transmission includes PDSCH.

For WTRU to eNB COT sharing, it has been proposed that any COT acquired by a WTRU for Autonomous UpLink (AUL) transmission, if not fully exhausted, should be allowed to be shared with the eNB who in turn can use it for transmission of control or data to any WTRU with a pause and just 25 μs LBT as long as it transmits for the minimum duration required to transmit data of equal or higher priority. In the end however, the conditions for an eNB to share a COT initiated by a WTRU are much more restrictive:

For the case where an eNB shares a channel occupancy initiated by a WTRU, the eNB may transmit a transmission that follows an autonomous PUSCH transmission by the WTRU as follows: If 'COT sharing indication' in AUL-UCI in subframe n indicates '1', an eNB may transmit a transmission in subframe n+X, where X is subframeOffsetCOT-Sharing, including PDCCH but not including PDSCH on the same channel immediately after performing a Type 2A DL channel access procedure, if the duration of the PDCCH is less than or equal to duration of two OFDM symbols and it may contain at least AUL-DFI or UL grant to the WTRU from which the PUSCH transmission indicating COT sharing was received.

For SL, transmission resources may be allocated to the WTRU by the gNB (for e.g., NR mode 1 resource allocation) or may be autonomously selected by the WTRU (for e.g., NR mode 2 resource allocation). Autonomous resource selection by the WTRU may be performed randomly or may be based on sensing. The terms WTRU autonomous resource selection, as referred to herein, denotes sensing-based resource selection and may be used interchangeably with mode 2 resource allocation or mode 2 sensing-based resource allocation.

Figure 3:
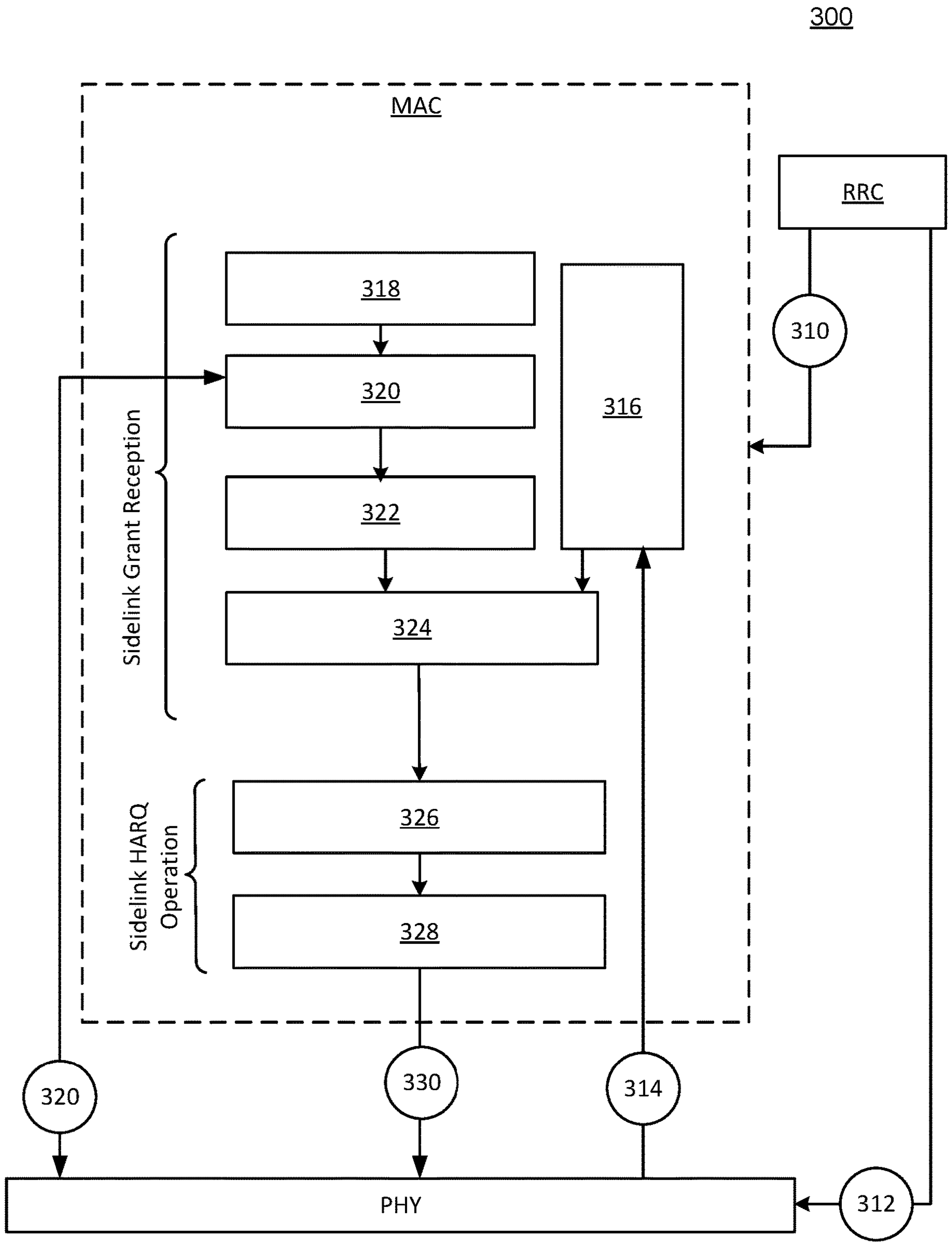
FIG. 3 shows an example sidelink resource allocation overview.

FIG. 3 shows an example process 300 for resource allocation within a WTRU. At step 310, the RRC may configure the MAC entity for sidelink operation. This may include when the MAC entity used resource allocation mode 1 (either dynamic grants or configured grants) or resource allocation mode 2 (either based on sensing or based on random selection). Resource allocation mode 2 based on random selection is targeting exception resource pools; sensing or random access. At step 312, the RRC may configure the PHY entity for sidelink operation. This includes the TX resource pool configuration, as well as mode 1 configuration, and mode 2 configuration. For the latter, the RRC may include the sensing configuration or random access. At step 314, the PHY may inform the MAC layer when it receives DCI in the PDCCH occasion. The Sidelink Grant Reception determines the sidelink grant for WTRU. At the MAC layer, the transmission opportunities for these sidelink grants are referred to as PSCCH/PSSCH durations.

If configured for mode 1 Operation, then in step 316 the Sidelink Grant Reception determines if the PDCCH occasion has a sidelink grant. This is determined if the DCI is destined for SL-RNTI or SLCS-RNTI. The former is used for dynamic grants, while the latter is used for configured grant Type 2—namely activation, deactivation, or to schedule a retransmission for a Configured grant transmission If configured for mode 2 Operation, the WTRU follows steps 318, 320, and 322.

At step 318, in mode 2, the transmitting WTRU may continually evaluate which PSCCH/PSSCH durations may be used for a single MAC PDU transmission, for multiple MAC PDU transmissions, and the potential retransmissions of these MAC PDUs. To accomplish this, the Sidelink Grant Reception continually evaluates if TX resource (re) selection is necessary. A number of triggers may tell the MAC layer that it needs to find new PSCCH/PSSCH durations. For example, there is a reconfiguration of the Tx resource pools, there is new traffic that has no opportunity to be transmitted on sidelink, the PSCCH/PSSCH durations have not been used for an extended period of time, etc. At step 320, in order to assist the Sidelink Grant Reception, the MAC layer may ask the PHY layer to provide a set of potential resources. These are provided by the PHY layer (based on sensing). This is referred to as the Candidate Resource set. Ask PHY for list of candidate resources (based on sensing or based on RRC configuration from RRC (for exception resource pool). At step 322, the Sidelink Grant Reception may randomly select from this provided set of potential resources—in order to satisfy the transmission of one MAC PDU, multiple MAC PDUs, and the potential retransmissions of these MAC PDUs. The selected set denote the PSCCH/PSSCH durations for transmission.

At step 324, at the PSCCH/PSSCH duration, the Sidelink Grant Reception may select the MCS for the sidelink grant, and then may send the sidelink grant, the selected MCS, and the associated HARQ information to the Sidelink HARQ Entity for this PSSCH duration.

At step 326, the Sidelink HARQ entity, may obtain the MAC PDU from a Multiplexing and Assembly process. This is where Logical Channel Prioritization (LCP) occurs. The Sidelink HARQ entity, may also determine the sidelink control information for MAC PDU, and then may deliver the MAC PDU, the sidelink grant, and the Sidelink transmission information to the associated Sidelink process At steps 328 and 330, the Sidelink Process, at the appropriate PSCCH/PSSCH duration, may notify the PHY to transmit SCI, then may notify the PHY to generate a transport block transmission. If HARQ is enabled, Sidelink Process also notifies the PHY to monitor PSFCH In order to allow sidelink operations over unlicensed bands, the following areas need to be addressed:

- What is the overall resource allocation mechanism in unlicensed bands?
- What is the impact of the unlicensed band and LBT on the MAC procedures?

In licensed bands, when the MAC layer asks the physical layer to generate a transmission, the MAC layer assumes that the transmission may be made by the physical layer. The MAC layer takes a number of actions based on this assumption. In unlicensed bands, the assumption no longer holds, as the physical layer has to share the channel with other users and systems, and the transmission may lead to LBT failures. This results in the following issues:

Issue 1: Consistent LBT failure on SL: A sidelink WTRU may have multiple PC5 RRC connections to other peer WTRUs. In addition, the WTRU may be transmitting SL groupcast traffic and SL broadcast traffic. Any or all of these transmissions may be over unlicensed spectrum. LBT failures may occur for each of these transmissions. In some cases, the WTRU may suffer from consistent LBT failures. However, the notion of consistent LBT failures is not defined for sidelink operation. For example, the granularity of the LBT failure monitoring needs to be defined. Is this monitoring per source (TX) WTRU, per PC5 RRC connection, per SL groupcast transmission, per SL broadcast transmission, per specific cast type, per destination (RX) WTRU, etc. The actions of the WTRU upon declaring consistent LBT failure are also dependent on the selected granularity.

Issue 2: Impact to PSFCH Reception: In Rel. 16, after the MAC layer instructs the PHY layer to transmit the transport block, and if the HARQ feedback is enabled for this MAC PDU, the MAC layer also instructs the PHY layer to monitor PSFCH and perform PSFCH reception. In unlicensed bands, if the PHY layer transmission fails the LBT, the MAC PDU may not be transmitted and no HARQ feedback is expected for this sidelink transmission. Sidelink operation needs to take into account that no feedback is expected in these cases.

Issue 3: Impact on Sidelink RLF Declaration: The HARQ-based Sidelink RLF detection procedure is used to detect Sidelink RLF based on a number of consecutive DTX on PSFCH reception occasions for a PC5-RRC connection. PSFCH reception occasions are defined to occur when HARQ feedback has been enabled for the MAC PDU and the MAC layer generates a SL transmission. In such a case, the physical layer is instructed to monitor PSFCH for this SL transmission and perform PSFCH reception. However, the generated SL transmission at the MAC layer may result in an LBT failure. The PDU may not be transmitted on the SL, and no PSFCH may be generated by the RX WTRU. The TX WTRU may interpret this as a DTX, and this may trigger unwanted SL RLF declarations.

Issue 4: Impact on Resource Reselection Counter: If the MAC entity SL process is configured to perform transmissions of multiple MAC PDUs with Sidelink resource allocation mode 2, the process maintains a counter SL_RESOURCE_RESELECTION_COUNTER. This counter is initially set when the MAC entity is first triggered to perform a TX resource (re-)selection. The counter may be decremented when the Sidelink process generates a transmission. Namely if this transmission corresponds to the last transmission of the MAC PDU. As with the RLF declaration, the generated SL transmission at the MAC layer may result in an LBT failure. In such a case, the PDU may not be transmitted on the SL, and the SL_RESOURCE_RESELECTION_COUNTER should not be decremented.

Issue 5: Impact on HARQ buffer in Sidelink Process: A sidelink configured grant may be configured with a maximum number of transmissions (sl-MaxTransNum). When the Sidelink process generates a transmission and this transmission corresponds to the last transmission of the MAC PDU, the MAC entity checks if the maximum number of transmission attempts have been made for this MAC PDU.

If so, the MAC entity assumes that the MAC PDU has been repeated the maximum number of times, and it flushes the HARQ buffer of the associated Sidelink process. As with the RLF declaration, the generated SL transmission at the MAC layer may result in an LBT failure. In such a case, the MAC PDU may not have been transmitted the maximum number of times, and the HARQ buffer should not be flushed.

Issue 6: Impact on SL UL Prioritization: A number of prioritization rules exist to allow the WTRU to send sidelink traffic over uplink traffic. In Rel. 16, the rule is based on:

1> if the MAC entity is not able to perform this sidelink transmission simultaneously with all uplink transmissions at the time of the transmission, and 1> if uplink transmission is neither prioritized (e.g., prioritized by an upper layer); and 1> if sl-Prioritization Thres is configured and if the value of the highest priority of logical channel(s) or a MAC CE in the MAC PDU is lower than sl-Prioritization Thres.

One issue with the above is that in some cases, the prioritized SL transmission may not be sent since it leads to an LBT failure. In such cases, it would have been more efficient to transmit the uplink traffic. Prioritization rules may need to be modified to take into account the potential LBT failures. Although the example shows LBT failure on the sidelink, a similar problem exists in cases that LBT failure may also occur on the uplink.

Issue 7: Impact on SL DRX Procedure: As of Rel. 17, peer WTRUs involved in SL unicast communication may have a SL DRX configuration. This configuration provides SL DRX configuration to a RX WTRU. For proper SL communication the TX WTRU and RX WTRU must have the same understanding of the RX WTRU Active time—otherwise the TX WTRU may send a transmission to the RX WTRU, while the RX WTRU is in inactive mode, and not monitoring SL transmissions. The triggers to start and stop the majority of the timers that control the Active time are based on transmissions and receptions. As LBT failures impact transmissions, the RX WTRU Active time maintained by the TX WTRU and RX WTRU, may not be the same.

Issue 8: Impact on SL CSI Reporting: The Sidelink Channel State Information (SL-CSI) reporting procedure is used to provide a peer WTRU with sidelink channel state information. RRC configures a sl-LatencyBoundCSI-Report, which is maintained for each PC5-RRC connection.

The MAC entity maintains a sl-CSI-ReportTimer for each pair of the Source Layer-2 ID and the Destination Layer-2 ID corresponding to a PC5-RRC connection. sl-CSI-ReportTimer is used for a SL-CSI reporting WTRU to follow the latency requirement signaled from a CSI triggering WTRU. The value of sl-CSI-ReportTimer is the same as the latency requirement of the SL-CSI reporting in sl-LatencyBoundCSI-Report configured by RRC. In Rel. 16, the MAC entity starts the timer when triggered by a request from the peer WTRU. The MAC entity stops the timer if it has SL resources allocated for new transmission and the SL-SCH resources can accommodate the SL-CSI reporting MAC CE and its subheader as a result of logical channel prioritization. The assumption being that the WTRU may send the SL-CSI MAC CE to the requesting peer WTRU. However, in unlicensed bands, the WTRU may have an LBT failure, and the SL-CSI MAC CE may not be sent. The SL CSI reporting procedure needs to be enhanced to take into account the potential LBT failure.

Issue 9: Impact on SL Scheduling Request Procedure: When LBT failures occur:

- Failed SR transmissions may not initiate a Random Access procedure;
- The SR Prohibit timer may be set even when there was no SR transmission;
- The SR Transmission Counter may reach the maximum number of transmissions without allowing for a sufficient number of SR transmissions needed for successful SR transmission;
- SR Pending may be cleared even when there is no SR transmission.

Issue 10: Impact on SL Buffer Status Reporting Procedure: When LBT failures occur, when there may be UL-SCH resources available, BSR may not be transmitted, and an SR may not be triggered.

In the embodiments described herein, the terms band and spectrum may be used interchangeably. Furthermore, the embodiments described herein may refer to operation over unlicensed bands or spectrum. It should be understood that these embodiments are also applicable to any shared spectrum where coexistence may rely on a listen-before-talk like mechanism.

In accordance with one embodiment, WTRUs may be configured with the necessary parameters to operate over the unlicensed band. The configuration may be provided through a preconfiguration, a configuration through system information, a configuration through dedicated signaling from a serving base station, or from a peer WTRU.

In the following, use is made of the terms: LBT failure, LBT success, LBT attempt, and LBT state.

An LBT failure may refer to a transmission attempt over unlicensed spectrum that results in a failure. The transmission cannot be made as the channel is being used by another user. The other user may be from the same system or different system, using the same technology or different technology. An LBT failure applies to a given transmission.

An LBT success may refer to a transmission attempt over unlicensed spectrum that results in a success. The transmitter has sensed the channel and determined that no other user is using the channel. The other user may be from the same system or different system, using the same technology or different technology. An LBT success applies to a given transmission.

An LBT attempt may refer to a transmission attempt to access a channel. The result of an LBT attempt is either an LBT success or LBT failure. An LBT attempt applies to a given transmission.

An LBT state may refer to the monitored state of the channel that is to be used for transmission, A channel may be in at least 2 states: busy or free. When the LBT state of a channel is "busy," transmission attempts may result in LBT failures. When the LBT state of a channel is "free," transmission attempts may result in LBT successes. The LBT state may be continually available to the MAC layer.

Note that in the following described embodiments, it is assumed that the MAC layer enhancements/changes rely on LBT events for individual transmission attempts. So, each attempt results in an LBT failure or LBT success, and actions are based on the LBT success or LBT failure. It should be understood that these enhancements/changes may also apply from the perspective of a number of transmission attempts. For example, an action may be performed when the number of LBT successes crosses a threshold or the number of consecutive LBT successes crosses a threshold.

Or an action may be performed when the number of LBT failures crosses a threshold or the number of consecutive LBT failures crosses a threshold. For another example, an action may be performed when the ratio of LBT successes exceeds a threshold that may be (pre-) configured or predefined. Or an action may be performed when the ratio of LBT failures exceeds another threshold that may be (pre-) configured or predefined. It should also be understood that enhancements/changes may also apply from the perspective of LBT state. So, an action may occur if the MAC layer determines that the LBT state is FREE (or BUSY).

EMBODIMENTS

1. A WTRU involved in one or more sidelink transmissions that monitors the channel for LBT events and evaluates whether to determine consistent LBT failure and evaluates whether to take some corrective action as a result of the LBT events.

2. The WTRU of embodiment 1, wherein the LBT events may be LBT failures, LBT successes, LBT attempts.

3. The WTRU of embodiment 1, wherein the WTRU monitors LBT events at the granularity of one or more of the following: per LBT type, per band, per PC5 RRC connection, per cast type, per destination layer 2 ID, per source Layer 2 UID, per QoS profile, per sidelink service, per resource pool, per traffic type, per beam, per carrier.

4. The WTRU of embodiment 1, wherein the WTRU may determine an LBT state as BUSY, when the channel is being used by another terminal.

5. The WTRU of embodiment 1, wherein the WTRU may determine an LBT state as FREE, when the channel is not being used by another terminal.

6. The WTRU of embodiment 1, wherein the WTRU may determine an LBT state as PENDING, when the WTRU may not determine if the channel is being used by another terminal.

7. The WTRU of embodiment 4, 5, or 6, wherein the determining is aperiodic, on demand, or performed continually.

8. The WTRU of embodiment 1, wherein the LBT events are aperiodic, occurring before the beginning of every transmission slot.

Related to Determining Consistent LBT Failure:

9. The WTRU of embodiment 1, wherein the evaluation to determine consistent LBT failure, results in WTRU declaring a consistent LBT failure.

10. The WTRU of embodiment 9, wherein the declaration is based on number of LBT failures, number of consecutive LBT failures, percentage of LBT events crossing a threshold.

11. The WTRU of embodiment 10, wherein the crossing a threshold is over an observation window (for example sl_lbt-FailureDetectionTimer).

12. The WTRU of embodiment 9, wherein the declaration of consistent LBT failure may be determined at the granularity of one or more of the following: per LBT type, per band, per PC5 RRC connection, per cast type, per destination layer 2 ID, per source Layer 2 UID, per QoS profile, per sidelink service, per resource pool, per traffic type, per beam, per carrier.

13. The WTRU of embodiment 9, wherein as a result of the consistent LBT failure declaration, the WTRU performs an LBT recovery procedure.

14. The WTRU of embodiment 13, wherein the LBT recovery procedure involves informing the one or more peer WTRUs impacted by the consistent LBT failure through an indication.

15. The WTRU of embodiment 14, wherein the indication is sent over the PHY layer on the PSFCH.

16. The WTRU of embodiment 14, wherein the indication is sent over the MAC layer in a new MAC CE.

17. The WTRU of embodiment 16, wherein the MAC CE has an assigned high priority.

18. The WTRU of embodiment 14, wherein the indication is part of an LBT Report, that includes information on LBT Failures and/or Successes over a period of time; LBT timing information such as CCA time periods (such as the CCA sensing time), selected MCOT and/or CWS period; the MAC procedure that triggered the LBT report.

19. The WTRU of embodiment 14, wherein the informing the peer WTRUs is triggered by one or more of the following: the count of LBT Failures reaches a threshold, when LBT events on MAC procedures results in a change of operation of that procedure, when a periodic timer expires.

20. The WTRU of embodiment 13, wherein the LBT recovery procedure involves informing higher layers.

21. The WTRU of embodiment 13, wherein the LBT recovery procedure involves informing the serving gNB about the consistent LBT failure through an LBT report.

22. The WTRU of embodiment 21, wherein the LBT report includes one or more of the following information: band of failure, destination layer 2 ID, cast type, count of LT failures or LBT success, MAC procedure that triggered the LNT report, LBT timing information such as CCA time periods (such as the CCA sensing time), selected MCOT and/or CWS period.

23. The WTRU of embodiment 21, wherein the informing the peer WTRUs or serving gNB is triggered by one or more of the following: the count of LBT Failures reaches a threshold, when LBT events on MAC procedures results in a change of operation of that procedure, when a periodic timer expires.

24. The WTRU of embodiment 13, wherein the LBT recovery procedure involves declaring a SL RLF for the sidelink.

25. The WTRU of embodiment 13, wherein the LBT recovery procedure involves moving the sidelink transmission to a new unlicensed band.

Related to Taking Some Corrective Action as a Result of the LBT Events:

26. The WTRU of embodiment 1, wherein the evaluation to determine whether to take some corrective action as a result of the LBT events, involves modifying a MAC procedure.

27. The WTRU of embodiment 26, wherein the MAC procedure is the Monitoring of PSFCH Procedure.

28. The WTRU of embodiment 27, wherein as part of the Monitoring of PSFCH Procedure, the WTRU instructs the PHY layer to monitor PSFCH for a sidelink transmission and perform PSFCH reception, only if LBT is successful for the sidelink transmission.

29. The WTRU of embodiment 26, wherein the MAC procedure is the SL RLF Declaration Procedure.

30. The WTRU of embodiment 29, wherein as part of the SL RLF Declaration Procedure, the WTRU increments the count of HARQ DTX (numConsecutiveDTX) for each PSFCH reception occasion associated to the PSSCH transmission, only if LBT success was detected for the PSSCH transmission.

31. The WTRU of embodiment 29, wherein as part of the SL RLF Declaration Procedure, the WTRU receives assistance information from the peer WTRU sending the HARQ feedback, which includes information related to LBT successes.

32. The WTRU of embodiment 29, wherein as part of the SL RLF Declaration Procedure, the WTRU scales the configured timers and counters for SL RLF determination, by a factor K, if the SL transmissions are over unlicensed spectrum.

33. The WTRU of embodiment 29, wherein as part of the SL RLF Declaration Procedure, the WTRU may be configured with separate timers and counters for licensed spectrum and unlicensed spectrum.

34. The WTRU of embodiment 26, wherein the MAC procedure is the Resource Reselection Procedure.

35. The WTRU of embodiment 34, wherein as part of the Resource Reselection Procedure, the WTRU generates a transmission according to a stored sidelink grant, and decrements SL_RESOURCE_RESELECTION_COUNTER by 1 if this transmission corresponds to the last transmission of the MAC PDU and LBT success has been detected for this transmission.

36. The WTRU of embodiment 34, wherein as part of the Resource Reselection Procedure, the WTRU performs a SL resource reselection, when consistent LBT failure is declared.

37. The WTRU of embodiment 26, wherein the MAC procedure is HARQ flushing Procedure.

38. The WTRU of embodiment 37, wherein as part of the HARQ flushing Procedure, the WTRU maintains a count of the number of transmissions of a MAC PDU, and only includes in this count those transmissions of the MAC PDU for which the physical layer has determined LBT success.

39. The WTRU of embodiment 37, wherein as part of the HARQ flushing Procedure, the WTRU flushes the HARQ buffer of the associated Sidelink process, when consistent LBT failure is declared.

40. The WTRU of embodiment 26, wherein the MAC procedure is UL/SL Prioritization Procedure.

41. The WTRU of embodiment 40, wherein as part of the UL/SL Prioritization Procedure, the WTRU PHY layer provides an LBT state indication to the MAC layer, and the MAC layer uses this indication as part of the UL/SL Prioritization Procedure.

42. The WTRU of embodiment 40, wherein if the SL LBT state is known to be BUSY and the UL LBT state is known to be FREE, the WTRU should not prioritize the SL transmission, even if all the other conditions for the SL prioritization are met.

43. The WTRU of embodiment 26, wherein the MAC procedure is SL DRX Operation.

44. The WTRU of embodiment 43, wherein as part of SL DRX Operation, a TX WTRU only start the inactivity timer when the TX WTRU transmits a MAC PDU in a configured sidelink and the transmission results in an LBT success (or lack of LBT failure).

45. The WTRU of embodiment 26, wherein the MAC procedure is the SL CSI Reporting Procedure.

46. The WTRU of embodiment 45, wherein as part of SL CSI Reporting Procedure, the CSI reporting WTRU check whether the LBT was a success for the transmission of the CSI report, and if not (i.e., LBT failed), the CSI reporting WTRU should not cancel a triggered SL-CSI report.

47. The WTRU of embodiment 45, wherein as part of SL CSI Reporting Procedure, when WTRU chooses a HARQ process, the WTRU should prioritize the "pending" HARQ process that have MAC PDUs that carry a SL CSI reports.

48. The WTRU of embodiment 45, wherein as part of SL CSI Reporting Procedure, the CSI report includes an indication of when the CSI report calculation was made.

49. The WTRU of embodiment 26, wherein the MAC procedure is the Scheduling Request Procedure for sidelink.

50. The WTRU of embodiment 49, wherein as part of the Scheduling Request Procedure for sidelink, the SR Prohibit Timer should only be stopped when LBT success is determined for BSR transmission.

An LBT monitoring procedure may be performed in accordance with one embodiment, which can be used in combination with any of the other embodiments described herein. For example, a WTRU may have multiple concurrent sidelinks. The WTRU may have one or more sidelinks to a peer WTRU, as well as sidelinks to other WTRUs, as well as a Uu link to a gNB. The other WTRUs may have functionality that allows these to behave as controlling entities, scheduling entities, or relay entities (or simply relays). Some of these sidelinks may be over unlicensed spectrum, some over licensed spectrum, and some over ITS spectrum. In addition, the sidelinks over unlicensed spectrum may be over multiple unlicensed bands. For example, the 5 GHz band, the 6 GHz band, the 60 GHz band, etc.

A WTRU using unlicensed spectrum may perform LBT monitoring, which involves monitoring a number of LBT events. The LBT events may be LBT failures, LBT successes, LBT attempts. As a result of these LBT events, the WTRU may take certain WTRU actions, such as to declare consistent LBT failure, modify a MAC procedure, etc. The WTRU actions may be based on individual LBT events or based on a number of monitored LBT events in an observation window. In addition, the WTRU actions may be based on a single LBT event, or a combination of LBT events. For example, a WTRU action may be performed when the WTRU detects 90% of the LBT attempts result in an LBT failure, within an observation window of K msec.

The granularity of monitoring may be for one or a combination of the following:

Per LBT type: For example, based on the existing types, this may include: Type 1, Type 2, Type 2A, Type 2B, Type 2C. A WTRU may monitor how many LBT failures occur for Type 1 attempts. Additionally, this may be for any new types defined.

Per band: the WTRU may have sidelinks on different unlicensed bands and the monitoring may be per band. For example, monitoring over the 5 GHz band may be different from the monitoring over the 60 GHz band.

Per PC5 RRC connection: The WTRU may monitor LBT events for each PC5 RRC connection (from a source L2 ID to a destination Layer 2 ID).

Per cast type: The WTRU may monitor LBT events for each cast type. For example, it may perform the LBT monitoring for all broadcast sidelink transmissions, or all multicast sidelink transmissions, or all unicast sidelink transmissions.

Per destination layer 2 ID: The WTRU may monitor LBT events for a specific destination layer 2 ID. This may be useful for sidelink transmissions to a specific groupcast group, which share the same destination layer 2 ID.

Per source Layer 2 ID: The WTRU may monitor LBT events for a source layer 2 ID.

Per QoS profile: The WTRU may monitor LBT events for a specific QoS profile—so that all sidelinks having the same or similar profile may be monitored together.

Per sidelink service: The WTRU may monitor LBT events per sidelink service.

Per resource pool: The WTRU may monitor the LBT events for a specific resource pool or group of resource pools. For example, a WTRU may be configured with multiple TX resource pools. These resource pools may be in one SL BWP or over multiple SL BWPs. Some of the TX resource pools may be configured as "active", and may be used for sidelink transmissions, while others may be configured as "inactive" and are not used for sidelink transmissions. The WTRU may be configured to monitor LBT events for each of these TX resource pools. The WTRU may have a different configuration for the monitoring of "active" and "inactive" TX resource pools.

Per traffic type: The WTRU may monitor the LBT events for a specific traffic type such as for user plane data, control plane data, sidelink HARQ feedback, etc.

Per beam: The WTRU may monitor the LBT events in omni-direction, or the WTRU may monitor the LBT events in each beam. For example, a beam may be QCL-ed with one SL reference signal, e.g., SL-SSB, or SL-CSI-RS, SL DMRS, etc.

Per carrier: The WTRU may monitor the LBT events for a specific carrier, for example in the carrier aggregation case.

The LBT events may be determined at any layer of the protocol stack (PHY, MAC, RLC, PDCP, RRC). In one example, the LBT event is determined at the PHY layer and an indication of the LBT event is sent to the higher layers (such as the MAC or RRC).

The WTRU may monitor the LBT events and make certain decisions regarding LBT state (busy, free, etc.). For example, the WTRU may monitor the state of a channel. If the channel is found to be busy (for example energy detection suggests another user is using the channel) the WTRU may indicate that the LBT state is BUSY. Alternatively, if the channel is found to be free (for example energy detection suggests no other user is using the channel) the WTRU may indicate that the LBT state is FREE. Alternatively, if the WTRU is not able to assess if the channel is busy or free (for example if not enough measurements are available) the WTRU may indicate that the LBT state is PENDING. The LBT state may be determined continually, for example it can be provided from the physical layer to the upper layers through a primitive. Alternatively, it can be provided upon aperiodically, for example before the beginning of every transmission slot. As another alternative it can be provided upon demand, for example the MAC layer may ask the physical layer to assess the LBT state. As another alternative it may be provided based on the condition(s) and/or triggering, for example a certain condition or combination of conditions may autonomously trigger the physical layer for access of LBT state.

A consistent LBT failure determination procedure may be performed in accordance with one embodiment, which can be used in combination with any of the other embodiments described herein. For example, WTRU actions to determine consistent LBT failure may include monitoring the LBT events and determining when the total number of LBT failure events crosses a threshold. This may be for an observation window. Alternatively, the consistent LBT failure may include monitoring the LBT events and determining when a consecutive number of LBT failure events crosses a threshold. Alternatively, the consistent LBT failure may include monitoring the LBT events and determining when a certain percentage of LBT events occur. For example, when 90% of the LBT events result in an LBT failure. The consistent LBT failure may be determined at any layer of the protocol stack (PHY, MAC, RLC, PDCP, RRC). In one preferred alternative, the consistent LBT failure is determined at the MAC layer based on indications of LBT events from the PHY layer. The granularity of the consistent LBT failure determination may be for one or a combination of the following:

Per LBT type: For example, based on the existing types, this may include: Type 1, Type 2, Type 2A, Type 2B, Type 2C. A WTRU may determine consistent LBT failure per Type 1 attempts. Additionally, this may be for any new types defined.

Per band: the WTRU may have sidelinks on different unlicensed bands and the monitoring may be per band. For example, monitoring over the 5 GHz band may be different from the monitoring over the 60 GHz band.

Per PC5 RRC connection: The WTRU may determine consistent LBT failure for each PC5 RRC connection (from a source L2 ID to a destination Layer 2 ID).

Per cast type: The WTRU may determine consistent LBT failure for each cast type. For example, it may determine consistent LBT failure for all broadcast sidelink transmissions, or all multicast sidelink transmissions, or all unicast sidelink transmissions Per destination layer 2 ID: The WTRU may determine consistent LBT failure for a specific destination layer 2 ID. This may be useful for sidelink transmissions to a specific groupcast group, which share the same destination layer 2 ID.

Per source Layer 2 ID: The WTRU may determine consistent LBT failure for a source layer 2 ID.

Per QoS profile: The WTRU may determine consistent LBT failure for a specific QoS profile—so that all sidelinks having the same or similar profile may be monitored together.

Per sidelink service: The WTRU may determine consistent LBT failure per sidelink service.

Per resource pool: The WTRU may determine consistent LBT failure for a specific resource pool or group of resource pools. For example, a WTRU may determine consistent LBT failure for multiple TX resource pools. These resource pools may be in one SL BWP or over multiple SL BWPs. Some of the TX resource pools may be configured as "active", and may be used for sidelink transmissions, while others may be configured as "inactive" and are not used for sidelink transmissions. The WTRU may be configured to determine consistent LBT failure for each of these TX resource pools. The WTRU may have a different configuration for the determination of consistent LBT failure of "active" and "inactive" TX resource pools.

Per traffic type: The WTRU may determine consistent LBT failure user plane data, control plane data, sidelink HARQ feedback.

Per beam: The WTRU may determine consistent LBT failure in omni-direction, or the WTRU may monitor the LBT events in each beam. For example, a beam may be QCL-ed with one SL reference signal, e.g., SL-SSB, or SL-CSI-RS, SL DMRS, etc.

Per carrier: The WTRU may determine consistent LBT failure for specific carrier, for example in the carrier aggregation case.

Note that the granularity of the LBT monitoring may be different from the granularity of the consistent LBT failure. So, for example, the LBT events may be monitored at the granularity of a PC5 RRC connection, and the consistent LBT failure may be declared per band.

A typical realization for the determination of the consistent SL LBT failure is shown below (from TS 38.321):

The MAC entity may be configured by RRC with a consistent SL LBT failure recovery procedure. Consistent SL LBT failure may be configured to be detected per SL resource pool per band, per carrier, per traffic type, per cast type, per LBT type, per PC5 RRC connections, per source L2 ID, per destination Layer 2 ID, per sidelink service, per QoS profile, per beam. Detection is based on counting SL LBT failure indications, for SL transmissions based on the configured granularity, from the lower layers to the MAC entity.
RRC configures the following parameters in the sl__lbt-FailureRecoveryConfig:
- sl__lbt-FailureInstanceMaxCount for the consistent SL LBT failure detection;
- sl__lbt-FailureDetectionTimer for the consistent SL LBT failure detection;
The following WTRU variable is used for the consistent SL LBT failure detection procedure:
- SL__LBT__COUNTER (per configured granularity): counter for SL LBT failure indication which is initially set to 0.
For each configured granularity with sl__lbt-FailureRecoveryConfig, the MAC entity may:
1> if SL LBT failure indication has been received from lower layers:
  2> start or restart the sl__lbt-FailureDetectionTimer;
  2> increment SL__LBT__COUNTER by 1;
  2> if SL__LBT__COUNTER >= sl__lbt-FailureInstanceMaxCount:
    3> trigger consistent SL LBT failure for the configured granularity;
      4> indicate consistent LBT failure to upper layers.
1> if all triggered consistent LBT failures are cancelled for the configured granularity; or
1> if the sl-lbt-FailureDetectionTimer expires; or
1> if sl__lbt-FailureDetectionTimer or sl__lbt-FailureInstanceMaxCount is reconfigured by upper layers:
  2> set SL__LBT__COUNTER to 0.

A consistent LBT failure recovery procedure may be performed in accordance with one embodiment, which can be used in combination with any of the other embodiments described herein. Once a consistent LBT failure is declared, the WTRU may take one or more of the following actions.

In a first action, the WTRU may inform the peer WTRU or peer WTRUs impacted by the consistent LBT failure. The WTRU may send an indication to the peer WTRU(s) that a consistent LBT failure has been detected. This message may be sent via an existing PC5 RRC message, a new PC5 RRC message, a MAC CE, or a PHY layer SCI signal or a PSFCH or PSFCH-like channel.

If PSFCH or PSFCH-like channel is used, sequence-based PSFCH or FDM-based PSFCH may be used to indicate to the peer WTRU(s) that a consistent LBT failure has been detected. For example, two sequences in PSFCH may be used to serve as 1-bit indication for consistent LBT failure detection. Sequence-x in PSFCH may indicate that a consistent LBT failure has been detected. Sequence-y in PSFCH may indicate that a consistent LBT failure has not been detected.

In another example, two separate PSFCHs in frequency domain may be used to serve as 1-bit indication for consistent LBT failure detection. PSFCH #1 may be used to indicate that a consistent LBT failure has been detected. PSFCH #2 may be used to indicate that a consistent LBT failure has not been detected. This may be an efficient and low overhead method for indication if such indication to the peer WTRU(s) that a consistent LBT failure has been detected has small number of bits e.g., one bit or two bits or the like.

Further, a joint sequence-based and FDM-based PSFCH may be used to extend the bit space to two bits or more for consistent LBT failure detection reporting, when a slightly higher number of bits for PSFCH-based indication is needed. For example, if additional assistance information in addition to consistent LBT failure detection are required, the extra bit space may be used to indicate additional assistance information. It is possible the physical layer does some pre-processing to limit the number of primitives signaled between the MAC and PHY layers.

A new LBT MAC procedure may consolidate these LBT indications and generates a Listen Before Talk Report (LBTR) MAC CE which provides information on LBT failures and/or successes over a period of time. In addition to LBT success and/or failure indications, the WTRU physical layer may provide the LBT category to the MAC layer, as well as the LBT timing information to the MAC layer. For example, LBT timing information may include CCA time periods (such as the CCA sensing time), selected MCOT and/or CWS periods. The LBTR may provide LBT failures for the WTRU active as a TX WTRU and a RX WTRU, separately. A WTRU may monitor LBT events for its SL transmissions. When the WTRU is acting as a TX WTRU, and the LBT failures may be referred to as TX WTRU based LBT failures. The peer WTRU communicating with this WTRU may be doing the same.

Information about LBT events at the peer WTRU may also benefit the RX WTRU. In such a case the WTRU is acting as a RX WTRU and the LBT failures are referred to as RX WTRU based LBT failures. When a UE sends an LBTR report, it may include information related to the TX UE based LBT failures as well as the RX UE based LBT failures. TX WTRU based LBT failures are unknown to the peer WTRUs and need to be signaled to maintain MAC procedure coordination. But also, RX WTRU based LBT failures that the WTRU is aware of from the peer WTRU, may be useful to the peer WTRU, since the peer WTRU may not be able to assume what RX WTRU LBT failures, either signaled to the WTRU or otherwise detected by the WTRU, are known to the RX WTRU.

The LBTR procedure may require several triggers to initiate the procedure resulting in cases of transmitting the LBTR. Triggers may include but are not limited to:

LBT Failures reaching a threshold. There may be an RRC configured LBT failure threshold. This threshold may either be a number of LBT failures over a known time period or a number of consecutive LBT failures. These parameters may be configurable since the reporting urgency may be dependent of the type of traffic supported.

When certain effects on other MAC procedures results in a change of operation of that procedure which needs to be known by the peer WTRU for proper operation. For example, any change in DRX operation that effects Active Time or the DRX cycle. In this case the MAC DRX procedure triggers the LBTR.

RRC configured periodic LBTRs.

An LBTR Prohibit timer should also be introduced to limit LBTR frequency.

The LBTR procedure may count LBT failures and/or successes over a configured LBTR Monitoring Period. For example:

If LBT Failure Count is greater than a configured LBT failure Count within a LBTR monitoring period, an LBTR is triggered; or If LBT success count is less than a configured LBT success minimum within a LBTR monitoring period, an LBTR is triggered.

The LBTR procedure may derive the ratio of LBT failures and/or successes over a configured LBTR monitoring period. For example:

- If the ratio of LBT Failure is greater than or equal to a configured or preconfigured LBT failure ratio threshold within a LBTR monitoring period, then an LBTR may be triggered; or
- If the ratio of LBT success count is less than a configured or preconfigured LBT Success ratio threshold within a LBTR monitoring period, then an LBTR may be triggered.

The LBTR procedure may count consecutive LBT failures and/or successes over a configured LBTR monitoring period.

If consecutive LBT Failure Count is greater than a configured consecutive LBT Failure Count within a LBTR Monitoring Period, an LBTR is triggered.

If consecutive LBT Success Count is less than a configured consecutive LBT Success Minimum within a LBTR Monitoring Period, an LBTR is triggered.

When other MAC Procedures trigger an LBTR, this may be by setting an LBTR Pending indication. The LBTR pending indication is later checked during MAC PDU multiplexing assembly to see an LBTR MAC CE is to be built.

The LBTR may include the following information:

- Count of LBT Failures and/or Successes since the last LBTR;
- Number of times LBT Failures or consecutive LBT Failures have exceeded a maximum configured LBT Failure threshold since the last LBTR;
- Number of times LBT Success Count or consecutive LBT Success Count is less than a configured consecutive LBT Success Minimum since last LBTR;
- The MAC procedure that may have triggered the LBTR;
- Time stamp related to when the LBTR PDU is built; or
- CCA, MCOT and/or CWS information.

It should be noted that similar operations may be provided by the PHY layer or RRC layer, and PHY layer or RRC layer signaling may be used to convey similar information to the NB.

The WTRU may attempt to transmit the LBTR on the same channel over which the consistent SL LBT is declared. The SL MAC CE may be assigned a very high priority, so that it is prioritized by the MAC entity, Alternatively, the WTRU may attempt to transmit the LBTR over another channel. The other channel may be over licensed band, or over another resource pool, or over another unlicensed band. This other resource pool or other unlicensed band may have no consistent SL LBT failure. Alternatively, there may be a short (control signaling) window which is exempted from LBT. The indication may be signaled through this short (control) window.

In a second action, the WTRU may inform higher layers. The WTRU may inform higher layers about the consistent LBT failure. For example, if the consistent LBT failure is determined at the MAC layer, the MAC layer may send an indication to its higher layers, such as the RRC and the NAS layer.

In a third action, the WTRU may perform housecleaning at WTRU (timers/counters). When a consistent LBT failure is declared, the WTRU may perform resetting of timers and counters that have stalled as a result of the LBT failures.

In a fourth action, the WTRU may declare SL RLF for sidelink. If the consistent LBT failure is for a specific band, the WTRU may declare a SL RLF for all sidelinks using this band. If the consistent LBT failure is for a specific PC5 RRC connection, the WTRU may declare a SL RLF for this particular sidelink In a fifth action, the WTRU may inform the gNB. If the WTRU is in RRC CONNECTED, it may notify its serving gNB about the consistent LBT failure, using an LBTR. The message carrying the notification may also include the granularity of the consistent LBT failure. For each type of granularity, the WTRU may also include additional information in the message carrying the notification:

- Band of the failure;
- Destination layer 2 ID;
- Cast type;
- Count of LBT Failures and/or Successes since the last LBTR;
- Count of LBT Failures and/or Successes aggregating or averaging over the most recent K LBTRs (the value of K may be configured or preconfigured);
- Number of times LBT Failures or consecutive LBT Failures have exceeded a maximum configured LBT Failure threshold since the last LBTR;
- Number of times LBT Success Count or consecutive LBT Success Count is less than a configured consecutive LBT Success Minimum since last LBTR;
- The MAC procedure that may have triggered the LBTR;
- Time stamp related to when the LBTR PDU is built;
- CCA, MCOT and/or CWS information;
- Ratio of LBT Failures and/or Successes since the last LBTR;
- Ratio of LBT Failures and/or Successes averaging over the most recent N LBTRs (value of N may be configured or preconfigured);
- List of TX resource pools monitored by the WTRU, for which the WTRU has determined a consistent LBT failure. These TX resource pools may be "active" or "inactive"
- List of TX resource pools monitored by the WTRU, for which the WTRU has not determined a consistent LBT failure. These TX resource pools may be "active" or "inactive"
- List of TX resource pools monitored by the WTRU, and an indication of the LBT successes and/or LBT failures on each of these. This indication may be a count value over an observation window, an average value, a number of consecutive successes, a number of consecutive failures, a ration of successes to failures, etc.

In a sixth action, the WTRU may move to a new unlicensed band. If a consistent LBT failure is determined for a specific unlicensed band, the WTRU may switch to another unlicensed band. In order to continue the sidelink communication, the peer WTRU would also need to move to the new unlicensed band. The peer WTRU may be made aware of this new unlicensed band through (pre) configuration, through configuration between the two peer WTRUs (for example as part of the AS capability exchange or PC RRC configuration exchange), through a dedicated exchange between the peer WTRUs (for example when the TX WTRU notifies the peer WTRU about the consistent LBT failure the message may include the information for the new unlicensed band)

In a seventh action, if the WTRU is using resource allocation mode 2, and a consistent LBT failure is determined on a "active" TX resource pool, the WTRU may autonomously change to an alternate TX resource pool that is being monitored, one for which no consistent LBT failure has been determined. The alternate TX resource pool may be "active" TX resource pool or an "inactive" TX resource pool.

In an eight action, if a consistent LBT failure is determined, this may trigger the WTRU to change the sidelink BWP.

A typical realization for the consistent SL LBT failure recovery is shown below (from TS 38.321):

The MAC entity may:
1> if consistent SL LBT failure has been triggered, and not cancelled; and
1> if UL-SCH resources are available for a new transmission and these UL-SCH resources can accommodate the LBT failure MAC CE plus its subheader as a result of logical channel prioritization:
  2> instruct the Multiplexing and Assembly procedure to generate the LBT failure MAC CE.
1> if SL-SCH resources are available for a new transmission and these SL-SCH resources can accommodate the LBT failure MAC CE plus its subheader as a result of logical channel prioritization:
  2> instruct the Multiplexing and Assembly procedure to generate the LBT failure MAC CE for each impacted sidelink
1> else if consistent SL LBT failure has been triggered, and not cancelled, in at least one band:
  2> if SL-SCH resources are available for a new transmission in a band for which consistent SL LBT failure has not been triggered and these SL-SCH resources can accommodate the LBT failure MAC CE plus its subheader as a result of logical channel prioritization:
    3> instruct the Multiplexing and Assembly procedure to generate the LBT failure MAC CE.
1> if a MAC PDU is transmitted and LBT failure indication is not received from lower layers and this PDU includes the LBT failure MAC CE:
  2> cancel all the triggered consistent SL LBT failure(s) for which consistent LBT failure was indicated in the transmitted LBT failure MAC CE.
1> if consistent SL LBT failure is triggered and not cancelled; and
1> if sl__lbt-FailureRecoveryConfig is reconfigured by upper layers for the configured granularity:
  2> cancel all the triggered consistent SL LBT failure(s) for the configured granularity.

In Rel. 16, after the MAC layer instructs the PHY layer to transmit the transport block and if the HARQ feedback is enabled for this MAC PDU, the MAC layer also instructs the PHY layer to monitor PSFCH for the transmission and perform PSFCH reception. In unlicensed bands, if the PHY layer transmission fails the LBT, the MAC PDU may not be transmitted and no HARQ feedback is expected for this sidelink transmission.

In such a case, a monitoring of the PSFCH procedure may be performed in accordance with one embodiment, which can be used in combination with any of the other embodiments described herein. For example, the TX WTRU may instruct the PHY layer to monitor the PSFCH for the sidelink transmission and perform PSFCH reception only if LBT is successful.

Figure 4:
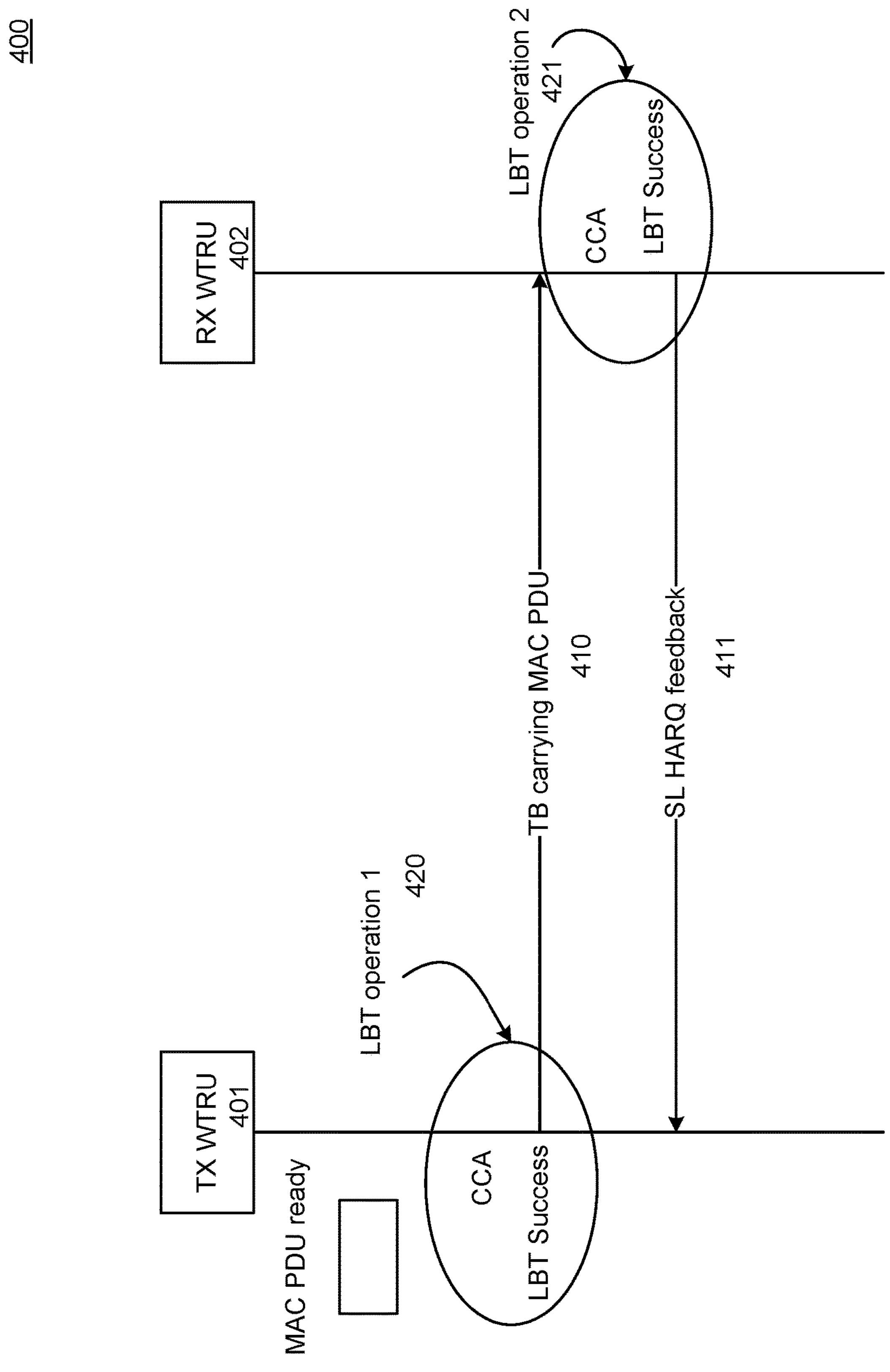
FIG. 4 shows an example occurrence of LBT Operation.

For example, the MAC specification TS 38.321 may be modified as follows:

To generate a transmission, the Sidelink process may:
1> if there is no uplink transmission; or
1> if the MAC entity is able to simultaneously perform uplink transmission(s) and sidelink transmission at the time of the transmission; or
1> if the other MAC entity and the MAC entity are able to simultaneously perform uplink transmission(s) and sidelink transmission at the time of the transmission respectively; or
1> if there is a MAC PDU to be transmitted for this duration in uplink, except a MAC PDU obtained from the Msg3 buffer, the MSGA buffer, or prioritized as specified in clause 5.4.2.2 of 38.321, and the sidelink transmission is prioritized over uplink transmission:
  2> instruct the physical layer to transmit SCI according to the stored sidelink grant with the associated Sidelink transmission information;
  2> instruct the physical layer to generate a transmission according to the stored sidelink grant;
  2> if HARQ feedback has been enabled the MAC PDU according to clause 5.22.1.4.2 of 38.321, and LBT success has been detected:
    3> instruct the physical layer to monitor PSFCH for the transmission and perform PSFCH reception Alternatively, the criteria may also be based on LBT failure detections. For example, the MAC specification TS 38.321 may be modified as follows:

To generate a transmission, the Sidelink process may:
1> if there is no uplink transmission; or
1> if the MAC entity is able to simultaneously perform uplink transmission(s) and sidelink transmission at the time of the transmission; or
1> if the other MAC entity and the MAC entity are able to simultaneously perform uplink transmission(s) and sidelink transmission at the time of the transmission respectively; or
1> if there is a MAC PDU to be transmitted for this duration in uplink, except a MAC PDU obtained from the Msg3 buffer, the MSGA buffer, or prioritized as specified in clause 5.4.2.2 of 38.321, and the sidelink transmission is prioritized over uplink transmission:
  2> instruct the physical layer to transmit SCI according to the stored sidelink grant with the associated Sidelink transmission information;
  2> instruct the physical layer to generate a transmission according to the stored sidelink grant;
  2> if HARQ feedback has been enabled the MAC PDU according to clause 5.22.1.4.2 of 38.321, and no LBT failure has been detected:
    3> instruct the physical layer to monitor PSFCH for the transmission and perform PSFCH reception FIG. 4 shows an example of a SL RLF declaration procedure 400 in accordance with one embodiment, which can be used in combination with any of the other embodiments described herein. For example, in a PC5 RRC unicast connection, a TX WTRU transmits on the sidelink to a peer RX WTRU. This connection may be configured with HARQ feedback. Referring to FIG. 4, as part of SL RLF declaration for this PC5 RRC unicast connection, the TX WTRU 401 monitors the number of HARQ DTX received from the RX WTRU 402. In the sidelink communication between the TX WTRU 401 and the RX WTRU 402, a LBT operation 420, 421 occurs when the TX WTRU 401 transmits 410 the transport block to the RX WTRU 402 over the PSSCH, and when the RX WTRU 402 transmits 411 the HARQ feedback to the TX WTRU 401 over the PSFCH channel.

Based on R16 sidelink behavior, the minimum time gap between PSFCH and the associated PSSCH is configured via the IE: sl-MinTimeGapPSFCH, and can be 2 or 3 slots. An LBT failure for either of these transmissions may result in the TX WTRU incorrectly interpreting this as a HARQ DTX.

Since an LBT failure is not necessarily an indication of poor radio channel quality, a WTRU should not declare a SL RLF in cases when the HARQ DTX is caused by LBT failures. The SL RLF declaration procedure may be modified as follows:

For LBT operation 1, it is possible that an LBT failure at the TX WTRU may result in the WTRU not transmitting the transport block to the RX WTRU. In such a case, the WTRU may not receive any HARQ feedback for the transport block and should not count this as a HARQ DTX.

For example, the MAC specification TS 38.321 may be modified as follows:

The HARQ-based Sidelink RLF detection procedure is used to detect Sidelink RLF based on a number of consecutive DTX on PSFCH reception occasions for a PC5-RRC connection.
RRC configures the following parameter to control HARQ-based Sidelink RLF detection:
  - sl-maxNumConsecutiveDTX.
The following WTRU variable is used for HARQ-based Sidelink RLF detection.
  - numConsecutiveDTX, which is maintained for each PC5-RRC connection.
The Sidelink HARQ Entity may (re-)initialize numConsecutiveDTX to zero for each PC5-RRC connection which has been established by upper layers, if any, upon establishment of the PC5-RRC connection or (re)configuration of slmaxNumConsecutiveDTX.
The Sidelink HARQ Entity may for each PSFCH reception occasion associated to the PSSCH transmission:
1> if LBT success was detected for the PSSCH transmission:
  2> if PSFCH reception is absent on the PSFCH reception occasion:
    3> increment numConsecutiveDTX by 1;
    3> if numConsecutiveDTX reaches sl-maxNumConsecutiveDTX:
      4> indicate HARQ-based Sidelink RLF detection to RRC.
  2> else:
    3> re-initialize numConsecutiveDTX to zero.

Alternatively, the PSFCH reception occasions may be redefined to only include those occasions where the sidelink transmission from the TX WTRU is an LBT success. For example, a PSFCH reception occasion may be defined as those occasions resulting from a sidelink transmission with HARQ feedback and for which and LBT success has been detected for the transmission.

For LBT operation 2, it is possible that an LBT failure at the RX WTRU may result in the RX WTRU not transmitting the HARQ feedback for the transport block. It is proposed that the TX WTRU does not interpret this as a HARQ DTX. Three alternatives are described, where the RX WTRU provides assistance to the TX WTRU to allow the TX WTRU to better assess if a HARQ DTX is a result of an LBT failure on a HARQ transmission from the RX WTRU. These alternatives are all described from the perspective of the RX WTRU sending assistance information related to LBT failures. It should be understood that the RX WTRU may also send assistance information related to LBT successes.

In a first alternative, the RX WTRU sends an LBT report to the TX WTRU to indicate the status of the LBT failures for HARQ feedback. This information may be for feedback for a specific PC5 RRC connection, or for a specific group-cast. The information may include the total number of LBT failures, or the total number of LBT failures for cases where the HARQ feedback was a NACK, or the total number of LBT failures for cases where the HARQ feedback was an ACK.

The RX WTRU may send this indication for each LBT failure. The indication may be sent over PHY layer control signaling (SCI), over a MAC CE, over dedicated RRC signaling, or piggybacked on a user plane message between the RX WTRU and the TX WTRU.

The RX WTRU may send this indication periodically. The RX WTRU may be configured with a reporting timer. At expiry of this timer, the RX WTRU may send a summary of the LBT failures since the last periodic report. The RX WTRU may send this periodic indication over PHY layer control signaling (SCI), over a MAC CE, over dedicated RRC signaling, or piggybacked on a user plane message between the RX WTRU and the TX WTRU.

The RX WTRU may be configured to send this indication when a configured trigger condition occurs. The RX WTRU may be configured with a threshold and an observation window time. The RX WTRU may monitor the number of LBT failures for HARQ transmissions and if this number exceeds the threshold during the observation window, the RX WTRU notifies the TX WTRU. The RX WTRU may send this triggered indication over PHY layer control signaling (SCI), over a MAC CE, over dedicated RRC signaling, or piggybacked on a user plane message between the RX WTRU and the TX WTRU.

The RX WTRU may be configured to send this indication when a configured trigger condition occurs. The RX WTRU may be configured with a threshold and an observation window time. The RX WTRU may monitor the number of consecutive LBT failures for HARQ transmissions, and if this number exceeds the threshold during the observation window, the RX WTRU notifies the TX WTRU. The RX WTRU may send this triggered indication over PHY layer control signaling (SCI), over a MAC CE, over dedicated RRC signaling, or piggybacked on a user plane message between the RX WTRU and the TX WTRU.

The RX WTRU may be polled by the TX WTRU to send an LBT report. For example, the TX WTRU may monitor the number of consecutive DTX, and have a first threshold for triggering an LBT report request, and a second threshold for triggering SL RLF. If the number of consecutive DTX passes a first threshold, the TX WTRU sends an LBT report request to the RX WTRU. This request may include an indication of the last time the TX WTRU received a non-DTX feedback (that is a HARQ ACK or NACK). The WTRU may store this time for each occurrence of a non-DTX HARQ feedback in a PSFCH reception occasion. Upon reception of the LBT report request, the RX WTRU prepares an LBT report indicating the number of LBT failures that have been observed for HARQ feedback transmission. If the TX WTRU provides the time of the last received non-DTX HARQ feedback, the RX WTRU uses this time to only include LBT failure information since this time. The LBT report request may be sent using a PHY layer control signaling (SCI), over a MAC CE, over dedicated RRC signaling. Similarly, the LBT report from the RX WTRU may be sent over PHY layer control signaling (SCI), over a MAC CE, over dedicated RRC signaling, or piggybacked on a user plane message between the RX WTRU and the TX WTRU.

Upon receiving the LBT report, the TX WTRU uses the information in the SL RLF procedure. If the report indicates that a LBT failure occurred, the TX WTRU may restart the consecutive DTX counter.

In a second alternative, the TX WTRU may be configured to be more conservative in the RLF monitoring for cases that the sidelink transmission is over unlicensed spectrum.

The TX WTRU may be configured with a scaling factor (K) to be used for sidelink transmission over unlicensed band. The scaling factor may be 1 for licensed band and some value >1 for unlicensed bands. The thresholds and/or timers are scaled by K for unlicensed bands. In effect the TX WTRU assumes that some of the DTXs are a result of the LBT failures for the HARQ transmissions at the RX WTRU and tries to compensate by using a higher threshold.

The TX WTRU may be configured with two thresholds-one for licensed bands and one for unlicensed bands. The threshold for unlicensed bands being higher than that for the licensed band. In effect the TX WTRU assumes that some of the DTXs are a result of the LBT failures for the HARQ transmissions at the RX WTRU, and the TX WTRU tries to compensate by using the higher $2^{nd}$ threshold.

In a third alternative, the TX WTRU may configure the RX WTRU to always respond in the same slot. So, the IE: sl-MinTimeGapPSFCH may be set to 0, to indicate that the RX WTRU should provide its HARQ feedback in the same slot. If the LBT attempt at the TX WTRU is successful, the corresponding LBT attempt at the RX WTRU should also be successful.

An resource reselection procedure may be performed in accordance with one embodiment, which can be used in combination with any of the other embodiments described herein. For example, if the sidelink process is configured to perform transmissions of multiple MAC PDUs with sidelink resource allocation mode 2, the process maintains a counter SL_RESOURCE_RESELECTION_COUNTER. When this counter reaches 0, it is a signal to the TX WTRU to trigger TX resource (re-)selection, whereby the TX WTRU selects new resources for mode 2 resource allocation. In Rel. 16, this counter is decremented every time the MAC layer instructs the physical layer to generate a transmission according to the stored sidelink grant, and this transmission is the last transmission of a MAC PDU. However, the MAC layer may instruct the physical layer to generate a transmission, but this transmission may not be sent because of an LBT failure.

It is possible that an LBT failure at the TX WTRU may result in the WTRU not transmitting the transport block to the RX WTRU. In such a case, the WTRU may not transmit the last MAC PDU, and it should not receive any HARQ feedback for the transport block, nor should it decrement the SL_RESOURCE_RESELECTION_COUNTER. For example, the MAC specification TS 38.321 may be modified as follows where the criteria are based on LBT success for a transmission:

---

The Sidelink process is associated with a HARQ buffer.
    New transmissions and retransmissions are performed on the resource indicated in the sidelink grant or with the MCS selected.
    If the Sidelink process is configured to perform transmissions of multiple MAC PDUs with Sidelink resource allocation mode 2, the process maintains a counter SL_RESOURCE_RESELECTION_COUNTER. For other configurations of the Sidelink process, this counter is not available.
    If the Sidelink HARQ Entity requests a new transmission, the Sidelink process may:
  1> store the MAC PDU in the associated HARQ buffer;
  1> store the sidelink grant received from the Sidelink HARQ Entity;
  1> generate a transmission as described below.
    If the Sidelink HARQ Entity requests a retransmission, the Sidelink process may:
  1> store the sidelink grant received from the Sidelink HARQ Entity;
  1> generate a transmission as described below.
    To generate a transmission, the Sidelink process may:
  1> if there is no uplink transmission; or
  1> if the MAC entity is able to simultaneously perform uplink transmission(s) and sidelink transmission at the time of the transmission; or
  1> if the other MAC entity and the MAC entity are able to simultaneously perform uplink transmission(s) and sidelink transmission at the time of the transmission respectively; or
  1> if there is a MAC PDU to be transmitted for this duration in uplink, except a MAC PDU obtained from the Msg3 buffer, the MSGA buffer, or prioritized as specified in clause 5.4.2.2, and the sidelink transmission is prioritized over uplink transmission:
    2> instruct the physical layer to transmit SCI according to the stored sidelink grant with the associated Sidelink transmission information;
    2> instruct the physical layer to generate a transmission according to the stored sidelink grant;
    2> if HARQ feedback has been enabled the MAC PDU according to clause 5.22.1.4.2:
      3> instruct the physical layer to monitor PSFCH for the transmission and perform PSFCH reception as specified in clause 5.22.1.3.2.
    2> if sl-PUCCH-Config is configured by RRC for the stored sidelink grant:
    3> determine transmission of an acknowledgement on the PUCCH as specified in clause 5.22.1.3.2.
  1> if this transmission corresponds to the last transmission of the MAC PDU and LBT success has been detected:
    2> decrement SL_RESOURCE_RESELECTION_COUNTER by 1, if available.

---

Alternatively, the criteria may also be based on LBT failure detections. For example, the MAC specification TS 38.321 may be modified as follows:

---

The Sidelink process is associated with a HARQ buffer.
New transmissions and retransmissions are performed on the resource indicated in the sidelink grant or with the MCS selected.
If the Sidelink process is configured to perform transmissions of multiple MAC PDUs with Sidelink resource allocation mode 2, the process maintains a counter SL_RESOURCE_RESELECTION_COUNTER. For other configurations of the Sidelink process, this counter is not available.
If the Sidelink HARQ Entity requests a new transmission, the Sidelink process may:
  1> store the MAC PDU in the associated HARQ buffer;
  1> store the sidelink grant received from the Sidelink HARQ Entity;
  1> generate a transmission as described below.
If the Sidelink HARQ Entity requests a retransmission, the Sidelink process may:
  1> store the sidelink grant received from the Sidelink HARQ Entity;
  1> generate a transmission as described below.
To generate a transmission, the Sidelink process may:
  1> if there is no uplink transmission; or
  1> if the MAC entity is able to simultaneously perform uplink transmission(s) and sidelink transmission at the time of the transmission; or
  1> if the other MAC entity and the MAC entity are able to simultaneously perform uplink transmission(s) and sidelink transmission at the time of the transmission respectively; or
  1> if there is a MAC PDU to be transmitted for this duration in uplink, except a MAC PDU obtained from the Msg3 buffer, the MSGA buffer, or prioritized as specified in clause 5.4.2.2, and the sidelink transmission is prioritized over uplink transmission:

-continued

2> instruct the physical layer to transmit SCI according to the stored sidelink grant with the associated Sidelink transmission information;
2> instruct the physical layer to generate a transmission according to the stored sidelink grant;
2> if HARQ feedback has been enabled the MAC PDU according to clause 5.22.1.4.2:
3> instruct the physical layer to monitor PSFCH for the transmission and perform PSFCH reception as specified in clause 5.22.1.3.2.
2> if sl-PUCCH-Config is configured by RRC for the stored sidelink grant:
3> determine transmission of an acknowledgement on the PUCCH as specified in clause 5.22.1.3.2.
1> if this transmission corresponds to the last transmission of the MAC PDU and no LBT Failure has been detected:
2> decrement SL__RESOURCE__RESELECTION__COUNTER by 1, if available.

It is also necessary to avoid decrementing this counter for an extended period of time due to LBT failures so that the WTRU never does SL resource reselection. This may be achieved by monitoring for consistent LBT failure. When consistent LBT failure is declared, the WTRU may perform SL resource reselection.

Alternatively, the MAC layer may be configured with a maximum number of times the SL_RESOURCE_RESELECTION_COUNTER is not decremented because of an LBT failure. For example, the following procedure may be added to the MAC layer. It is assumed that the WTRU is configured with a maximum number of times the WTRU does not do a SL resource reselection as a result of an LBT failure (SL_RESOURCE_RESELECTION_COUNTER-LBTFailureThreshold). The WTRU uses a new counter SL_RESOURCE_RESELECTION_COUNTER-LBTFailureCount to count the number of times the SL resource reselection is not performed.

1> If a SL_RESOURCE_RESELECTION_COUNTER LBT Failure has been detected:
2> Increment SL_RESOURCE_RESELECTION_COUNTER-LBTFailureCount;
2> If SL_RESOURCE_RESELECTION_COUNTER-LBTFailureCount>SL_RESOURCE_RESELECTION_COUNTER-LBTFailureThreshold:
3> clear the selected sidelink grant associated to the Sidelink process, if available;
3> trigger the TX resource (re-)selection;
3> set SL_RESOURCE_RESELECTION_ COUNTER-LBTFailureCount to 0.

An HARQ flushing procedure may be performed in accordance with one embodiment, which can be used in combination with any of the other embodiments described herein. For example, a sidelink configured grant may be configured with a maximum number of transmissions (sl-MaxTransNum). When the Sidelink process generates a transmission and this transmission corresponds to the last transmission of the MAC PDU, the MAC entity checks if the maximum number of transmission attempts have been made for this MAC PDU. If so, the MAC entity assumes that the MAC PDU has been repeated the maximum number of times, and it flushes the HARQ buffer of the associated Sidelink process. As a result of LBT failures, the SL transmission at the MAC layer may not be transmitted. In such a case, the MAC PDU may not have been transmitted the maximum number of times, and the HARQ buffer should not be flushed.

For example, the MAC specification TS 38.321 may be modified as follows:

To generate a transmission, the Sidelink process may:
1> if there is no uplink transmission; or
1> if the MAC entity is able to simultaneously perform uplink transmission(s) and sidelink transmission at the time of the transmission; or
1> if the other MAC entity and the MAC entity are able to simultaneously perform uplink transmission(s) and sidelink transmission at the time of the transmission respectively; or
1> if there is a MAC PDU to be transmitted for this duration in uplink, except a MAC PDU obtained from the Msg3 buffer, the MSGA buffer, or prioritized as specified in clause 5.4.2.2, and the sidelink transmission is prioritized over uplink transmission:
2> instruct the physical layer to transmit SCI according to the stored sidelink grant with the associated Sidelink transmission information;
2> instruct the physical layer to generate a transmission according to the stored sidelink grant;
2> if HARQ feedback has been enabled the MAC PDU according to clause 5.22.1.4.2:
3> instruct the physical layer to monitor PSFCH for the transmission and perform PSFCH reception as specified in clause 5.22.1.3.2.
2> if sl-PUCCH-Config is configured by RRC for the stored sidelink grant:
3> determine transmission of an acknowledgement on the PUCCH as specified in clause 5.22.1.3.2.
1> if this transmission corresponds to the last transmission of the MAC PDU:
2> decrement SL__RESOURCE__RESELECTION__COUNTER by 1, if available.
1> if sl-MaxTransNum corresponding to the highest priority of the logical channel(s) in the MAC PDU has been configured in sl-CG-MaxTransNumList for the sidelink grant by RRC and the number of transmissions of the MAC PDU has been reached to sl-MaxTransNum and where the number of transmissions of the MAC PDU only count those for which the physical layer has determined LBT success; or
1> if a positive acknowledgement to this transmission of the MAC PDU was received according -continued to clause 5.22.1.3.2; or
1> if negative-only acknowledgement was enabled in the SCI and no negative acknowledgement was received for this transmission of the MAC PDU according to clause 5.22.1.3.2:
2> flush the HARQ buffer of the associated Sidelink process.

Alternatively, the criteria may also be based on LBT failure detections. For example, the MAC specification TS 38.321 may be modified as follows:

To generate a transmission, the Sidelink process may:
1> if there is no uplink transmission; or
1> if the MAC entity is able to simultaneously perform uplink transmission(s) and sidelink transmission at the time of the transmission; or
1> if the other MAC entity and the MAC entity are able to simultaneously perform uplink transmission(s) and sidelink transmission at the time of the transmission respectively; or
1> if there is a MAC PDU to be transmitted for this duration in uplink, except a MAC PDU obtained from the Msg3 buffer, the MSGA buffer, or prioritized as specified in clause 5.4.2.2, and the sidelink transmission is prioritized over uplink transmission:
2> instruct the physical layer to transmit SCI according to the stored sidelink grant with the associated Sidelink transmission information;
2> instruct the physical layer to generate a transmission according to the stored sidelink grant;
2> if HARQ feedback has been enabled the MAC PDU according to clause 5.22.1.4.2:
3> instruct the physical layer to monitor PSFCH for the transmission and perform PSFCH reception as specified in clause 5.22.1.3.2.
2> if sl-PUCCH-Config is configured by RRC for the stored sidelink grant:
3> determine transmission of an acknowledgement on the PUCCH as specified in clause 5.22.1.3.2.
1> if this transmission corresponds to the last transmission of the MAC PDU:
2> decrement SL_RESOURCE_RESELECTION_COUNTER by 1, if available.
1> if sl-MaxTransNum corresponding to the highest priority of the logical channel(s) in the MAC PDU has been configured in sl-CG-MaxTransNumList for the sidelink grant by RRC and the number of transmissions of the MAC PDU has been reached to sl-MaxTransNum and where the number of transmissions of the MAC PDU only count those for which the physical layer has determined no LBT failure; or
1> if a positive acknowledgement to this transmission of the MAC PDU was received according to clause 5.22.1.3.2; or
1> if negative-only acknowledgement was enabled in the SCI and no negative acknowledgement was received for this transmission of the MAC PDU according to clause 5.22.1.3.2:
2> flush the HARQ buffer of the associated Sidelink process.

It is also necessary to avoid waiting an extended period of time due to LBT failures so that the WTRU never flushes the HARQ buffer of the associated Sidelink process. This may be achieved by monitoring for consistent LBT failure. When consistent LBT failure is declared, the WTRU may flush the HARQ buffer of the associated Sidelink process.

Alternatively, to avoid not flushing the HARQ buffer because of repeated LBT failures, the MAC layer may be configured with a maximum number of times the MAC layer does not consider MAC PDUs for which an LBT failure is detected. For example, the following new procedure may be added to the MAC layer. It is assumed that the WTRU is configured with a maximum number of times the WTRU does not count MAC PDUs that are not transmitted because of an LBT failure (sl-MaxTransNum-LBTFailureThreshold). The WTRU uses a new counter sl-MaxTransNum-LBTFailureCount to count the number of times that a transmission is not considered in the count to determine the Max TransNum.

1> If a MAC PDU LBT Failure has been detected:
2> Increment sl-MaxTransNum-LBTFailureCount;
2> If sl-MaxTransNum-LBTFailureCount>sl-Max TransNum-LBTFailureThreshold:
3> flush the HARQ buffer of the associated Sidelink process
3> set sl-MaxTransNum-LBTFailureCount to 0.

An UL/SL prioritization procedure may be performed in accordance with one embodiment, which can be used in combination with any of the other embodiments described herein. For example, when a WTRU has both SL and UL MAC PDUs ready for transmission, and it cannot send both simultaneously, the WTRU must make a prioritization decision. Based on the prioritization decision, the WTRUs MAC layer selects either the UL transmission or the SL transmission. The MAC layer than instructs the Physical layer to generate the transmission according to the associated grant.

However, because of LBT, the MAC PDU may not be transmitted. This is further complicated by the fact the LBT may occur on either the UL, the SL, or both the UL and the SL. It is proposed that the prioritization rules be modified to take into account the potential LBT failures.

In a first option, the PHY layer may provide an indication of the LBT state to the MAC layer. The LBT state is an indication of whether the channel is currently FREE or BUSY. The PHY layer may continually provide this indication to the MAC layer, or the MAC layer may query the PHY layer. The LBT state may be used during the prioritization procedure. The LBT state may be maintained for both the SL (sl_lbtState) and the UL (ul_lbtState). The LBT state for a channel that does not rely on LBT may be considered as "FREE." When selecting a SL transmission over an UL transmission, the MAC layer may use the LBT state. Various combinations are possible. If the SL LBT state is known to be BUSY and the UL LBT state is known to be FREE, the WTRU should not prioritize the SL transmission, even if all the other conditions for the SL prioritization are met. An example MAC specification TS 38.321, taking into account the LBT states, is as follows:

The transmission of the MAC PDU is prioritized over uplink transmissions of the MAC entity or the other MAC entity if the following conditions are met:
1> if the MAC entity is not able to perform this sidelink transmission simultaneously with all uplink transmissions at the time of the transmission, and
1> if uplink transmission is neither prioritized as specified in clause 5.4.2.2 nor prioritized by upper layer according to TS 23.287; and
1> if sl-PrioritizationThres is configured and if the value of the highest priority of logical channel(s) or a MAC CE in the MAC PDU is lower than sl-PrioritizationThres, and
1> if sl_lbtState = "FREE" or ul_lbtState = 'BUSY".

NOTE 2:
If the MAC entity is not able to perform this sidelink transmission simultaneously with all uplink transmissions as specified in clause 5.4.2.2 of TS 36.321 at the time of the transmission, and prioritization-related information is not available prior to the time of this sidelink transmission due to processing time restriction, it is up to WTRU implementation whether this sidelink transmission is performed.

In a second option, the MAC layer may instruct the PHY layer to "conditionally" generate both transmissions. The UL transmission according to the uplink grant, and the SL transmission according to the stored sidelink grant. The PHY layer may also be told if the transmission is first priority or second priority. A first priority transmission is the transmission that has priority according to UL/SL prioritization. A second priority transmission is the transmission that does not have priority according to UL/SL prioritization, but which may be transmitted if the first priority transmission results in an LBT failure. The PHY layer may also be told to monitor a GoAhead indication. This GoAhead indication is used to tell the PHY layer of the second priority transmission that the first priority transmission has resulted in an LBT failure.

Figure 5:
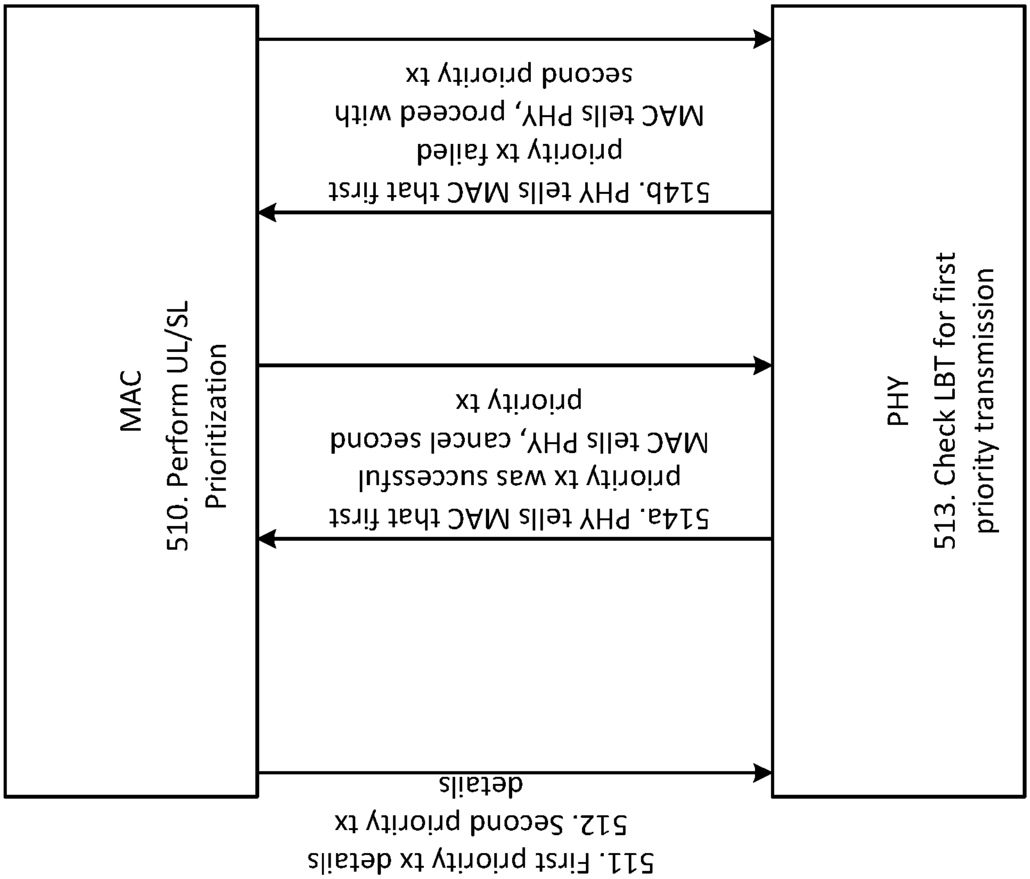
FIG. 5 shows an example SL/UL Prioritization.

FIG. 5 shows an example SL/UL prioritization procedure 500, in accordance with one embodiment, which can be used in combination with any of the other embodiments described herein. At step 510, the WTRU performs UL/SL prioritization. If one transmission is prioritized, it is denoted as the first priority transmission. The other transmission is denoted as the second priority transmission.

At step 511, for the first priority transmission, the MAC layer tells the PHY layer to generate a transmission.

At step 512, for the second priority transmission, the MAC layer tells the PHY layer to conditionally generate a transmission. It also tells the PHY layer to monitor the LBT indication.

At step 513, the first priority transmission results in either an LBT failure or LBT success.

At step 514*a*, if an LBT success is detected, the second priority transmission should not be sent. The MAC layer may notify the PHY layer to cancel the transmission. This notification may be sent on the GoAhead indication.

At step 514*b*, if an LBT failure is detected, the second priority transmission should be sent. The MAC layer can notify the PHY layer to proceed with the second priority transmission. This notification may be sent on the GoAhead indication.

Note that in step 514*a* and 514*b*, an indication is sent from the MAC layer to the PHY layer (referred to as the GoAhead Indication). As an alternative to an indication for the second priority transmission to "go ahead" or "not go ahead," the MAC layer may use the indication simply to signal "go ahead" and rely on a lack of indication to signal "no go ahead." For example, the PHY layer may maintain a timer for each request to conditionally generate a transmission. If this timer expires without receiving a "go ahead" indication, the PHY layer cancels the second priority transmission. As another example, the PHY layer may maintain a timer for each request to conditionally generate a transmission. If this timer expires without receiving a "no go ahead" indication, the PHY layer proceeds with the second priority transmission.

In a third option, there may be specific rules for prioritization based on whether the UL and/or SL transmissions are over unlicensed bands. Below are example rules:

- if only UL transmissions are over unlicensed bands, the WTRU may always prioritize SL transmissions; and
- if only SL transmissions are over unlicensed bands, the WTRU may always prioritize UL transmissions.

Alternatively, the WTRU may use different UL and or SL priority thresholds if the transmissions happen to be over unlicensed bands. Or they may use scaled versions of the thresholds over these bands. The priority thresholds may also be dynamically changed based on the load in the unlicensed band. For example, for a case where a channel is heavily loaded, LBT failures may be more common. For this case, it may be better to deprioritize the transmissions using this channel. If the channel is for SL, this can be accomplished by using a lower sl-PrioritizationThres. If the channel is for UL, this can be accomplished by using a lower ul-Prioritization Thres.

A SL DRX operation may be performed in accordance with one embodiment, which can be used in combination with any of the other embodiments described herein. As of Rel. 17, peer WTRUs involved in SL unicast communication may have a SL DRX configuration. This configuration provides SL DRX configuration to a RX WTRU. For proper SL communication the TX WTRU and RX WTRU must have the same understanding of the RX WTRU Active time—otherwise the TX WTRU may send a transmission to the RX WTRU, while the RX WTRU is in inactive mode-time during which the RX WTRU is not monitoring SL transmissions. The triggers to start and stop the majority of the timers that control the Active time are based on transmissions and receptions.

It is assumed that the TX WTRU may maintain equivalent timers to the RX WTRU to determine the active time. This implies that TX WTRU may maintain the following equivalent timers and parameters:

- sl-drx-onDurationTimer: the duration at the beginning of a SL DRX cycle;
- sl-drx-SlotOffset;
- sl-drx-InactivityTimer (except for the broadcast process);
- sl-drx-RetransmissionTimer (per Sidelink process except for the broadcast process);
- sl-drx-StartOffset: the SL Long DRX cycle and sl-drx-StartOffset which defines the [symbol/slot/subframe];
- sl-drx-LongCycle: the SL Long DRX cycle;
- sl-drx-HARQ-RTT-Timer (per Sidelink process except for the broadcast process).

This may allow the TX WTRU to determine the Active time at the RX WTRU, and thereby send SL transmissions during the RX Active time.

Two issues that need to be addressed. A first issue is that, in licensed bands, the TX WTRU is expected to start its inactivity timer when the TX WTRU asks the physical layer to generate a transmission for the MAC PDU, according to the configured sidelink grant. The assumption is that the reception of the SCI may trigger the RX WTRU to also start its inactivity timer.

Figure 6:
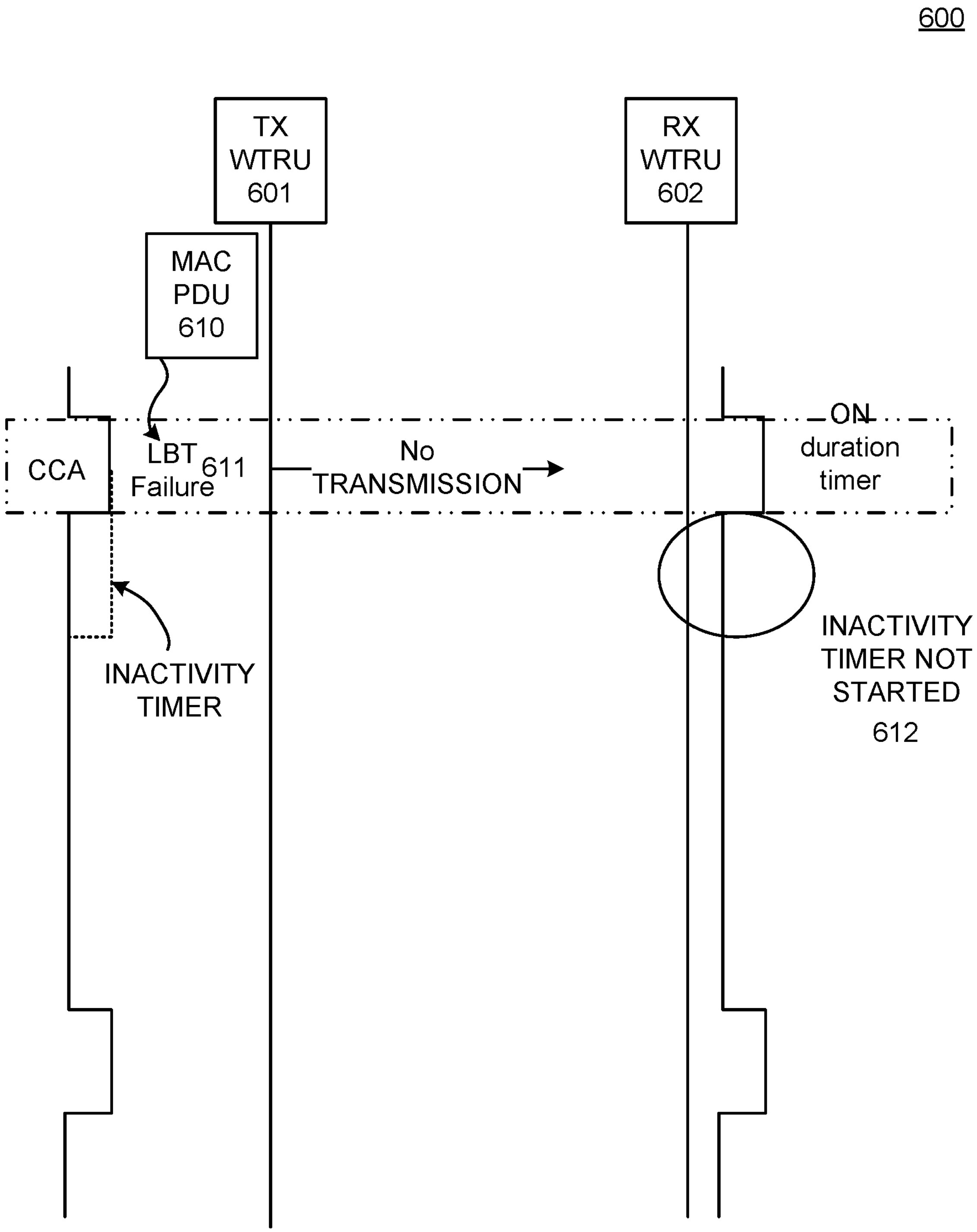
FIG. 6 shows an example inactivity timer issue.

FIG. 6 illustrates an example inactivity timer issue 600. In unlicensed bands, the MAC PDU 610 from the TX WTRU 601 may undergo an LBT failure 611, and the RX WTRU 602 may not receive the SCI and may not start its inactivity timer 612. This results in the TX WTRU 601 determining that the RX WTRU is active, and the RX WTRU potentially missing future sidelink transmissions.

To remedy this, it is proposed that the TX WTRU only start the inactivity timer when the TX WTRU transmits a MAC PDU in a configured sidelink and the transmission results in an LBT success (or lack of LBT failure).

In case there is an LBT failure for a MAC PDU, the MAC layer may try to transmit the MAC PDU at a later time. These transmissions are not new transmissions or retransmissions, but delayed transmissions of a MAC PDU that has undergone an LBT failure. The MAC layer handles these delayed MAC PDU transmissions differently from new transmissions and retransmissions, and this needs to be accounted for. For example, if this later transmission results in an LBT success, then upon reception of the SCI for this transmission, this may trigger the RX WTRU to start its inactivity timer. However, the MAC layer at the TX WTRU may also need to start its equivalent inactivity timer. As a result, it is proposed that the MAC layer start its equivalent inactivity timer for the HARQ process of a delayed transmission, when the MAC PDU for this HARQ process is transmitted with LBT success.

In a second issue, in licensed bands, a RX WTRU may enter into a micro-sleep state for a sidelink HARQ process if it sends feedback for the received sidelink transmission (by starting HARQ-RTT-Timer). While this timer is running, the RX WTRU is not expected to receive any retransmissions from the TX WTRU, and it may enter an OFF state. The duration of the timer is set as the minimum time needed before a TX WTRU can process the feedback from the RX WTRU and then schedule the sidelink retransmission. However, in unlicensed bands, the sidelink feedback transmission may undergo an LBT failure. As a result, the RX WTRU may enter an OFF state, and the TX WTRU may never receive the feedback. The actions of the TX WTRU on reception of HARQ DTX for unlicensed bands have not been defined. However, certain actions may lead to a desynchronization between the TX WTRU and RX WTRU.

Figure 7A:
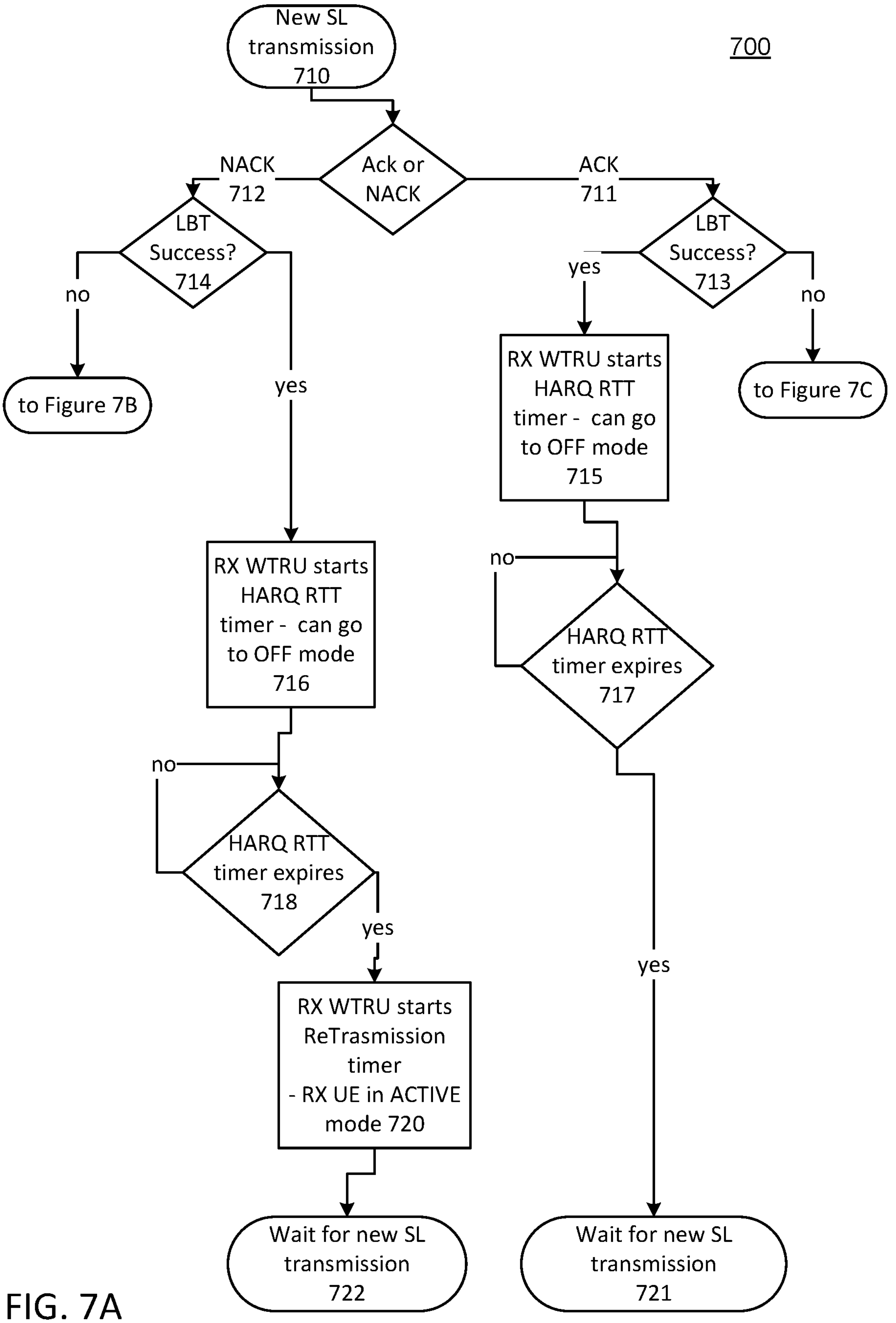
FIG. 7A shows an example HARQ RTT issue.
Figure 7B:
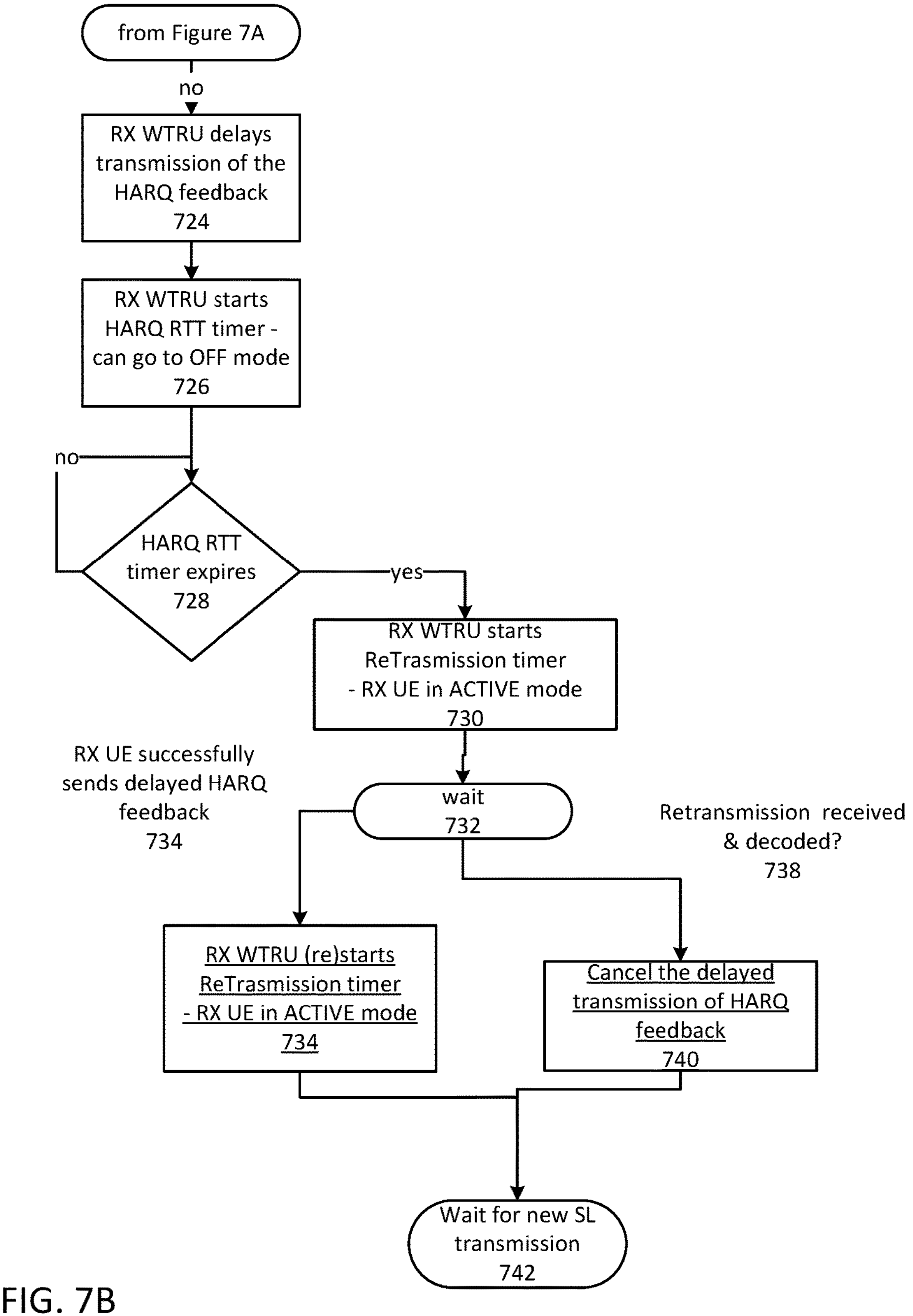
FIG. 7B shows an example HARQ RTT issue.
Figure 7C:
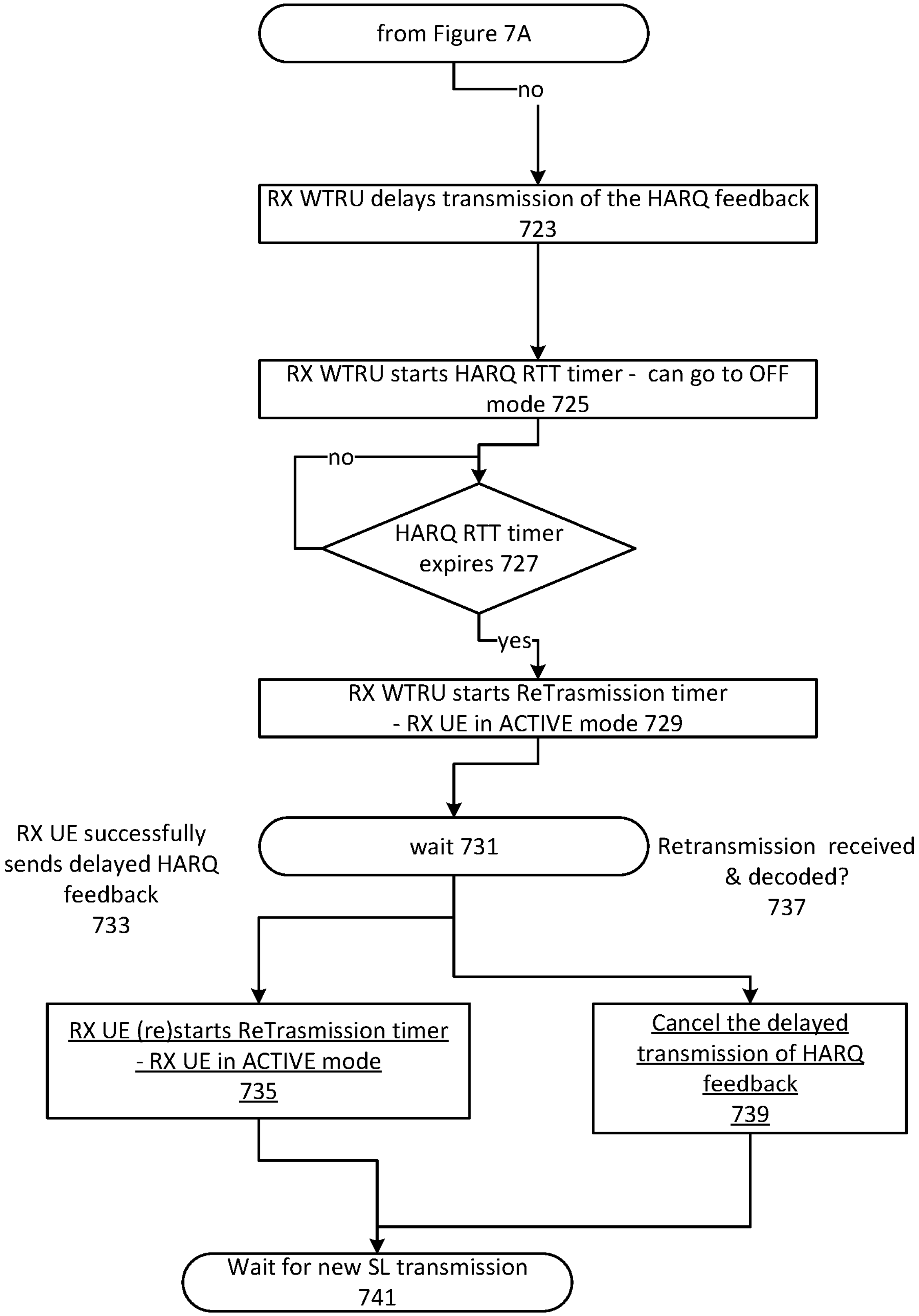
FIG. 7C shows an example HARQ RTT issue.

FIGS. 7A-7C show an example of the RX WTRU behavior in cases where the HARQ feedback may undergo LBT failures 700. In this example, the RX WTRU may attempt to make a sidelink feedback transmission and the feedback transmission may undergo an LBT failure.

In case of an LBT failure, the RX WTRU may:

Cancel the sidelink feedback transmission and may rely on the HARQ DTX behavior of the TX WTRU. However, as already mentioned, the actions of the TX WTRU on reception of HARQ DTX for unlicensed bands have not been defined.

Alternatively, the RX WTRU may retry to send the sidelink HARQ feedback, but this transmission may be delayed. The RX WTRU upon an LBT failure, may start the HARQ RTT timer. Upon expiry, the RX WTRU may start the retransmission timer. While this timer is running, the TX WTRU may have sent a retransmission of the data. If this is successfully received by the RX WTRU, then the RX WTRU may inform the physical layer to cancel the delayed sidelink HARQ feedback for this HARQ process. Similarly, while this timer is running, the RX WTRU may successfully transmit the delayed sidelink HARQ feedback. It is proposed that the RX WTRU not restart the HARQ RTT timer and only restart the Retransmission timer (or start a second retransmission timer which may be different from the first retransmission timer).

Referring to FIG. 7A, a new SL transmission may be sent by a WTRU 710. If an ACK is received 711 or a NACK is received 712, the WTRU may determine whether there was an LBT success 713, 714. If an ACK was received 711, and there was no LBT success 713, the procedure advances to FIG. 7C. If a NACK was received 712, and there was no LBT success 714, the procedure advances to FIG. 7B.

If an ACK was received 711, and there was LBT success 713, the RX WTRU may start a HARQ RTT timer and may enter OFF mode 715. If the HARQ RTT timer expires 717, the RX WTRU may wait for a new SL transmission 721.

If an NACK was received 712, and there was LBT success 714, the RX WTRU may start a HARQ RTT timer and may enter OFF mode 716. If the HARQ RTT timer expires 718, the RX WTRU may start a retransmission timer 720 and enter ACTIVE mode and may wait for a new SL transmission 722.

Referring to FIG. 7B, following no LBT success 714, the RX WTRU may delay the transmission of the HARQ feedback 724. The RX WTRU may start a HARQ RTT timer and may enter OFF mode 726. If the HARQ RTT timer expires 728, the RX WTRU may start a retransmission timer and enter ACTIVE mode 730 and may wait 732. If the RX WTRU successfully sends delayed HARQ feedback 734, the RX WTRU may (re) start the retransmission timer and enter ACTIVE mode 736 and may wait for a new SL transmission 742. If the retransmission is received and decoded 738, the RX WTRU may cancel the delayed transmission of HARQ feedback 740 and may wait for a new SL transmission 742.

Referring to FIG. 7C, following no LBT success 713, the RX WTRU may delay the transmission of the HARQ feedback 723. The RX WTRU may start a HARQ RTT timer and may enter OFF mode 725. If the HARQ RTT timer expires 727, the RX WTRU may start a retransmission timer and enter ACTIVE mode 729 and may wait 731. If the RX WTRU successfully sends delayed HARQ feedback 733, the RX WTRU may (re) start the retransmission timer and enter ACTIVE mode 735 and may wait for a new SL transmission 741. If the retransmission is received and decoded 737, the RX WTRU may cancel the delayed transmission of HARQ feedback 739 and may wait for a new SL transmission 741.

A SL CSI reporting procedure may be performed in accordance with one embodiment, which can be used in combination with any of the other embodiments described herein. The SL CSI reporting procedure may be used by a CSI triggering WTRU to retrieve sidelink channel state information from a peer CSI reporting WTRU. The CSI triggering WTRU sends a CSI request to the peer CSI reporting WTRU, and the peer WTRU responds with the CSI report. The MAC entity maintains a sl-CSI-ReportTimer for each pair of the Source Layer-2 ID and the Destination Layer-2 ID corresponding to a PC5-RRC connection. sl-CSI-ReportTimer is used for a SL-CSI reporting WTRU to follow the latency requirement signaled from a CSI triggering WTRU. The timer provides the CSI reporting WTRU an indication of how long it has to send the CSI report. A CSI report sent after the timer expires is not useful to the CSI triggering WTRU, as it exceeds the sl-Latency-BoundCSI-Report which indicates the latency bound of SL CSI report in terms of number of slots. A CSI reporting WTRU normally cancels a triggered SL-CSI reporting if it sends the CSI report in a SL MAC CE to the CSI triggering WTRU, or if the sl-CSI-ReportTimer expires.

In Rel. 16, the former condition may be based on when the MAC entity has SL resources allocated for new transmission and the SL-SCH resources can accommodate the SL-CSI reporting MAC CE and its subheader as a result of logical channel prioritization. However, the resulting MAC PDU may not be transmitted by the PHY layer as a result of an LBT failure. In such cases, it is proposed to add new criteria before cancelling a triggered SL-CSI report. The CSI reporting WTRU check whether the LBT was a success for the transmission. If LBT failed, the CSI reporting WTRU should not cancel a triggered SL-CSI report. For example, the MAC specification TS 38.321 may be modified as follows:

CE. This allows the MAC layer to know if the CSI report transmission was successful (LBT success) or not (LBT failure).

As an alternative, the CSI reporting procedure may stop the timer and cancel the triggered SL-CSI reporting as soon as the MAC layer generates the Sidelink CSI Reporting MAC CE. However, upon detection of an LBT failure for the MAC PDU carrying this MAC CE, the MAC layer may revert its decision to cancel the triggered SL-CSI reporting, and it may restart the stopped sl-CSI-ReportTimer for the triggered SL-CSI reporting. For example, it may re-trigger the SL-CSI reporting, and it may start a sl-CSI-ReportTimer. However, the timer is set to a value that is based on the time remaining to send the CSI report. For example, the difference between the configured sl-LatencyBoundCSI-Report and the time already spent waiting to transmit the CSI report.

One issue unique to unlicensed operation is what to do if Sidelink CSI report undergoes an LBT failure. One option is to delay the transmission of the MAC PDU until a later time, as used for NR-U. Here, all HARQ processes that have The MAC entity may for each pair of the Source Layer-2 ID and the Destination Layer-2 ID corresponding to a PC5- RRC connection which has been established by upper layers:
1> if the SL-CSI reporting has been triggered by a SCI and not cancelled:
  2> if the sl-CSI-ReportTimer for the triggered SL-CSI reporting is not running:
  3> start the sl-CSI-ReportTimer.
  2> if the sl-CSI-ReportTimer for the triggered SL-CSI reporting expires:
    3> cancel the triggered SL-CSI reporting.
  2> else if the MAC entity has SL resources allocated for new transmission and the SL-SCH resources can accommodate the SL-CSI reporting MAC CE and its subheader as a result of logical channel prioritization:
    3> instruct the Multiplexing and Assembly procedure to generate a Sidelink CSI Reporting MAC CE as defined in clause 6.1.3.35;
    3> if LBT success is detected for the new transmission:
      4> stop the sl-CSI-ReportTimer for the triggered SL-CSI reporting;
      4> cancel the triggered SL-CSI reporting.
  2> else if the MAC entity has been configured with Sidelink resource allocation mode 1:
    3>trigger a Scheduling Request.

Alternatively, the new criteria may also be based on LBT failure detections. For example, the MAC specification TS 38.321 may be modified as follows:

MAC PDUs that result in an LBT failure, are considered "pending." For these available uplink grants, the WTRU relies on implementation to determine which of the "pend- 1> if the SL-CSI reporting has been triggered by a SCI and not cancelled:
  2> if the sl-CSI-ReportTimer for the triggered SL-CSI reporting is not running:
  3> start the sl-CSI-ReportTimer.
  2> if the sl-CSI-ReportTimer for the triggered SL-CSI reporting expires:
    3> cancel the triggered SL-CSI reporting.
  2> else if the MAC entity has SL resources allocated for new transmission and the SL-SCH resources can
  accommodate the SL-CSI reporting MAC CE and its subheader as a result of logical channel prioritization:
    3> instruct the Multiplexing and Assembly procedure to generate a Sidelink CSI Reporting MAC CE as
    defined in clause 6.1.3.35;
    3> if no LBT failure is detected for the new transmission:
      4> stop the sl-CSI-ReportTimer for the triggered SL-CSI reporting;
      4> cancel the triggered SL-CSI reporting.
  3> else if the MAC entity has been configured with Sidelink resource allocation mode 1:
    3>trigger a Scheduling Request.

The time when the MAC layer generates the Sidelink CSI Reporting MAC CE and the time when the MAC layer generates the MAC PDU carrying this MAC CE do not necessarily coincide. It is expected that typically the MAC layer may generate the MAC CE before the MAC PDU is built. In such a case, it is also proposed that the MAC layer keeps track of which MAC PDU carries the CSI report MAC ing" HARQ processes uses this grant. If no special action is taken, the WTRU may not prioritize the pending" HARQ processes that may transmit the Sidelink CSI report. In so doing, the latency bound of the CSI report may not be met. As a result, when choosing a HARQ process, the WTRU may prioritize the "pending" HARQ process that have MAC PDUs that carry a SL CSI report. As a further enhancement, the WTRU may stop this prioritization when the latency bound is exceeded.

One issue with the delaying the CSI report because of LBT failures, is that the CSI triggering WTRU may not know the conditions under which the CSI report was generated. It is proposed that when CSI report MAC CE transmission is blocked by LBT Failure, and retransmitted later in time, additional signaling is introduced to either inform the CSI triggering WTRU when the CSI report was calculated and/or inform the CSI triggering WTRU of the transmission conditions when the CSI report was calculated.

When not operating in unlicensed spectrum and LBT is not used, the CSI triggering WTRU can determine when the CSI report calculation was made. The below address this problem:

Provide an additional indication in the CSI report that allows the CSI triggering WTRU to determine when the CSI report calculation was made. This may be the delay caused by LBT relative to the time of the first LBT failure, or it may be an absolute time reference.

LBT Failures and/or LBT Successes may be independently indicated to the CSI triggering WTRU so that the CSI triggering WTRU may determine the effective delay incurred by LBT for the CSI report.

The CSI triggering WTRU may receive additional information which allows the CSI triggering WTRU to know how the CSI report was calculated. Alternatively, the CSI triggering WTRU may indicated LBT Failure and Success to the CSI triggering WTRU, allowing the CSI triggering WTRU to determine there were LBT Failures which delayed the CSI report.

A scheduling request procedure may be performed in accordance with one embodiment, which can be used in combination with any of the other embodiments described herein. A sidelink Scheduling Request is used for requesting SL-SCH resources for new transmissions when triggered by the Sidelink BSR or the SL-CSI reporting. Pending SR(s) should only be cancelled, and SR Prohibit Timer should only be stopped when LBT success is determined for BSR transmission. This is necessary to ensure the Prohibit Timer, delaying subsequent SR transmissions is not set when the current SR is not transmitted due to LBT Failure.

The following modifications to the sidelink SR procedure of TS 38.321 take into account the effect of LBT:

---

All pending SR(s) triggered according to the Sidelink BSR procedure (clause 5.22.1.6) prior to the MAC PDU assembly may be cancelled and each respective sr-ProhibitTimer may be stopped when LBT success is determined for the MAC PDU that is transmitted and this PDU includes a SL-BSR MAC CE which contains buffer status up to (and including) the last event that triggered a Sidelink BSR (see clause 5.22.1.4) prior to the MAC PDU assembly.

---

The example above from TS 38.321 may also be expressed in terms of LBT failure detection instead of LBT success detection as follows:

---

All pending SR(s) triggered according to the Sidelink BSR procedure (clause 5.22.1.6) prior to the MAC PDU assembly may be cancelled and each respective sr-ProhibitTimer may be stopped when no LBT failure is determined for the MAC PDU that is transmitted and this PDU includes a SL-BSR MAC CE which contains buffer status up to (and including) the last event that triggered a Sidelink BSR (see clause 5.22.1.4) prior to the MAC PDU assembly.

---

Alternatively, pending SR(s) may be cancelled, and prohibit timers may be stopped when the MAC PDU including the BSR is provided to the PHY layer as it is done in the existing Rel 16 procedure, but if LBT failure (or equivalently no LBT success) is determined the Pending SR(s) are restored and the Prohibit Timer restarted.

In addition, in Rel. 16 devices may cancel pending SR triggered according to the SL-CSI reporting and stop the respective sr-ProhibitTimer under two conditions: 1) when a SL grant(s) can accommodate the Sidelink CSI Reporting MAC CE 2) when the SL-CSI report is cancelled due to latency non-fulfilment. The first condition assumes that the WTRU may use the SL grant in time, which is before the SL-CSI report is cancelled due to latency non-fulfilment. However, the MAC PDU carrying the SL-CSI report on the sidelink grant may undergo an LBT failure, and its transmission may be delayed. The delayed transmission may be such that the SL-CSI report may not meet the latency requirement. To correct for this issue, it is proposed that the first condition be modified to make sure the MAC PDU carrying the SL CSI report undergoes a LBT success prior to the latency limit. The following modifications may be made to the sidelink SR procedure of TS 38.321 to take into account the effect of LBT:

The pending SR triggered according to the SL-CSI reporting for a destination may be cancelled and each respective sr-ProhibitTimer may be stopped when the MAC PDU carrying the SL-CSI report undergoes a LBT success before the latency limit ~~the SL grant(s) can accommodate the Sidelink CSI Reporting MAC CE when the SL-CSI reporting that has been triggered but not cancelled~~ or when the triggered SL-CSI report is cancelled due to latency non-fulfilment as specified in 5.22.1.7. All pending SR(s) triggered by either Sidelink BSR or Sidelink CSI report may be cancelled, when RRC configures Sidelink resource allocation mode 2.

A buffer status reporting procedure may be performed in accordance with one embodiment, which can be used in combination with any of the other embodiments described herein. The following modifications to the BSR procedure may be made to take into account the effect of LBT in sidelink:

If a Regular BSR has been triggered and there are UL-SCH resources available for transmission, but the transmission is blocked by LBT Failure an SR should be triggered. This is necessary since if the available grant is lost due to LBT Failure a new SR is needed to help ensure a subsequent grant is made available for transmission of the BSR.

For example, the MAC specification TS 38.321 may be modified as follows:

2> if a Regular BSR has been triggered and logicalChannelSR-DelayTimer is not running:

3> if there is no UL-SCH resource available for a new transmission; or

3> if UL-SCH resources are available for a new transmission and the UL-SCH resources cannot accommodate the SL-BSR MAC CE plus its subheader as a result of logical channel prioritization according to clause 5.4.3.1; or 3> if the set of Subcarrier Spacing index values in sl-AllowedSCS-List, if configured for the logical channel that triggered the SL-BSR, does not include the Subcarrier Spacing index associated to the UL-SCH resources available for a new transmission; or 3> if sl-MaxPUSCH-Duration, if configured for the logical channel that triggered the SL-BSR, is smaller than the PUSCH transmission duration associated to the UL-SCH resources available for a new transmission; or 3> if there are UL-SCH resources available for transmission and LBT Failure has been detected for this transmission:

4> trigger a Scheduling Request.

While the modified text above is described in terms of LBT Failure, it may have been also expressed in terms of no LBT Success.

The LBT Failure or LBT Success may not be a single instance. It may be a number of LBT Failure or Success detections. An SR may be triggered only after a series of LBT Failures affecting MAC BSR CE transmission.

A procedure may also be defined to count LBT Failures or LBT Successes, or to count consecutive LBT Failures or consecutive LBT Successes. Only if LBT Failures or consecutive LBT Failures exceeding a configured Maximum LBT Failure Threshold or if LBT Successes or consecutive LBT Successes are less than a configured Minimum LBT Success Threshold, is an SR triggered.

When BSR MAC CE transmission is blocked by LBT Failure and retransmitted later in time additional signaling is introduced to either inform the NB when the BSR was calculated and/or informs the NB of the transmission conditions when the BSR was calculated.

In order for the NB to properly process BSR it is necessary for the NB to know when the BSR was calculated.

When not operating in unlicensed spectrum and LBT is not used, the NB can roughly know when the content of the BSR was determined. Since the NB is aware of what scheduled and received and the rules for BSR, it can adequately interpret the BSR. But when LBT Fails and the transmission is delayed until LBT Success, the NB may receive an outdated BSR or inaccurate BSR leading potentially to more resource assignment than required by the WTRU, or less resources than needed by WTRU and/or transmission delay and QoS assurance penalty.

The following examples may solve this problem:

Provide an additional indication to the BSR that allows the NB to determine when the BSR was built. This may be the delay caused by LBT relative to the time of the first LBT failure, or it may be an absolute time reference.

LBT Failures and/or Successes may be independently indicated to the NB so that the NB may determine the effective delay incurred by LBT for the BSR.

Provide additional information with the BSR that informs the NB of the grant (e.g., uplink grant) used when the BSR was calculated.

It is preferred but it is not absolute necessary for the NB to receive additional information which allows the NB to know when the BSR was built. Alternatively, the NB must at least know when a BSR is providing inaccurate information. This may be accomplished by the WTRU indicating LBT Failure and Success to the NB, allowing the NB to determine there were LBT Failures which delayed the BSR.

BSR Triggering conditions should consider LBT Failures. New data becoming available and fulfilling the currently specified regular BSR triggering criteria, padding BSR triggering condition, BSR Retransmission Timer expiration, BSR Periodic Timer expiration, triggering criteria should only be considered when LBT succeeds. The addition of LBT criteria is mutually exclusive for each existing trigger and may therefore only affect a subset of the existing criteria.

For example (where all triggers are considered), the MAC specification TS 38.321 may be modified as follows:

A SL-BSR may be triggered if any of the following events occur:

1> if the MAC entity has been configured with Sidelink resource allocation mode 1:

-continued

4> SL data, for a logical channel of a Destination, becomes available to the MAC entity; and either
3> this SL data belongs to a logical channel with higher priority than the priorities of the logical channels containing available SL data which belong to any LCG belonging to the same Destination and LBT subsequently succeeds; or
5> none of the logical channels which belong to an LCG belonging to the same Destination contains any available SL data and LBT subsequently succeeds.
in which case the SL-BSR is referred below to as 'Regular SL-BSR';
2> UL resources are allocated and number of padding bits remaining after a Padding BSR has been triggered is equal to or larger than the size of the SL-BSR MAC CE plus its subheader, in which case the SL-BSR is referred below to as 'Padding SL-BSR';
2> sl-retxBSR-Timer expires, and at least one of the logical channels which belong to an LCG contains SL data, and LBT subsequently succeeds, in which case the SL-BSR is referred below to as 'Regular SL-BSR';
2> sl-periodicBSR-Timer expires, and LBT subsequently succeeds, in which case the SL-BSR is referred below to as 'Periodic SL-BSR'.
1> else:
2> Sidelink resource allocation mode 1 is configured by RRC and SL data is available for transmission in the RLC entity or in the PDCP entity, in which case the Sidelink BSR is referred below to as "Regular SL-BSR".
:
The MAC entity may:
1> if the sidelink Buffer Status reporting procedure determines that at least one SL-BSR has been triggered and not cancelled:
2> if UL-SCH resources are available for a new transmission and LBT Success is determined, and the UL-SCH resources can accommodate the
SL-BSR MAC CE plus its subheader as a result of logical channel prioritization according to clause 5.4.3.1:
3> instruct the Multiplexing and Assembly procedure in clause 5.4.3 to generate the SL-BSR MAC CE(s);
3> start or restart sl-periodicBSR-Timer except when all the generated SL-BSRs are Truncated SL-BSRs;
3> start or restart sl-retxBSR-Timer.
2> if a Regular SL-BSR has been triggered and sl-logicalChannelSR-DelayTimer is not running:
3> if there is no UL-SCH resource available for a new transmission; or
3> if UL-SCH resources are available for a new transmission and the UL-SCH resources cannot accommodate the SL-BSR MAC CE plus its subheader as a result of logical channel prioritization according to clause 5.4.3.1; or
3> if the set of Subcarrier Spacing index values in sl-AllowedSCS-List, if configured for the logical channel that triggered the SL-BSR, does not include the Subcarrier Spacing index associated to the UL-SCH resources available for a new transmission; or
3> if sl-MaxPUSCH-Duration, if configured for the logical channel that triggered the SL-BSR, is smaller than the PUSCH transmission duration associated to the UL-SCH resources available for a new transmission:
4> trigger a Scheduling Request.

A MAC PDU may contain at most one SL-BSR MAC CE, even when multiple events have triggered a SL-BSR. The Regular SL-BSR and the Periodic SL-BSR may have precedence over the padding SL-BSR.

The MAC entity may restart sl-retxBSR-Timer upon reception of an SL grant for transmission and LBT Success is determined of new data on any SLSCH.

All triggered SL-BSRs may be cancelled when the SL grant(s) can accommodate all pending data available for transmission. All BSRs triggered prior to MAC PDU assembly may be cancelled when LBT Success is determined and when a MAC PDU is transmitted and this PDU includes a SL-BSR MAC CE which contains buffer status up to (and including) the last event that triggered a SL-BSR prior to the MAC PDU assembly. All triggered SL-BSRs may be cancelled, and sl-retx-BSR-Timer and slperiodic-BSR-Timer may be stopped, when RRC configures Sidelink resource allocation mode 2.

While the modified text above is described in terms of LBT Success, it may have been also expressed in terms of no LBT Failure.

The LBT Failure or LBT Success may not be a single instance. It may be a number of LBT Failure or Success detections. An SR may be triggered only after a series of LBT Failures affecting MAC BSR CE transmission.

A procedure may also be defined to count LBT Failures or LBT Successes, or to count consecutive LBT Failures or consecutive LBT Successes. Only if LBT Failures or consecutive LBT Failures exceeding a configured Maximum LBT Failure Threshold or if LBT Successes or consecutive LBT Successes are less than a configured Minimum LBT Success Threshold, is an SR triggered.

While the exemplary MAC specific change above is described in terms of LBT success, the example may also be equally expressed in terms of no LBT Failure.

Alternatively, the BSR Periodic Timer and the BSR Retransmission Timer may be started or restarted as it is done in the existing procedure, but if LBT Failure is determined the BSR Periodic Timer and BSR Retransmission Timer is reset to the remaining value before the last reset because of LBT failure, or to a different time value for e.g., a configured time value.

This modification is necessary to ensure the BSR Periodic Timer or BSR Retransmission Timer are not reset so that periodic BSR or retransmission of BSR are not delayed when an BSR transmission is blocked by LBT Failure.

A MAC PDU retransmission procedure may be performed in accordance with one embodiment, which can be used in combination with any of the other embodiments described herein. In Mode 1 configured grant operation, a WTRU may be configured with IE: sl-Max TransNum, which determines the maximum number of transmissions for a SL HARQ process.

One issue with unlicensed bands is that a TX WTRU may not transmit a MAC PDU because of an LBT failure. In such a case, the count of the maximum number of transmissions for a SL HARQ process needs to take into account the LBT failures.

In mode 2 resource allocation, the TX WTRU may be configured with IE: sl-MaxTxTransNumPSSCH, which indicates the maximum transmission number (including new transmission and retransmission) for PSSCH. When the MAC entity determines the selected sidelink grants, it determines the number of HARQ retransmissions for a MAC PDU, from the configured IE: MaxTxTransNumPSSCH.

One issue with unlicensed bands is that a TX WTRU may not transmit a MAC PDU because of an LBT failure. In such a case, the TX WTRU would not make the configured number of retransmissions of the MAC PDU.

In order to address both these issues, upper layers may be notified that the MAC PDU was not transmitted the configured number of times.

The 3rd Generation Partnership Project (3GPP) develops technical standards for cellular telecommunications network technologies, including radio access, the core transport network, and service capabilities-including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G." 3GPP NR standards development is expected to continue and include the definition of next generation radio access technology (new RAT), which is expected to include the provision of new flexible radio access below 7 GHZ, and the provision of new ultra-mobile broadband radio access above 7 GHz. The flexible radio access is expected to consist of a new, non-backwards compatible radio access in new spectrum below 7 GHZ, and it is expected to include different operating modes that may be multiplexed together in the same spectrum to address a broad set of 3GPP NR use cases with diverging requirements. The ultra-mobile broadband is expected to include cmWave and mmWave spectrum that may provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 8A:
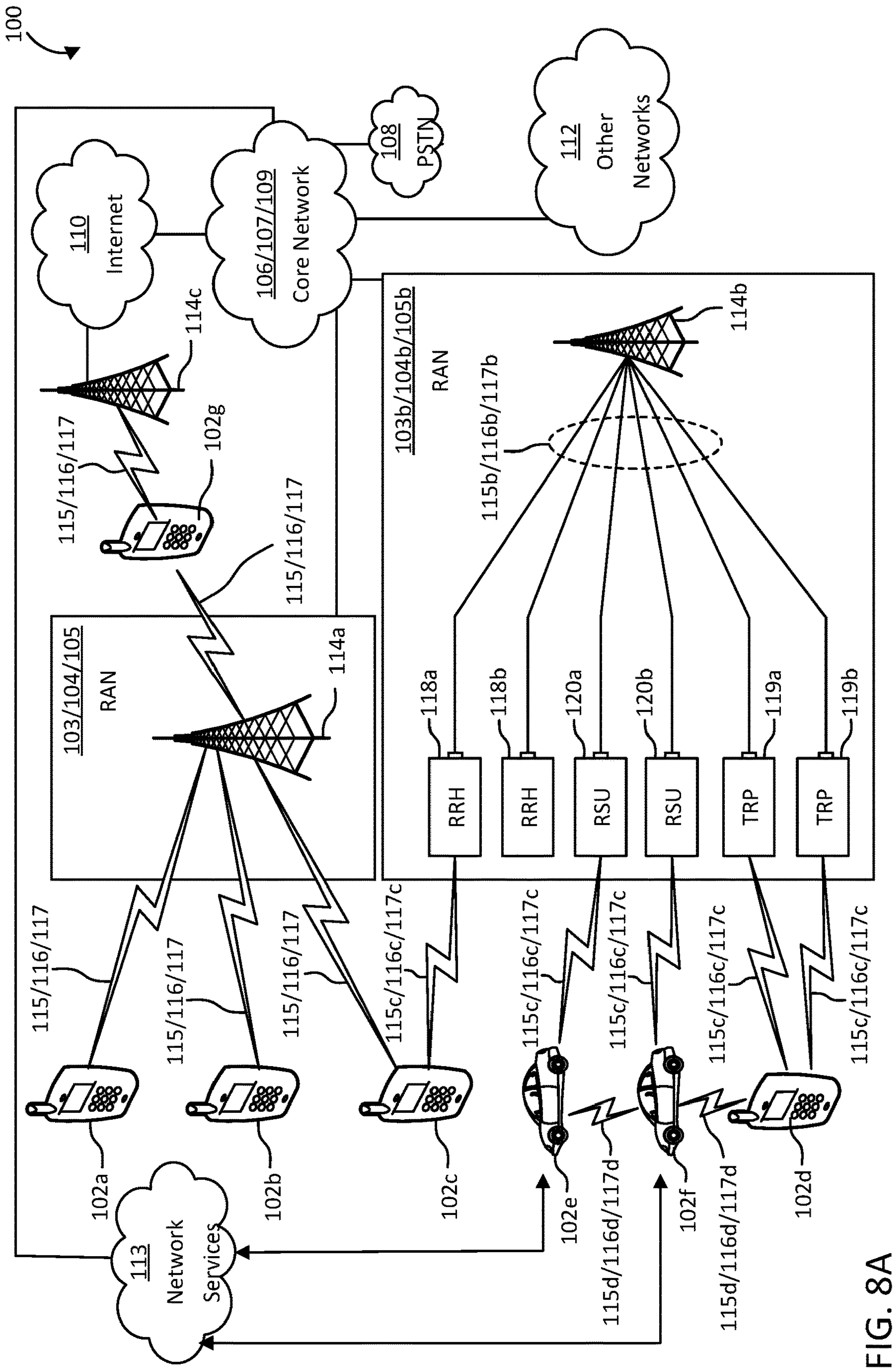
FIG. 8A shows an example communications system.

FIG. 8A illustrates an example communications system 100 in which the systems, methods, and apparatuses described and claimed herein may be used. The communications system 100 may include WTRUs 102*a*, 102*b*, 102*c*, 102*d*, 102*e*, 102*f*, and/or 102*g*, which generally or collectively may be referred to as WTRU 102 or WTRUs 102. The communications system 100 may include, a radio access network (RAN) 103/104/105/103*b*/104*b*/105*b*, a core network 106/107/109, a public switched telephone network (PSTN) 108, the Internet 110, other networks 112, and Network Services 113. 113. Network Services 113 may include, for example, a V2X server, V2X functions, a ProSe server, ProSe functions, IoT services, video streaming, and/or edge computing, etc.

It may be appreciated that the concepts disclosed herein may be used with any number of WTRUs, base stations, networks, and/or network elements. Each of the WTRUs 102 may be any type of apparatus or device configured to operate and/or communicate in a wireless environment. In the example of FIG. 8A, each of the WTRUs 102 is depicted in FIGS. 8A-E as a hand-held wireless communications apparatus. As aforementioned, it is understood that with the wide variety of use cases contemplated for wireless communications, each WTRU may comprise or be included in any type of apparatus or device configured to transmit and/or receive wireless signals, including, by way of example only, UE, a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 may also include a base station 114*a* and a base station 114*b*. In the example of FIG. 8A, each base stations 114*a* and 114*b* is depicted as a single element. In practice, the base stations 114*a* and 114*b* may include any number of interconnected base stations and/or network elements. Base stations 114*a* may be any type of device configured to wirelessly interface with at least one of the WTRUs 102*a*, 102*b*, and 102*c* to facilitate access to one or more communication networks, such as the core network 106/107/109, the Internet 110, Network Services 113, and/or the other networks 112. Similarly, base station 114*b* may be any type of device configured to wiredly and/or wirelessly interface with at least one of the Remote Radio Heads (RRHs) 118*a*, 118*b*, Transmission and Reception Points (TRPs) 119*a*, 119*b*, and/or Roadside Units (RSUs) 120*a* and 120*b* to facilitate access to one or more communication networks, such as the core network 106/107/109, the Internet 110, other networks 112, and/or Network Services 113. RRHs 118*a*, 118*b* may be any type of device configured to wirelessly interface with at least one of the WTRUs 102, e.g., WTRU 102*c*, to facilitate access to one or more communication networks, such as the core network 106/107/109, the Internet 110, Network Services 113, and/or other networks 112.

TRPs 119*a*, 119*b* may be any type of device configured to wirelessly interface with at least one of the WTRU 102*d*, to facilitate access to one or more communication networks, such as the core network 106/107/109, the Internet 110, Network Services 113, and/or other networks 112. RSUs 120*a* and 120*b* may be any type of device configured to wirelessly interface with at least one of the WTRU 102*e* or 102*f*, to facilitate access to one or more communication networks, such as the core network 106/107/109, the Internet 110, other networks 112, and/or Network Services 113. By way of example, the base stations 114*a*, 114*b* may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114*a* may be part of the RAN 103/104/105, which may also include other base stations and/or network elements (not shown), such as a Base Station Controller (BSC), a Radio Network Controller (RNC), relay nodes, etc. Similarly, the base station 114*b* may be part of the RAN 103*b*/104*b*/105*b*, which may also include other base stations and/or network elements (not shown), such as a BSC, a RNC, relay nodes, etc. The base station 114*a* may be configured to transmit and/or receive wireless signals within a particular geographic region, which may be referred to as a cell (not shown). Similarly, the base station 114*b* may be configured to transmit and/or receive wired and/or wireless signals within a particular geographic region, which may be referred to as a cell (not shown). The cell may further be divided into cell sectors. For example, the cell associated with the base station 114*a* may be divided into three sectors. Thus, for example, the base station 114*a* may include three transceivers, e.g., one for each sector of the cell. The base station 114*a* may employ Multiple-Input Multiple Output (MIMO) technology and, therefore, may utilize multiple transceivers for each sector of the cell, for instance.

The base station 114*a* may communicate with one or more of the WTRUs 102*a*, 102*b*, 102*c*, and 102*g* over an air interface 115/116/117, which may be any suitable wireless communication link (e.g., Radio Frequency (RF), microwave, infrared (IR), ultraviolet (UV), visible light, cmWave, mmWave, etc.). The air interface 115/116/117 may be established using any suitable Radio Access Technology (RAT).

The base station 114*b* may communicate with one or more of the RRHs 118*a* and 118*b*, TRPs 119*a* and 119*b*, and/or RSUs 120*a* and 120*b*, over a wired or air interface 115*b*/116*b*/117*b*, which may be any suitable wired (e.g., cable, optical fiber, etc.) or wireless communication link (e.g., RF, microwave, IR, UV, visible light, cmWave, mmWave, etc.). The air interface 115*b*/116*b*/117*b* may be established using any suitable RAT.

The RRHs 118*a*, 118*b*, TRPs 119*a*, 119*b* and/or RSUs 120*a*, 120*b*, may communicate with one or more of the WTRUs 102*c*, 102*d*, 102*e*, 102*f* over an air interface 115*c*/116*c*/117*c*, which may be any suitable wireless communication link (e.g., RF, microwave, IR, ultraviolet UV, visible light, cmWave, mmWave, etc.) The air interface 115*c*/116*c*/117*c* may be established using any suitable RAT.

The WTRUs 102 may communicate with one another over a direct air interface 115*d*/116*d*/117*d*, such as Sidelink communication which may be any suitable wireless communication link (e.g., RF, microwave, IR, ultraviolet UV, visible light, cmWave, mmWave, etc.) The air interface 115*d*/116*d*/117*d* may be established using any suitable RAT.

The communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c*, or RRHs 118*a*, 118*b*, TRPs 119*a*, 119*b* and/or RSUs 120*a* and 120*b* in the RAN 103*b*/104*b*/105*b* and the WTRUs 102*c*, 102*d*, 102*e*, and 102*f*, may implement a radio technology such as Universal Mobile Telecommunications System (UMTS) Terrestrial Radio Access (UTRA), which may establish the air interface 115/116/117 and/or 115*c*/116*c*/117*c* respectively using Wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114*a* in the RAN 103/104/105 and the WTRUs 102*a*, 102*b*, 102*c*, and 102*g*, or RRHs 118*a* and 118*b*, TRPs 119*a* and 119*b*, and/or RSUs 120*a* and 120*b* in the RAN 103*b*/104*b*/105*b* and the WTRUs 102*c*, 102*d*, may implement a radio technology such as Evolved UMTS Terrestrial Radio Access (E-UTRA), which may establish the air interface 115/116/117 or 115*c*/116*c*/117*c* respectively using Long Term Evolution (LTE) and/or LTE-Advanced (LTE-A), for example. The air interface 115/116/117 or 115*c*/116*c*/117*c* may implement 3GPP NR technology. The LTE and LTE-A technology may include LTE D2D and/or V2X technologies and interfaces (such as Sidelink communications, etc.) Similarly, the 3GPP NR technology may include NR V2X technologies and interfaces (such as Sidelink communications, etc.)

The base station 114*a* in the RAN 103/104/105 and the WTRUs 102*a*, 102*b*, 102*c*, and 102*g* or RRHs 118*a* and 118*b*, TRPs 119*a* and 119*b*, and/or RSUs 120*a* and 120*b* in the RAN 103*b*/104*b*/105*b* and the WTRUs 102*c*, 102*d*, 102*e*, and 102*f* may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*c* in FIG. 8A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. The base station 114*c* and the WTRUs 102, e.g., WTRU 102*e*, may implement a radio technology such as IEEE 802.11 to establish a Wireless Local Area Network (WLAN). Similarly, the base station 114*c* and the WTRUs 102, e.g., WTRU 102*d*, may implement a radio technology such as IEEE 802.15 to establish a wireless personal area network (WPAN). The base station 114*c* and the WTRUs 102, e.g., WTRU 102*e*, may utilize a cellular-based RAT (e.g., WCDMA, CDMA2000, GSM, LTE, LTE-A, NR, etc.) to establish a picocell or femtocell. As shown in FIG. 8A, the base station 114*c* may have a direct connection to the Internet 110. Thus, the base station 114*c* may not be required to access the Internet 110 via the core network 106/107/109.

The RAN 103/104/105 and/or RAN 103*b*/104*b*/105*b* may be in communication with the core network 106/107/109, which may be any type of network configured to provide voice, data, messaging, authorization and authentication, applications, and/or Voice Over Internet Protocol (VOIP) services to one or more of the WTRUs 102. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 8A, it may be appreciated that the RAN 103/104/105 and/or RAN 103*b*/104*b*/105*b* and/or the core network 106/107/109 may be in direct or indirect communication with other RANs that employ the same RAT as the RAN 103/104/105 and/or RAN 103*b*/104*b*/

105*b* or a different RAT. For example, in addition to being connected to the RAN 103/104/105 and/or RAN 103*b*/104*b*/105*b*, which may be utilizing an E-UTRA radio technology, the core network 106/107/109 may also be in communication with another RAN (not shown) employing a GSM or NR radio technology.

The core network 106/107/109 may also serve as a gateway for the WTRUs 102 to access the PSTN 108, the Internet 110, and/or other networks 112. The PSTN 108 may include circuit-switched telephone networks that provide Plain Old Telephone Service (POTS). The Internet 110 may include a global system of interconnected computer networks and devices that use common communication protocols, such as the Transmission Control Protocol (TCP), User Datagram Protocol (UDP), and the internet protocol (IP) in the TCP/IP internet protocol suite. The other networks 112 may include wired or wireless communications networks owned and/or operated by other service providers. For example, the networks 112 may include any type of packet data network (e.g., an IEEE 802.3 Ethernet network) or another core network connected to one or more RANs, which may employ the same RAT as the RAN 103/104/105 and/or RAN 103*b*/104*b*/105*b* or a different RAT.

Some or all of the WTRUs 102*a*, 102*b*, 102*c*, 102*d*, 102*e*, and 102*f* in the communications system 100 may include multi-mode capabilities, e.g., the WTRUs 102*a*, 102*b*, 102*c*, 102*d*, 102*e*, and 102*f* may include multiple transceivers for communicating with different wireless networks over different wireless links. For example, the WTRU 102*g* shown in FIG. 8A may be configured to communicate with the base station 114*a*, which may employ a cellular-based radio technology, and with the base station 114*c*, which may employ an IEEE 802 radio technology.

Although not shown in FIG. 8A, it may be appreciated that a User Equipment may make a wired connection to a gateway. The gateway may be a Residential Gateway (RG). The RG may provide connectivity to a Core Network 106/107/109. It may be appreciated that many of the ideas contained herein may equally apply to UEs that are WTRUs and UEs that use a wired connection to connect to a network. For example, the ideas that apply to the wireless interfaces 115, 116, 117 and 115*c*/116*c*/117*c* may equally apply to a wired connection.

Figure 8B:
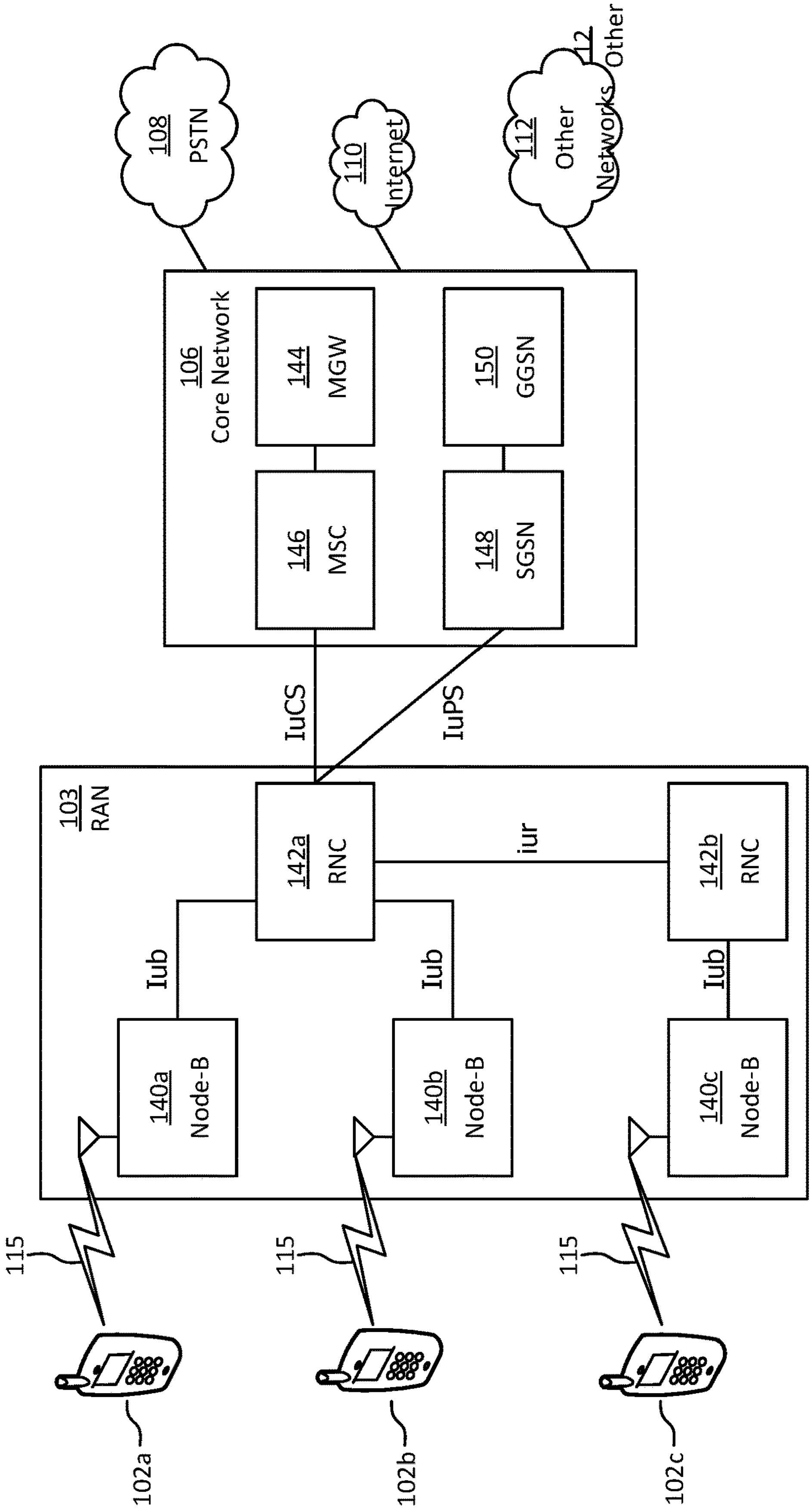
FIG. 8B shows an example communications system.

FIG. 8B is a system diagram of an example RAN 103 and core network 106. As noted above, the RAN 103 may employ a UTRA radio technology to communicate with the WTRUs 102*a*, 102*b*, and 102*c* over the air interface 115. The RAN 103 may also be in communication with the core network 106. As shown in FIG. 8B, the RAN 103 may include Node-Bs 140*a*, 140*b*, and 140*c*, which may each include one or more transceivers for communicating with the WTRUs 102*a*, 102*b*, and 102*c* over the air interface 115. The Node-Bs 140*a*, 140*b*, and 140*c* may each be associated with a particular cell (not shown) within the RAN 103. The RAN 103 may also include RNCs 142*a*, 142*b*. It may be appreciated that the RAN 103 may include any number of Node-Bs and Radio Network Controllers (RNCs.)

As shown in FIG. 8B, the Node-Bs 140*a*, 140*b* may be in communication with the RNC 142*a*. Additionally, the Node-B 140*c* may be in communication with the RNC 142*b*. The Node-Bs 140*a*, 140*b*, and 140*c* may communicate with the respective RNCs 142*a* and 142*b* via an Iub interface. The RNCs 142*a* and 142*b* may be in communication with one another via an Iur interface. Each of the RNCs 142*a* and 142*b* may be configured to control the respective Node-Bs 140*a*, 140*b*, and 140*c* to which it is connected. In addition, each of the RNCs 142*a* and 142*b* may be configured to carry out or support other functionality, such as outer loop power control, load control, admission control, packet scheduling, handover control, macro-diversity, security functions, data encryption, and the like.

The core network 106 shown in FIG. 8B may include a media gateway (MGW) 144, a Mobile Switching Center (MSC) 146, a Serving GPRS Support Node (SGSN) 148, and/or a Gateway GPRS Support Node (GGSN) 150. While each of the foregoing elements are depicted as part of the core network 106, it may be appreciated that any one of these elements may be owned and/or operated by an entity other than the core network operator.

The RNC 142*a* in the RAN 103 may be connected to the MSC 146 in the core network 106 via an IuCS interface. The MSC 146 may be connected to the MGW 144. The MSC 146 and the MGW 144 may provide the WTRUs 102*a*, 102*b*, and 102*c* with access to circuit-switched networks, such as the PSTN 108, to facilitate communications between the WTRUs 102*a*, 102*b*, and 102*c*, and traditional land-line communications devices.

The RNC 142*a* in the RAN 103 may also be connected to the SGSN 148 in the core network 106 via an IuPS interface. The SGSN 148 may be connected to the GGSN 150. The SGSN 148 and the GGSN 150 may provide the WTRUs 102*a*, 102*b*, and 102*c* with access to packet-switched networks, such as the Internet 110, to facilitate communications between and the WTRUs 102*a*, 102*b*, and 102*c*, and IP-enabled devices.

The core network 106 may also be connected to the other networks 112, which may include other wired or wireless networks that are owned and/or operated by other service providers.

Figure 8C:
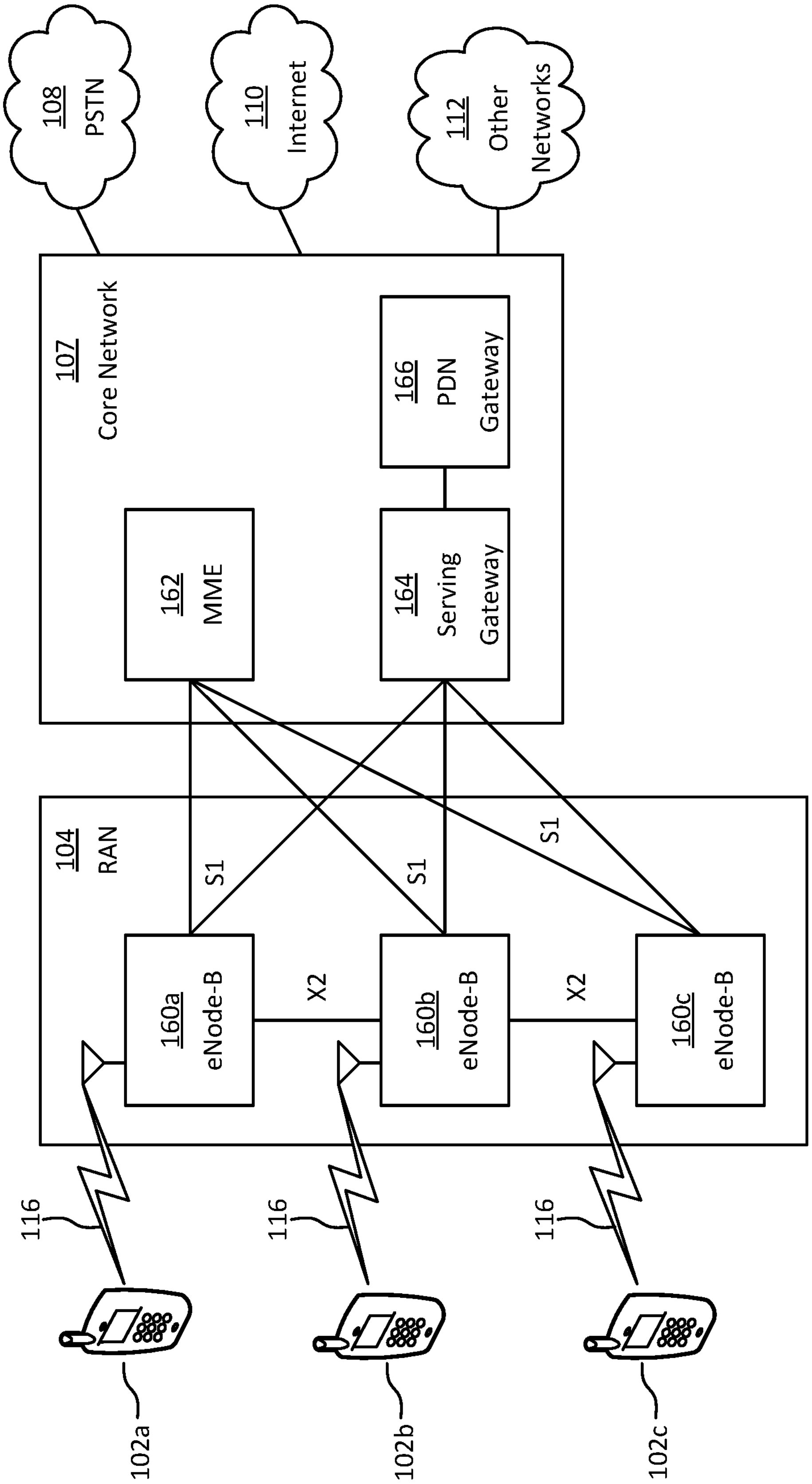
FIG. 8C shows an example communications system.

FIG. 8C is a system diagram of an example RAN 104 and core network 107. As noted above, the RAN 104 may employ an E-UTRA radio technology to communicate with the WTRUs 102*a*, 102*b*, and 102*c* over the air interface 116. The RAN 104 may also be in communication with the core network 107.

The RAN 104 may include eNode-Bs 160*a*, 160*b*, and 160*c*, though it may be appreciated that the RAN 104 may include any number of eNode-Bs. The eNode-Bs 160*a*, 160*b*, and 160*c* may each include one or more transceivers for communicating with the WTRUs 102*a*, 102*b*, and 102*c* over the air interface 116. For example, the eNode-Bs 160*a*, 160*b*, and 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink and/or downlink, and the like. As shown in FIG. 8C, the eNode-Bs 160*a*, 160*b*, and 160*c* may communicate with one another over an X2 interface.

The core network 107 shown in FIG. 8C may include a Mobility Management Gateway (MME) 162, a serving gateway 164, and a Packet Data Network (PDN) gateway 166. While each of the foregoing elements are depicted as part of the core network 107, it may be appreciated that any one of these elements may be owned and/or operated by an entity other than the core network operator.

The MME 162 may be connected to each of the eNode-Bs 160*a*, 160*b*, and 160*c* in the RAN 104 via an SI interface and may serve as a control node. For example, the MME 162 may be responsible for authenticating users of the WTRUs 102*a*, 102*b*, and 102*c*, bearer activation/deactivation, selecting a particular serving gateway during an initial attach of the WTRUs 102*a*, 102*b*, and 102*c*, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160*a*, 160*b*, and 160*c* in the RAN 104 via the SI interface. The serving gateway 164 may generally route and forward user data packets to/from the WTRUs 102*a*, 102*b*, and 102*c*. The serving gateway 164 may also perform other functions, such as anchoring user planes during inter-eNode B handovers, triggering paging when downlink data is available for the WTRUs 102*a*, 102*b*, and 102*c*, managing and storing contexts of the WTRUs 102*a*, 102*b*, and 102*c*, and the like.

The serving gateway 164 may also be connected to the PDN gateway 166, which may provide the WTRUs 102*a*, 102*b*, and 102*c* with access to packet-switched networks, such as the Internet 110, to facilitate communications between the WTRUs 102*a*, 102*b*, 102*c*, and IP-enabled devices.

The core network 107 may facilitate communications with other networks. For example, the core network 107 may provide the WTRUs 102*a*, 102*b*, and 102*c* with access to circuit-switched networks, such as the PSTN 108, to facilitate communications between the WTRUs 102*a*, 102*b*, and 102*c* and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102*a*, 102*b*, and 102*c* with access to the networks 112, which may include other wired or wireless networks that are owned and/or operated by other service providers.

Figure 8D:
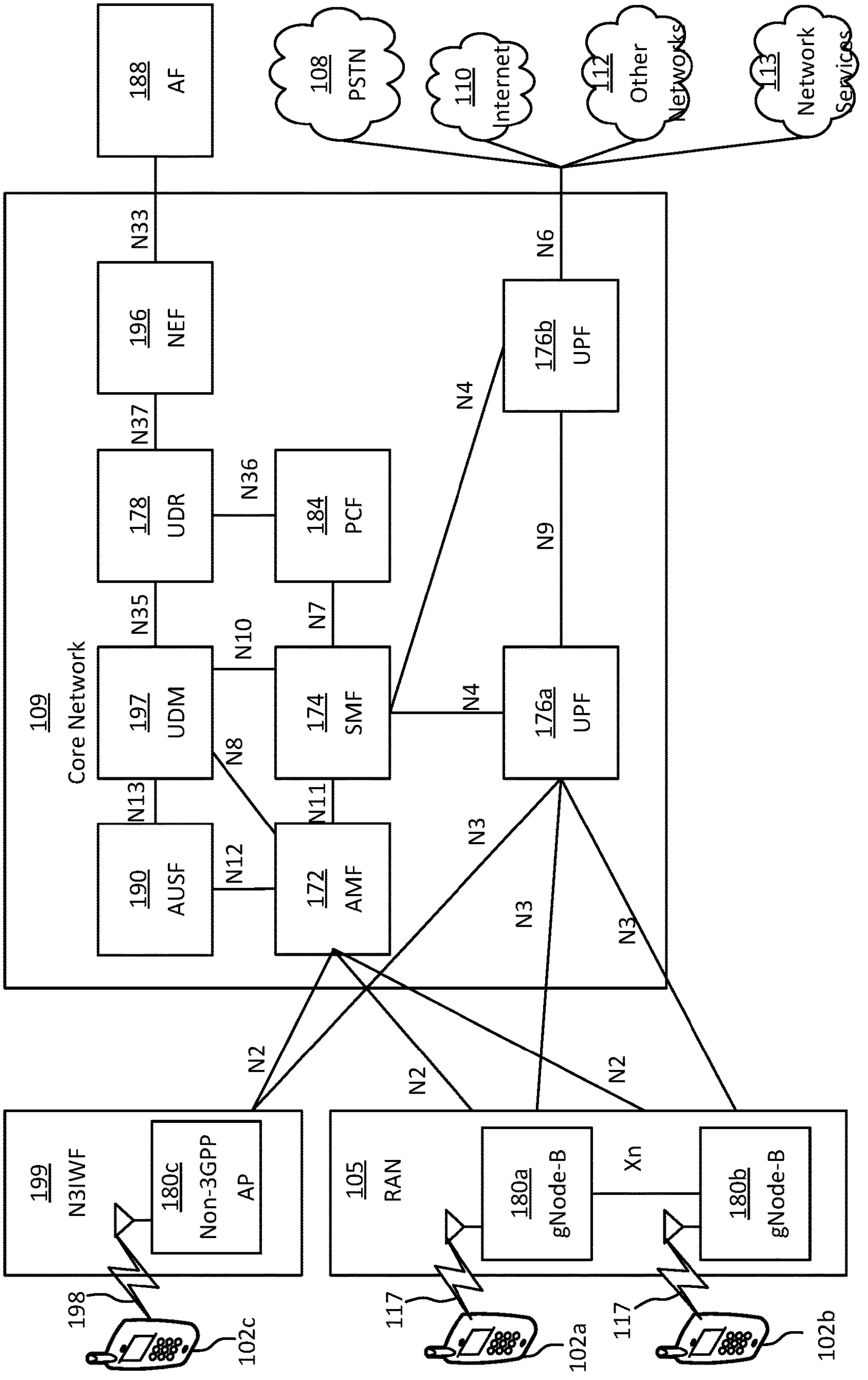
FIG. 8D are system diagrams of example RANs and core networks.

FIG. 8D is a system diagram of an example RAN 105 and core network 109. The RAN 105 may employ an NR radio technology to communicate with the WTRUs 102*a* and 102*b* over the air interface 117. The RAN 105 may also be in communication with the core network 109. A Non-3GPP Interworking Function (N3IWF) 199 may employ a non-3GPP radio technology to communicate with the WTRU 102*c* over the air interface 198. The N3IWF 199 may also be in communication with the core network 109.

The RAN 105 may include gNode-Bs 180*a* and 180*b*. It may be appreciated that the RAN 105 may include any number of gNode-Bs. The gNode-Bs 180*a* and 180*b* may each include one or more transceivers for communicating with the WTRUs 102*a* and 102*b* over the air interface 117. When integrated access and backhaul connection are used, the same air interface may be used between the WTRUs and gNode-Bs, which may be the core network 109 via one or multiple gNBs. The gNode-Bs 180*a* and 180*b* may implement MIMO, MU-MIMO, and/or digital beamforming technology. Thus, the gNode-B 180*a*, for example, may use multiple antennas to transmit wireless signals to, and receive wireless signals from, the WTRU 102*a*. It should be appreciated that the RAN 105 may employ of other types of base stations such as an eNode-B. It may also be appreciated the RAN 105 may employ more than one type of base station. For example, the RAN may employ eNode-Bs and gNode-Bs.

The N3IWF 199 may include a non-3GPP Access Point 180*c*. It may be appreciated that the N3IWF 199 may include any number of non-3GPP Access Points. The non-3GPP Access Point 180*c* may include one or more transceivers for communicating with the WTRUs 102*c* over the air interface 198. The non-3GPP Access Point 180*c* may use the 802.11 protocol to communicate with the WTRU 102*c* over the air interface 198.

Each of the gNode-Bs 180*a* and 180*b* may be associated with a particular cell (not shown) and may be configured to handle radio resource management decisions, handover decisions, scheduling of users in the uplink and/or downlink, and the like. As shown in FIG. 8D, the gNode-Bs 180*a* and 180*b* may communicate with one another over an Xn interface, for example.

The core network 109 shown in FIG. 8D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless and/or network communications or a computer system, such as system 90 illustrated in FIG. 8G.

In the example of FIG. 8D, the 5G Core Network 109 may include an access and mobility management function (AMF) 172, a Session Management Function (SMF) 174, User Plane Functions (UPFs) 176*a* and 176*b*, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it may be appreciated that any one of these elements may be owned and/or operated by an entity other than the core network operator. It may also be appreciated that a 5G core network may not consist of all of these elements, may consist of additional elements, and may consist of multiple instances of each of these elements. FIG. 8D shows that network functions directly connect to one another, however, it should be appreciated that they may communicate via routing agents such as a diameter routing agent or message buses.

In the example of FIG. 8D, connectivity between network functions is achieved via a set of interfaces, or reference points. It may be appreciated that network functions may be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102*a*, 102*b*, and 102*c* via an N1 interface. The N1 interface is not shown in FIG. 8D.

The SMF 174 may be connected to the AMF 172 via an N11 interface. Similarly, the SMF may be connected to the PCF 184 via an N7 interface, and to the UPFs 176*a* and 176*b* via an N4 interface. The SMF 174 may serve as a control node. For example, the SMF 174 may be responsible for Session Management, IP address allocation for the WTRUs 102*a*, 102*b*, and 102*c*, management and configuration of traffic steering rules in the UPF 176*a* and UPF 176*b*, and generation of downlink data notifications to the AMF 172.

The UPF 176*a* and UPF 176*b* may provide the WTRUs 102*a*, 102*b*, and 102*c* with access to a Packet Data Network (PDN), such as the Internet 110, to facilitate communications between the WTRUs 102*a*, 102*b*, and 102*c* and other devices. The UPF 176*a* and UPF 176*b* may also provide the WTRUs 102*a*, 102*b*, and 102*c* with access to other types of packet data networks. For example, Other Networks 112 may be Ethernet Networks or any type of network that exchanges packets of data. The UPF 176*a* and UPF 176*b* may receive traffic steering rules from the SMF 174 via the N4 interface. The UPF 176*a* and UPF 176*b* may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102*c* and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 8D. The PCF 184 may provide policy rules to control plane nodes such as the AMF 172 and SMF 174, allowing the control plane nodes to enforce these rules. The PCF 184 may send policies to the AMF 172 for the WTRUs 102*a*, 102*b*, and 102*c* so that the AMF may deliver the policies to the WTRUs 102*a*, 102*b*, and 102*c* via an N1 interface. Policies may then be enforced, or applied, at the WTRUs 102*a*, 102*b*, and 102*c*.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface, and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that may be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g., in the areas of functionality, performance, and isolation.

3GPP has designed the 5G core network to support Network Slicing. Network Slicing is a useful tool that network operators can use to support the diverse set of 5G use cases (e.g., massive IoT, critical communications, V2X, and enhanced mobile broadband) which demand diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 8D, in a network slicing scenario, a WTRU 102*a*, 102*b*, or 102*c* may connect to an AMF 172, via an N1 interface. The AMF may be logically part of one or more slices. The AMF may coordinate the connection or communication of WTRU 102*a*, 102*b*, or 102*c* with one or more UPF 176*a* and 176*b*, SMF 174, and other network functions. Each of the UPFs 176*a* and 176*b*, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, which serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102*a*, 102*b*, and 102*c* and servers or applications functions 188. In addition, the core network 170 may provide the WTRUs 102*a*, 102*b*, and 102*c* with access to the networks 112, which may include other wired or wireless networks that are owned and/or operated by other service providers.

The core network entities described herein and illustrated in FIG. 8A, FIG. 8C, FIG. 8D, and FIG. 8E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 8A-E are provided by way of example only, and it is understood that the subject matter disclosed and claimed herein may be embodied or implemented in any similar communication system, whether presently defined or defined in the future.

Figure 8E:
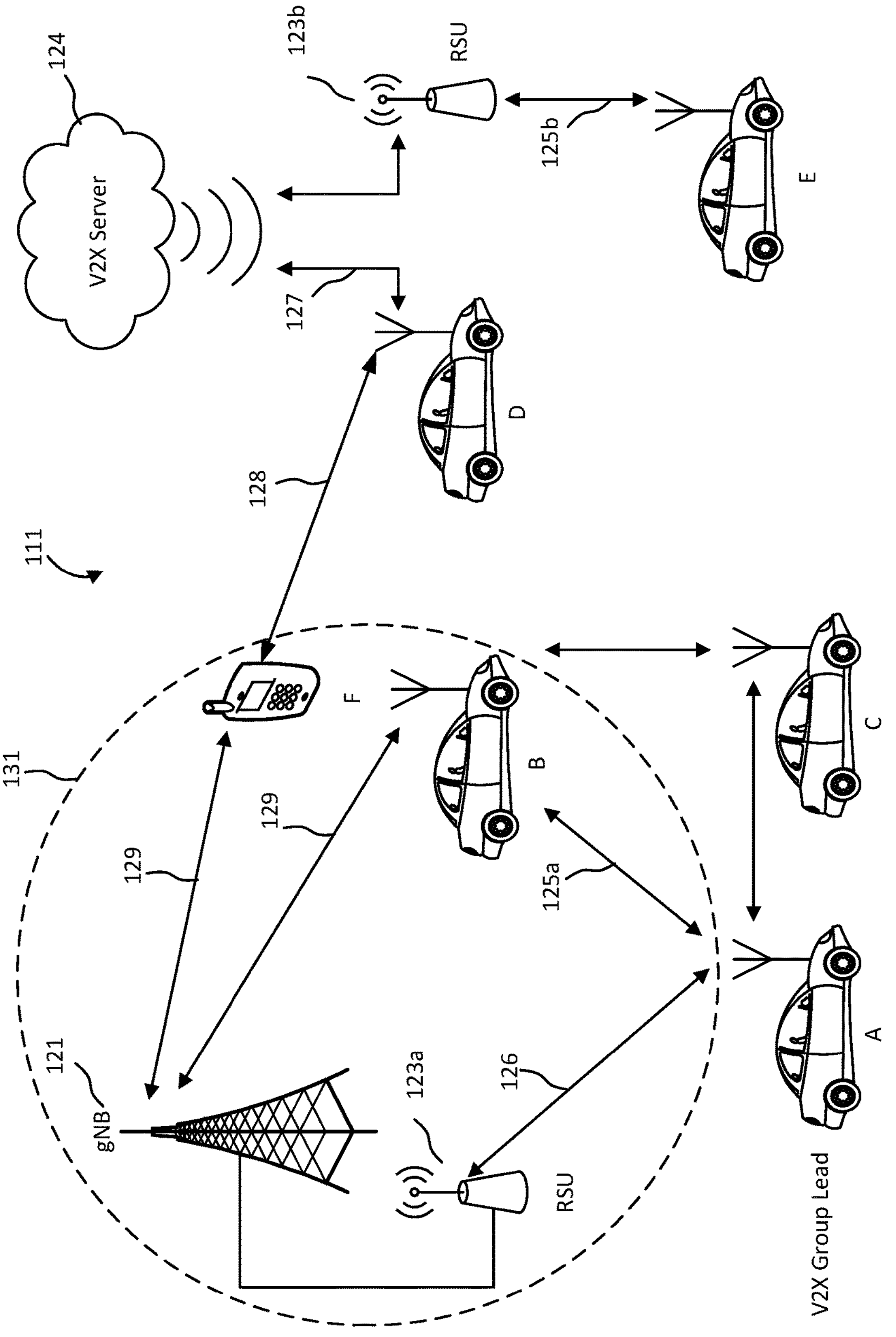
FIG. 8E illustrates another example communications system.

FIG. 8E illustrates an example communications system 111 in which the systems, methods, apparatuses described herein may be used. Communications system 111 may include Wireless Transmit/Receive Units (WTRUs) A, B, C, D, E, F, a base station gNB 121, a V2X server 124, and Roadside Units (RSUs) 123*a* and 123*b*. In practice, the concepts presented herein may be applied to any number of WTRUs, base station gNBs, V2X networks, and/or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUS A, B, C, D, E, and F may communicate with each other over a Uu interface 129 via the gNB 121 if they are within the access network coverage 131. In the example of FIG. 8E, WTRUs B and F are shown within access network coverage 131. WTRUs A, B, C, D, E, and F may communicate with each other directly via a Sidelink interface (e.g., PC5 or NR PC5) such as interface 125*a*, 125*b*, or 128, whether they are under the access network coverage 131 or out of the access network coverage 131. For instance, in the example of FIG. 8E, WTRU D, which is outside of the access network coverage 131, communicates with WTRU F, which is inside the coverage 131.

WTRUS A, B, C, D, E, and F may communicate with RSU 123*a* or 123*b* via a Vehicle-to-Network (V2N) 133 or Sidelink interface 125*b*. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 8F:
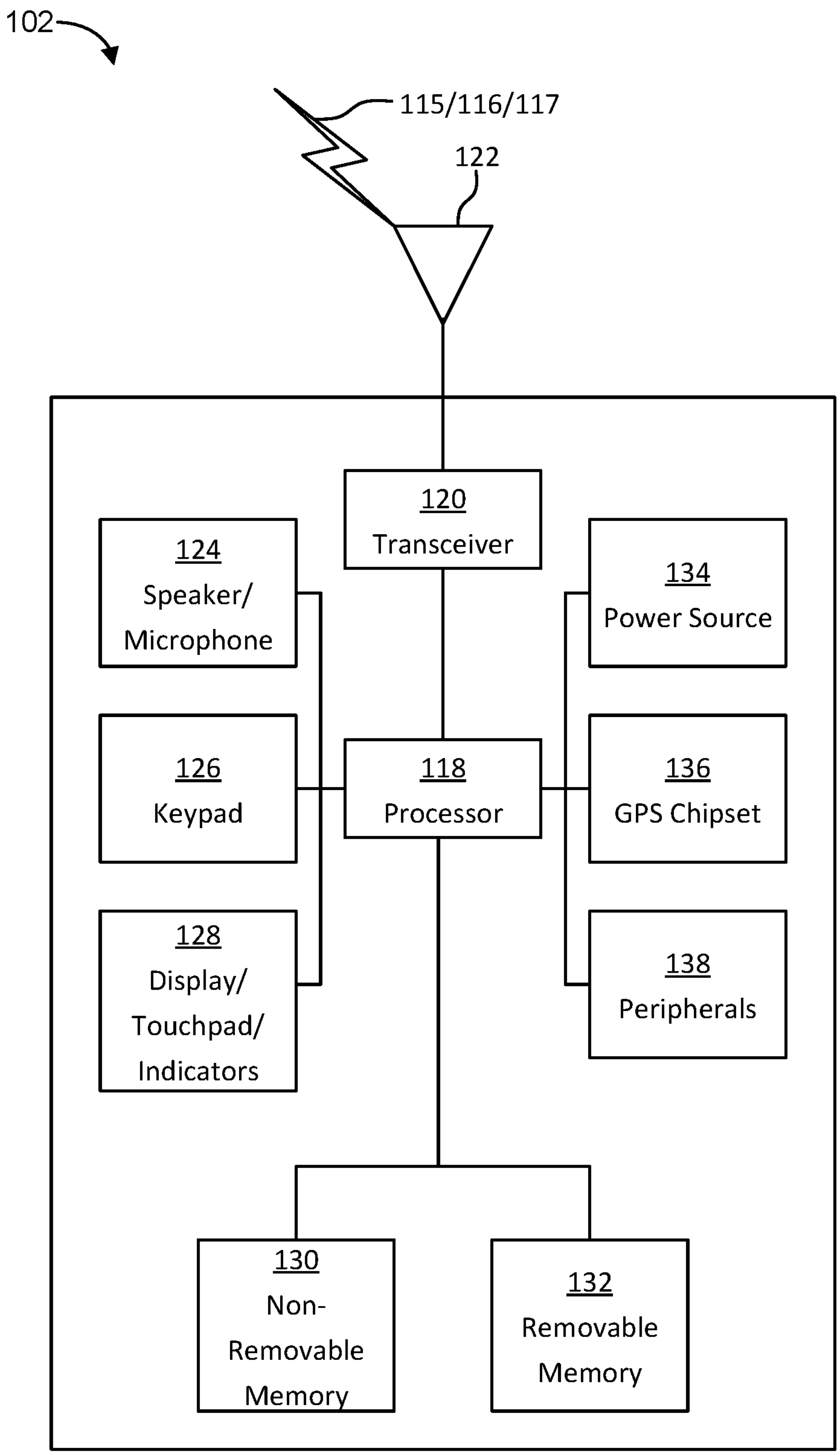
FIG. 8F is a block diagram of an example apparatus or device, such as a WTRU.

FIG. 8F is a block diagram of an example apparatus or device WTRU 102 that may be configured for wireless communications and operations in accordance with the systems, methods, and apparatuses described herein, such as a WTRU 102 of FIGS. 8A-E. As shown in FIG. 8F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It may be appreciated that the WTRU 102 may include any sub-combination of the foregoing elements. Also, the base stations 114*a* and 114*b*, and/or the nodes that base stations 114*a* and 114*b* may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 8F and described herein.

The processor 118 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 8F depicts the processor 118 and the transceiver 120 as separate components, it may be appreciated that the processor 118 and the transceiver 120 may be integrated together in an electronic package or chip.

The transmit/receive element 122 of a UE may be configured to transmit signals to, or receive signals from, a base station (e.g., the base station 114*a* of FIG. 8A) over the air interface 115/116/117 or another UE over the air interface 115*d*/116*d*/117*d*. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It may be appreciated that the transmit/receive element 122 may be configured to transmit and/or receive any combination of wireless or wired signals.

In addition, although the transmit/receive element 122 is depicted in FIG. 8F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit. The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114*a*, 114*b*) and/or determine its location based on the timing of the signals being received from two or more nearby base stations. It may be appreciated that the WTRU 102 may acquire location information by way of any suitable location-determination method.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 8G:
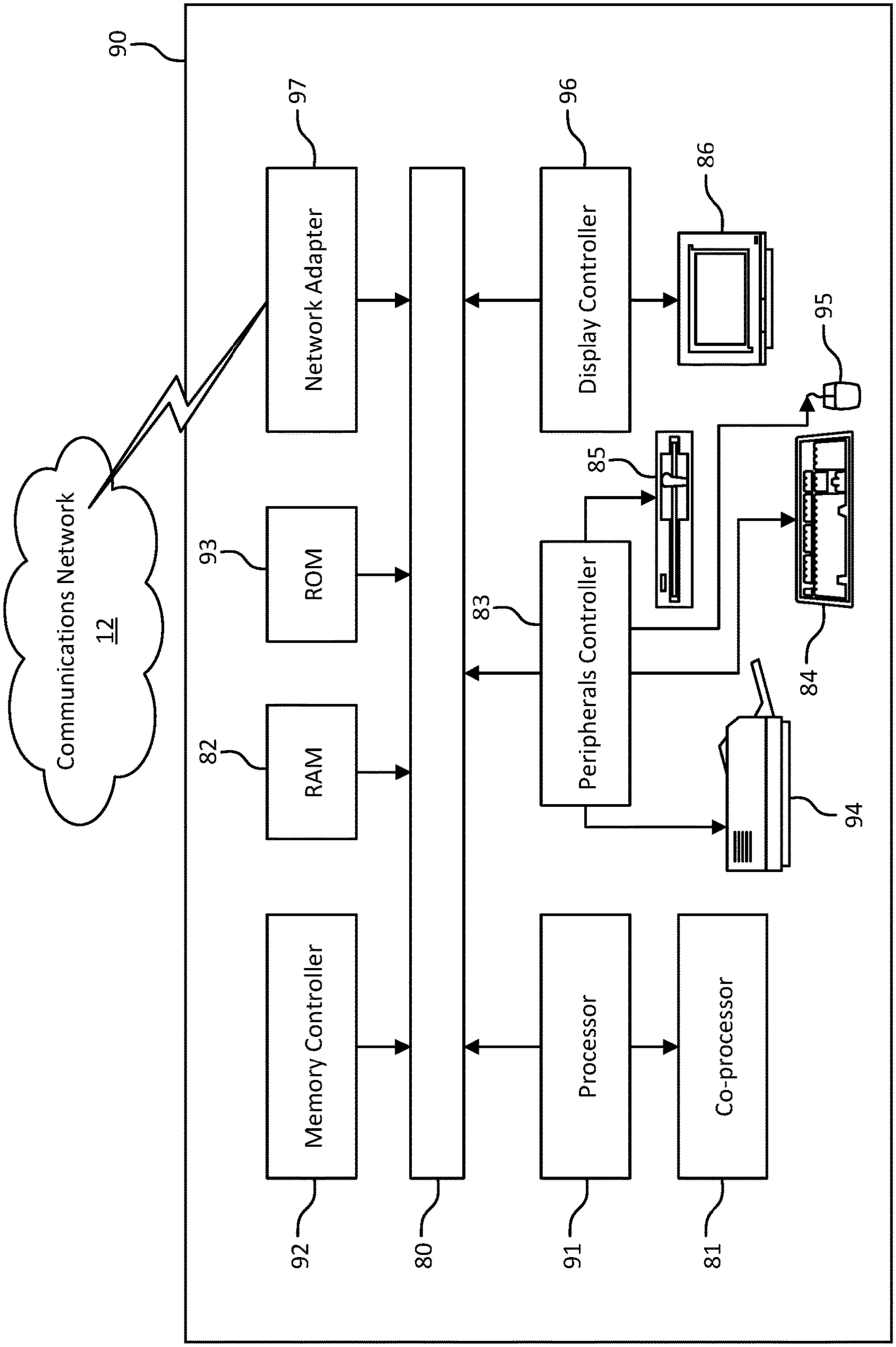
FIG. 8G is a block diagram of an exemplary computing system.

FIG. 8G is a block diagram of an exemplary computing system 90 in which one or more apparatuses of the communications networks illustrated in FIG. 8A, FIG. 8C, FIG. 8D and FIG. 8E may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIGS. 8A-1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods, and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media includes volatile and nonvolatile, removable, and non-removable media implemented in any non-transitory (e.g., tangible, or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information, and which may be accessed by a computing system.

We claim:

1. A wireless transmit/receive unit (WTRU), comprising:
a processor configured to:
receive a request for channel state information (CSI) associated with a sidelink (SL) bandwidth;
start an SL CSI time period based on receiving the request for the CSI;
during the SL CSI time period,
perform a listen before talk (LBT) associated with a set of resources of the SL bandwidth, and
determine an LBT success associated with the set of resources; and
end the SL CSI time period based on the LBT success.

2. The WTRU of claim 1, wherein the processor is further configured to send the CSI on the set of resources of the SL bandwidth before the end of the SL CSI time period.

3. The WTRU of claim 2, wherein the set of resources is a first set of resources, and the processor is further configured to:
perform an LBT on a second set of resources associated with the SL bandwidth to determine a number of LBT failures associated with the second set of resources;
determine, based on the number of LBT failures being equal to or greater than a CSLF threshold, that the second set of resources is associated with a consistent SL LBT failure (CSLF); and
send an indication of the CSLF associated with the second set of resources.

4. The WTRU of claim 3, wherein the processor is further to:
receive an uplink (UL) grant; and
generate an SL LBT failure medium access control (MAC) control element (CE), wherein the SL LBT failure MAC CE indicates the CSLF associated with the second set of resources, wherein the SL LBT failure MAC CE is sent according to the UL grant.

5. The WTRU of claim 1, wherein the processor is further configured to:
receive SL control information (SCI), wherein the SCI indicates the request for the CSI and triggers an SL CSI reporting procedure; and
cancel the SL CSI reporting procedure based on the LBT success.

6. The WTRU of claim 1, wherein the WTRU is a first WTRU, and the request is received from a second WTRU, and wherein the first WTRU and the second WTRU are connected via a PC5 connection.

7. The WTRU of claim 1, wherein the processor is further configured to:
determine that an SL logical channel (LCH) comprising SL data is to be transmitted;
determine that an SL BSR is to be sent on a first uplink (UL) resource to indicate a buffer status of the SL LCH;
determine an LBT failure associated with the first UL resource; and
send a scheduling request (SR) for a grant of a second UL resource to send the SL BSR.

8. The WTRU of claim 1, wherein the processor is further configured to:
receive configuration information indicating a threshold number of SL transmissions associated with a hybrid automatic repeat request (HARQ) procedure;
determine a number of SL transmissions associated with the HARQ procedure, wherein the number of SL transmissions includes a first SL transmission and excludes a second SL transmission, and wherein the first SL transmission is sent on a resource associated with an LBT success, and the second SL transmission is sent on a resource associated with an LBT failure; and
based on the number of SL transmissions associated with the HARQ procedure being equal to or greater than the threshold number of SL transmissions indicated in the configuration information, reset a HARQ buffer associated with the HARQ procedure.

9. A method performed by a wireless transmit/receive unit (WTRU), comprising:
receiving a request for channel state information (CSI) associated with a sidelink (SL) bandwidth;
starting an SL CSI time period based on receiving the request for the CSI;
during the SL CSI time period,
performing a listen before talk (LBT) associated with a set of resources of the SL bandwidth, and
determining an LBT success associated with the set of resources; and
ending the SL CSI time period based on the LBT success.

10. The method of claim 9, wherein the method comprises sending the CSI on the set of resources of the SL bandwidth before the end of the SL CSI time period.

11. The method of claim 10, wherein the set of resources is a first set of resources, and the method further comprises:
performing an LBT on a second set of resources associated with the SL bandwidth to determine a number of LBT failures associated with the second set of resources;
determining, based on the number of LBT failures being equal to or greater than a CSLF threshold, that the second set of resources is associated with a consistent SL LBT failure (CSLF); and
sending an indication of the CSLF associated with the second set of resources.

12. The method of claim 11, wherein the method further comprises:
receiving an uplink (UL) grant; and
generating an SL LBT failure medium access control (MAC) control element (CE), wherein the SL LBT failure MAC CE indicates the CSLF associated with the second set of resources, wherein the SL LBT failure MAC CE is sent according to the UL grant.

13. The method of claim 9, further comprising:
receiving SL control information (SCI), wherein the SCI indicates the request for the CSI and triggers an SL CSI reporting procedure; and
cancelling the SL CSI reporting procedure based on the LBT success.

14. The method of claim 9, wherein the WTRU is a first WTRU, and the request is received from a second WTRU, and wherein the first WTRU and the second WTRU are connected via a PC5 connection.

15. The method of claim 9, further comprising:

determining that an SL logical channel (LCH) comprising SL data is to be transmitted;

determining that an SL BSR is to be sent on a first uplink (UL) resource to indicate a buffer status of the SL LCH;

determining an LBT failure associated with the first UL resource; and sending a scheduling request (SR) for a grant of a second UL resource to send the SL BSR.

16. The method of claim 9, further comprising:

receiving configuration information indicating a threshold number of SL transmissions associated with a hybrid automatic repeat request (HARQ) procedure;

determining a number of SL transmissions associated with the HARQ procedure, wherein the number of SL transmissions includes a first SL transmission and excludes a second SL transmission, and wherein the first SL transmission is sent on a resource associated with an LBT success, and the second SL transmission is sent on a resource associated with an LBT failure; and based on the number of SL transmissions associated with the HARQ procedure being equal to or greater than the threshold number of SL transmissions indicated in the configuration information, resetting a HARQ buffer associated with the HARQ procedure.

* * * * *